(12) United States Patent
Hirose

(10) Patent No.: US 7,933,480 B2
(45) Date of Patent: Apr. 26, 2011

(54) OPTICAL TRANSMISSION STRUCTURAL BODY, OPTICAL WAVEGUIDE, OPTICAL WAVEGUIDE FORMATION METHOD, AND OPTICAL WIRING CONNECTION BODY

(75) Inventor: Naohiro Hirose, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 11/829,649

(22) Filed: Jul. 27, 2007

(65) Prior Publication Data

US 2007/0269164 A1 Nov. 22, 2007

Related U.S. Application Data

(60) Division of application No. 10/972,352, filed on Oct. 26, 2004, now Pat. No. 7,418,174, which is a continuation of application No. PCT/JP02/12040, filed on Nov. 19, 2002.

(30) Foreign Application Priority Data

| Apr. 26, 2002 | (JP) | 2002-127262 |
| Sep. 5, 2002 | (JP) | 2002-260519 |
| Nov. 7, 2002 | (JP) | 2002-324386 |

(51) Int. Cl.
  G02B 6/26 (2006.01)
  G02B 6/42 (2006.01)
(52) U.S. Cl. .......... 385/52; 385/49
(58) Field of Classification Search .......... 385/49, 385/52
See application file for complete search history.

(56) References Cited

U.S. PATENT DOCUMENTS

| 5,136,002 A * | 8/1992 | Sugimori et al. .......... 526/247 |
| 5,150,440 A * | 9/1992 | Booth .......... 385/49 |
| 5,287,424 A | 2/1994 | Sheem et al. |
| 5,444,804 A | 8/1995 | Yui et al. |
| 5,854,868 A | 12/1998 | Yoshimura et al. |
| 6,081,632 A | 6/2000 | Yoshimura et al. |

(Continued)

FOREIGN PATENT DOCUMENTS

EP 0 689 067 A2 12/1995

(Continued)

OTHER PUBLICATIONS

U.S. Appl. No. 11/829,686, filed Jul. 27, 2007 Hirose.

*Primary Examiner* — Jerry T Rahll
(74) *Attorney, Agent, or Firm* — Oblon, Spivak, McClelland, Maier & Neustadt, L.L.P.

(57) ABSTRACT

An object of the present invention is to provide an optical transmission structural body capable of preferably transmitting an optical signal between an optical wiring and an optical waveguide irrespective of a sh ape of a portion of the optical wiring, the portion being connected to a core part of the optical waveguide.

The optical transmission structural body of the present invention is constituted so that at least an optical wiring and an optical waveguide are connected to each other and an optical signal can be transmitted between a core of the optical wiring and a core part of the optical waveguide, wherein a portion of the optical wiring, the portion being connected to the core part of the optical waveguide, is not specially subjected to a planarization processing or has a surface roughness Ra based on JIS B 0601 of 0.1 μm or more.

11 Claims, 33 Drawing Sheets

U.S. PATENT DOCUMENTS 6,477,284 B1    11/2002    Oda et al.
6,804,423 B2 *  10/2004    Tsukamoto et al. ............ 385/14

FOREIGN PATENT DOCUMENTS

| | | |
|---|---|---|
| FR | 2548792 | 1/1985 |
| GB | 2 143 650 A | 2/1985 |
| JP | 50-59044 | 5/1975 |
| JP | 8-320422 | 3/1996 |
| JP | 11-248960 * | 9/1999 |
| JP | 2002-258095 | 9/2002 |
| JP | 2002-328247 | 11/2002 |
| JP | 2003-4990 | 1/2003 |
| JP | 2003-14972 | 1/2003 |
| JP | 2003-98366 | 4/2003 |
| JP | 2003-121677 | 4/2003 |
| JP | 2003-131063 | 5/2003 |
| JP | 2003-131064 | 5/2003 |
| JP | 2004-4487 | 1/2004 |
| JP | 2004-101657 | 4/2004 |

* cited by examiner (a)

(b)

(a)

(b)

(a)

(b)

(a)

(b)

(a)

(b)

(c)

(d)

(a)

(b)

(c)

(d)

(a)

(b)

(c)

(a)

(b)

(c)

(a)

(b)

(c)

(a)

(b)

(c)

(a)

(b)

(c)

of one optical fiber 112 which does not face the other optical fiber 112', and light for curing the photosensitive composition 111 is irradiated from one end of the optical fiber 112 toward one end of the optical fiber 112' arranged to face one end of the optical fiber 112 using this means (see FIG. 39(*b*)).

By irradiating the light from one end of one optical fiber 112 to that of the other optical fiber 112', the photosensitive composition 111 is gradually cured from an optical fiber 112-side correspondingly to an optical path, and the core part 114 of the optical waveguide that connects the optical fiber 112 to the optical fiber 112' is formed (see FIG. 39(*c*) to FIG. 39(*d*)).

Furthermore, due to the development of the fields using the optical techniques such as the optical communication and the optical information processing, attention has been focused on optical fibers mainly in communication fields. Particularly in the IT (Information Technology) field, an optical communication technique employing the optical fibers is necessary to provide a high speed Internet network.

The optical fiber has features: (1) low loss, (2) high band, (3) small diameter and light weight, (4) non-induction, (5) resource saving, and the like. A communication system which employs the optical fibers having these features can considerably decrease the number of relays as compared with a communication system which employs conventional metallic cables, can be easily constructed and maintained, and can improve its economical development and reliability.

Further, since the optical fiber can transmit not only light having a single wavelength but also light having many different wavelengths simultaneously, i.e., only one optical fiber can provide multiple transmission of light having many different wavelengths, it is possible to realize a large capacity of a transmission path capable of dealing with diversified purposes and to deal with picture service and the like.

Emission light emitted from an optical component such as a semiconductor laser is incident on such an optical fiber. It is an important element in the optical communication how efficiently the emission light is caused to be incident on the optical fiber. In long-distance transmission, in particular, it is required to cause the emission light to be incident on the optical fiber with high efficiency.

However, it is necessary to provide a gap between the optical fiber and the optical component for the purpose of preventing the optical fiber from being damaged due to a thermal expansion of the optical fiber or the like. The gap is, therefore, a hindrance for realizing the efficient incidence of the emission light on the optical fiber.

To avoid this problem, a method of causing the emission light of the optical component to be incident on the optical fiber by providing a lens such as a collimator lens or a condensing lens between the optical component and the optical fiber is used. With this method, even if the gap is provided between the optical component and the optical fiber, the emission light of the optical component can be caused to be efficiently incident on the optical fiber.

This method can be used for not only transmitting the light from the optical component to the optical fiber but also transmitting a light from the optical fiber to the optical component and transmitting light from one optical fiber to the other optical fiber. With this method, efficient light transmission can be achieved in any of these cases.

Furthermore, following the development of the fields using the optical techniques such as the optical communication and the optical information processing, performances of various types of optical communication devices have been enhanced, thereby disadvantageously complicating connection between the devices for optical communication.

SUMMARY OF THE INVENTION

The achievement of the connection between an optical wiring and an optical waveguide involves a serious problem other than the above-described cost problem. Namely, when the optical wiring is connected to the optical waveguide, connection ends of the optical wiring and the optical waveguides should be flattened so as to realize low connection loss. To this end, it has been said that it is necessary to carry out a highly accurate facet processing.

Taking connection of general optical fibers as an example, it has been said that: if a facet of a connection end of the optical wiring or the like is not flat, a bubble, a disorder of fiber cores, or the like occurs to result in a connection loss or the like during connection using a fusion technique; and if facets of the optical fibers are simply, physically connected to each other (mechanically spliced together), a connection loss due to a diffuse reflection or the like occurs to a connection portion of an optical waveguide connected to the optical wiring or the like. In addition, it has been said that: even if the self-organizing optical waveguide technique is used, a connection loss due to a diffuse reflection of a transmission light or the like occurs at the connection portion of the optical waveguide thus formed with the optical wiring or the like.

Therefore, if the optical fibers or the like from which covering members or the like are removed, respectively, are simply connected to each other, relatively flat facets can be formed by cutting the facets using a fiber cutter or the like. For a fiber array, a connector or the like, into which a single optical fiber or the like or a plurality of optical fibers or the like are assembled, however, a grinding processing is carried out for a long period of time using fine grinder powders after cutting because of the necessity of making connection facets uniform or the like. The grinding processing is not limited to surface grinding but spherical grinding such as PC grinding, inclined grinding or the like is necessary to be carried out in some cases. Therefore, there have been inevitable problems such as complicated steps and a cost increase. Specifically, an optical fiber facet grinding method using a silica-containing abrasive or the other method has been proposed.

However, after detailed consideration of an optical transmission structural body configured by connecting an optical wiring to an optical waveguide, the present inventor found that an optical signal can be appropriately transmitted between the optical wiring and the optical waveguide no matter what shape a portion of the optical wiring connected to the core part of the optical waveguide is, and completed an optical transmission structural body according to a first aspect of a first group of the present invention.

Furthermore, after detailed consideration of an optical waveguide formation method using the self-organizing optical waveguide formation technique, the present inventor found that the core part of an optical waveguide excellent in connection with the optical wiring can be formed without carrying out the highly accurate facet processing. The present inventor also found that the problems such as the complicated steps can be solved by forming such a core, and thereby completed an optical waveguide formation method according to a second aspect of the first group of the present invention.

The first aspect of the first group of the present invention is an invention relating to the optical transmission structural body, and the second aspect thereof is an invention relating to the optical waveguide formation method.

An optical transmission structural body according to the first aspect of the first group of the present invention is an optical transmission structural body constituted such that: at least an optical wiring and an optical waveguide are connected to each other; and an optical signal can be transmitted between a core of the above-mentioned optical wiring and a core part of the above-mentioned optical waveguide, wherein a portion of the above-mentioned optical wiring, the above-mentioned portion being connected to the core part of the above-mentioned optical waveguide, is not specially subjected to a planarization processing or has a surface roughness Ra based on JIS B 0601 of 0.1 µm or more.

In the optical transmission structural body according to the first aspect of the first group of the present invention, the core of the above-mentioned optical wiring may be connected to the core part of the above-mentioned optical waveguide; and a coating layer may be formed at least on an circumference of an end of the above-mentioned optical wiring on a side on which connection to the core part of the above-mentioned optical waveguide is conducted.

In the optical transmission structural body according to the first aspect of the first group of the present invention, an optical refractive index of the core part of the above-mentioned optical waveguide may be 90 to 110% of an optical refractive index of a portion of the above-mentioned optical wiring, more desirably 95 to 105% of an optical refractive index of the portion of the optical wiring, the above-mentioned portion being connected to the core part of the above-mentioned optical waveguide.

In the optical transmission structural body according to the first aspect of the first group of the present invention, an optical path conversion mirror may be formed on an end surface of the core part of the optical waveguide at opposite side to the side on which the core part of the above-mentioned optical waveguide is connected to the above-mentioned optical wiring, and the core part of the optical waveguide may include at least one bent portion.

In the optical transmission structural body according to the first aspect of the first group of the present invention, a roughened surface is desirably formed partially or entirely in a portion other than the portion connected to the core part of the optical waveguide on a surface of the optical wiring.

An optical waveguide formation method according to the second aspect of the first group of the present invention is an optical waveguide formation method which comprising steps of: immersing a part of an optical wiring in a photosensitive composition; irradiating light into the above-mentioned photosensitive composition through the above-mentioned optical wiring; and forming a core part corresponding to an optical path of light in the above-mentioned photosensitive composition, wherein a portion of the above-mentioned optical wiring, the above-mentioned portion being connected to the core part of the above-mentioned optical waveguide, is not specially subjected to a planarization processing or has a surface roughness Ra based on JIS B 0601 of 0.1 µm or more.

In the optical waveguide formation method according to the second aspect of the first group of the present invention, desirably, the above-mentioned part of the optical wiring immersed in the photosensitive composition is an end of the above-mentioned optical wiring, and a coating layer is formed on an circumference of the end of the optical wiring.

In the optical waveguide formation method according to the second aspect of the first group of the present invention, an optical refractive index of the core part is desirably 90 to 110%, more desirably 95 to 105% of an optical refractive index of the portion of the optical wiring, the above-mentioned portion being connected to the core part.

Further, as a method for connecting various optical devices to each other through an optical fiber or the like when establishing optical connection, a method using a connector, a method for fusing the optical fiber or the like with the various optical devices, a method for bonding the optical fiber or the like to the various optical devices by an optical adhesive, and the like have been used. However, any of these methods is a method for connecting the optical fiber or the like to the various optical devices by pressing each of the various optical device against the optical fiber or the like. Therefore, it has been said that: when connecting them, a damage of end surfaces of the optical fiber and the optical devices or deformation of connection portions or the like occurs. A connection loss resulting from diffuse reflection of a transmitted light might possibly occur to the connection portions in which the optical fiber are connected to the respective optical devices.

Furthermore, if the method for bonding the optical fiber or the like to the various optical devices by the optical adhesive is used, it is necessary to carry out a highly accurate end surface processing for making connection ends flat or spherical so as to realize low-loss connection. Therefore, it has been said that: there is no way to avoid disadvantages including the complicated steps and the cost increase.

If the above-mentioned self-organizing optical waveguide technique is used, the core part might be fluidized when forming the optical waveguide because the photosensitive composition is a liquid. As a result, a shape of the core part became sometimes unstable. With the optical waveguide including the core part of the unstable shape, it has been disadvantageously difficult to realize low connection loss between the optical devices.

As a result of dedicated study for solving these problems, the present inventor discovered that by forming an optical waveguide connecting different optical wirings to each other, and comprising a core part and a cladding part an optical signal, and then by pulling both ends of at least the core part, the core part is not fluidized and the shape of the core part is stabilized.

The present inventor also discovered that in an optical waveguide connected to optical wirings or optical components, and comprising a core part and a cladding part, both ends of at least the core part being pulled, the shape of the core part is stabilized, no damage, deformation or the like occurs to an end surface of the optical waveguide and those of the optical wirings or the like connected to both ends of the optical waveguide, respectively, and low connection loss between the different optical wirings or the like can be realized. The present inventor thus completed a second group of the present invention.

A first aspect of the second group of the present invention is an invention relating to an optical waveguide, and a second aspect thereof is an invention relating to an optical waveguide formation method.

An optical waveguide according to the first aspect of the second group of the present invention is an optical waveguide comprising a core part and a cladding part, each of both ends thereof being connected to optical wirings or optical components, respectively, wherein both ends of at least the core part are pulled.

In the optical waveguide according to the first aspect of the second group of the present invention, the core part desirably comprises a photosensitive composition. The cladding part desirably comprises a resin composition.

Further, an optical waveguide formation method according to the second aspect of the second group of the present invention comprises steps of: arranging different optical wirings such that one end of one of the optical wirings substantially faces one end of the other optical wiring and at least both of the faced ends thereof are immersed in a photosensitive composition; and irradiating light at least from one of the above-mentioned optical wirings to the other optical wiring, thereby forming a core part that connects the above-mentioned optical wirings to each other, wherein both ends of the core parts are pulled.

In the optical waveguide formation method according to the second aspect of the second group of the present invention, desirably, after pulling the above-mentioned core part or while pulling the above-mentioned core part, a stable cladding part is formed around the above-mentioned core part.

Moreover, as described above, if a lens is to be arranged between an optical component and an optical fiber during optical transmission, a very small lens should be used as the lens. In order to efficiently transmit a light, high accuracy is required for a shape of the lens. Manufacturing of such a lens is disadvantageously complicated and has disadvantageously caused a cost increase.

In addition the arrangement of the lens in the optical component, the optical fiber or the like is carried out manually or using a facility which can perform positioning with high accuracy. The arrangement requiring considerably high positioning accuracy has caused a problem of increased cost.

As a result of dedicated study for solving these problems, the present inventor discovered that an optical waveguide including a core part a shape of which is such that the core part is gradually thinner toward one end of the core part can be employed in place of the above-mentioned lens, and that the optical waveguide of such a shape can be formed easily at a low cost by using a predetermined method.

The present inventor also discovered that the optical waveguide having the above-mentioned shape can be formed while being directly attached to an optical wiring such as an optical component or an optical fiber, and that the above-mentioned problems can be solved since a highly accurate positioning step is not required when the optical waveguide is formed in that state. The present inventor thus completed a third group of the present invention.

A first aspect of the third group of the present invention is an invention relating to an optical waveguide, and a second aspect thereof is an invention relating to an optical waveguide formation method.

An optical waveguide according to the first aspect of the third group of the present invention is an optical waveguide formed independently of an optical wiring, wherein a shape of a core part is formed to be gradually thinner toward one end of the core part.

In the optical waveguide according to the first aspect of the third group of the present invention, a cladding part is desirably formed around the core part. The core part desirably comprises a photosensitive composition.

Further, an optical waveguide formation method according to the second aspect of the third group of the present invention comprises a step of irradiating light into a photosensitive composition through an optical wiring, thereby growing a cured matter of the above-mentioned photosensitive composition having a shape for condensing the above-mentioned light to form a core part having such a shape that the core part becomes gradually thinner toward one end of the core part.

In the optical waveguide formation method according to the second aspect of the third group of the present invention, desirably, after forming the above-mentioned core part, a stable cladding part is formed around the above-mentioned core part.

EXPLANATION OF SYMBOLS

Figure 1:
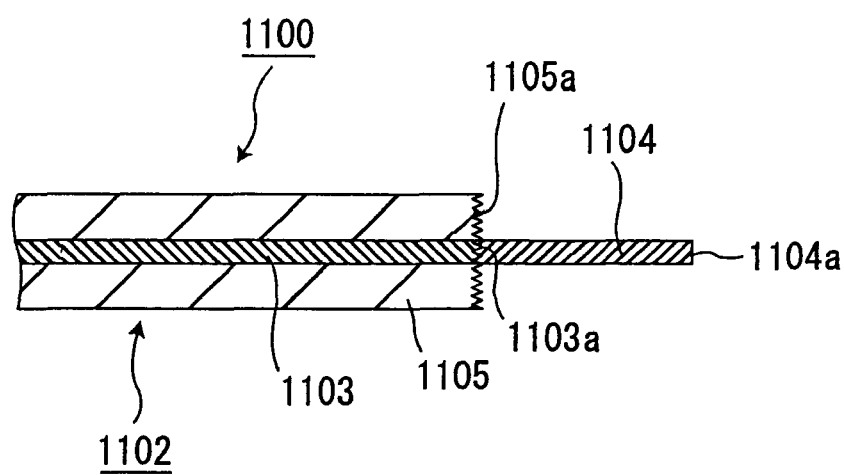
FIG. 1 is a partly cross-sectional view schematically showing one embodiment of an optical transmission structural body according to the first aspect of the first group of the present invention.

1001, 1011, 1021, 1031 photosensitive composition
1002, 1012, 1012', 1022, 1022', 1032 optical wiring (optical fiber)
1003, 1013, 1023, 1033 core
1004, 1014, 1024, 1034 core part
1005, 1015 ultraviolet irradiation device
1100 optical transmission structural body
1102 optical wiring
1104 core part
4100, 4110, 4120 optical waveguide
4011, 4021 photosensitive composition
4012, 4022 optical fiber
4013, 4023 core
4014, 4024 core part
4105 cladding part
5001, 5021, 5031, 5041 photosensitive composition
5002, 5022, 5032, 5042 optical fiber
5003, 5023 core
5004, 5024, 5034, 5044 core part
5007 lens
7010 tape-shaped fiber (a plurality of optical wirings)
7012 high pressure mercury lamp (light source)
7013, 7018 V-groove substrate for optical fiber
7014 UV-cured resin (photosensitive composition)
7015, 7019 V-groove pressing plate

DETAILED DISCLOSURE OF THE INVENTION

First, an optical transmission structural body according to a first aspect of a first group of the present invention will be described.

The optical transmission structural body according to the first aspect of the first group of the present invention is constituted such that:

at least an optical wiring and an optical waveguide are connected to each other; and an optical signal can be transmitted between a core of the above-mentioned optical wiring and a core part of the above-mentioned optical waveguide, wherein a portion of the above-mentioned optical wiring, the above-mentioned portion being connected to the core part of the above-mentioned optical waveguide, is not specially subjected to a planarization processing or has a surface roughness Ra based on JIS B 0601 of 0.1 μm or more.

The optical transmission structural body according to the first aspect of the first group of the present invention is sufficiently low in connection loss between the optical wiring and the optical waveguide, and excellent in optical signal transmission performance although the portion of the optical wiring connected to the core part of the optical waveguide is not specially subjected to a planarization processing or having a surface roughness Ra based on JIS B 0601 of 0.1 μm or more.

Further, in manufacturing the optical transmission structural body, the portion of the optical wiring connected to the core part of the optical waveguide can be normally formed only by cutting using a cutting tool for cutting an electric wiring or the like without performing a highly accurate end surface processing. Therefore, an optical waveguide formation process can be simplified. Besides, since a manufacturing process can be simplified, the optical transmission structural body is economically advantageous.

The optical transmission structural body according to the first aspect of the first group of the present invention is constituted so that at least the optical wiring and the optical waveguide are connected to each other.

Any optical wiring can be employed as long as it causes a light such as ultraviolet ray, visible light or infrared ray to pass and thereby transmits information. Specific examples of the optical wiring include an optical fiber and the like.

The portion of the optical wiring connected to the core part of the optical waveguide is not specially subjected to a planarization processing or has a surface roughness Ra based on JIS B 0601 of 0.1 μm or more.

As already described in "Background Art" part, if the surface roughness Ra of the end surface of the optical wiring is set at less than 0.1 μm, a complicated processing such as polishing using dispersion particles such as silica has been required.

Further, if the optical fiber is cut by using a fiber cleaver (fiber cutter), a cut surface is a mirror surface and a surface roughness Ra of the cut surface is substantially zero. Therefore, by cutting the optical fiber using the fiber cleaver, an optical wiring the fact of which has the surface roughness Ra based on JIS B 0601 of less than 0.1 μm can be obtained without the complicated polishing processing. However, if the optical transmission structural body according to the first aspect of the first group of the present invention is manufactured using such an optical wiring, a yield is deteriorated in a step of cutting the optical fiber. If an array-like optical transmission structural body in which the optical fibers are arranged is manufactured, in particular, the deterioration of yield is great, so that an operation itself requires skill to a certain degree.

In contrast, if an optical wiring the end surface of which is not subjected to the planarization processing or having the surface roughness Ra based on JIS B 0601 of 0.1 μm or more is used as the optical wiring, the above-mentioned disadvantages which occur during manufacturing of the optical transmission structural body can be avoided.

A material for the optical wiring is not limited to a specific material as long as it transmits light such as ultraviolet ray, visible light or infrared ray. The material may be an inorganic material or may be an organic material.

Examples of the inorganic material include a material mainly consisting of quartz glass, and a multi-component glass mainly consisting of soda-lime glass, borosilicate glass, or the like. Examples of a polymer material (plastic) include silicone resin, and acrylic resin such as PMMA (polymethyl methacrylate). As the polymer material (plastic), the material used for the optical waveguide described below can be used.

Examples of a material for the core part of the optical waveguide include an organic material. Specifically, examples of the organic material include those similar to photosensitive compositions used for an optical waveguide formation method according to the second aspect of the first group of the present invention to be described later.

The core part may include particles such as resin particles, inorganic particles or metal particles, if necessary. By including the particles, it is possible to match a thermal expansion coefficient of the optical waveguide to that of the optical wiring. Specifically, examples of the particles include those similar to particles contained in the photosensitive composition used in the optical waveguide formation method according to the second aspect of the first group of the present invention to be described later. In addition, a cladding part of the optical waveguide to be described later may contain particles, if necessary.

In the optical transmission structural body, an optical refractive index of the core part of the optical waveguide is not limited to a specific value. However, in view of a practically available range of the optical refractive index, the optical refractive index of the optical waveguide needs to be higher than that of air or a vacuum. It is therefore desirable that a lower limit of the optical refractive index is higher than 1.0. In addition, in light of almost all materials that may possibly be materials for the core part of the optical waveguide except for minerals such as diamonds, an upper limit of the optical refractive index of the core part is desirably 2.0 or less.

It is desirable that the lower limit of the optical refractive index of the core part of the optical waveguide is 90% and the upper limit thereof is 110% of that of the portion of the optical wiring, said portion being connected to the core part of the optical waveguide.

If the optical refractive index of the core part of the optical waveguide falls within the above-mentioned range, a return loss is 25 dB or more, thereby ensuring a more excellent optical signal transmission performance.

Specifically, if quartz fibers are connected by placing them face to face, a small gap (e.g., an air layer) is interposed between the optical fibers. In this case, if the refractive index of the core of the optical fiber is set at 1.46 and that of the gap (air layer) is set at 1.00, the return loss is 14.6 dB. However, the optical transmission structural body constituted such that the optical wiring and the optical waveguide are connected to each other and such that the core part of the optical waveguide has an optical refractive index falling within the above-mentioned range, has a return loss of 25 dB or more. As compared with the optical fibers which are connected by placing face to face, an excellent communication performance is ensured.

The return loss LR (dB) can be calculated using the following Equation (A):

$$LR = -10 \log R \quad (A)$$

wherein $R = \{(n_1 - n_0)/(n_1 + n_0)\}^2$, $n_1$ is the refractive index of the core of the optical fiber, and $n_0$ is the refractive index of the gap (air layer).

Furthermore, although direct comparison cannot be made, if the structural body has the return loss of 25 dB or more, a grade of the structural body is C in accordance with JIS C 5963 (general rules of optical connector having optical fiber cord).

It is desirable that the lower limit of the optical refractive index of the core part of the optical waveguide is 95% of that of the portion of the optical wiring, said portion being connected to the core part of the optical waveguide. It is desirable that the upper limit of the optical refractive index of the core part of the optical waveguide is 105% thereof.

If the optical refractive index of the core part of the optical waveguide falls within the above-mentioned range, the return loss is 30 dB or more, thereby ensuring more excellent optical signal transmission performance.

Although direct comparison cannot be made, if the optical transmission structural body has the return loss of 30 dB or more, the grade thereof is D in accordance with to JIS C 5963.

It is more desirable that the lower limit of the optical refractive index of the core part of the optical waveguide is 98% of that of the portion of the optical wiring, said portion being connected to the core part of the optical waveguide. It is more desirable that the upper limit of the optical refractive index of the core part of the optical waveguide is 102% thereof.

If the optical refractive index of the core part of the optical waveguide falls within the above-mentioned range, the return loss is 40 dB or more (39.9 dB or more to be accurate), thereby ensuring particularly excellent optical signal transmission performance.

Although direct comparison cannot be made, if the optical transmission structural body has the return loss of 40 dB or more, the grade thereof is F in accordance with JIS C 5963.

If an optical signal is incident on the optical transmission structural body using a semiconductor laser or the like, generation of a reflected light on an interface between the optical wiring and the optical waveguide becomes causes of a noise. However, if the return loss is 40 dB or more, the generation of the noise resulting from the reflected light can be suppressed.

If the reflected light returns to the semiconductor laser, lasing is made unstable and a malfunction of the semiconductor laser occurs in some cases. However, by setting the return loss at 40 dB or more, such a disadvantage can be avoided.

If the quartz fibers are connected by placing face to face, a method for reducing the return loss by filling the gap between the fibers with a material (e.g., silicon oil) having an equivalent optical refractive index range is generally used. However, if the optical wiring the end surface of which not subjected to a planarization processing or has the surface roughness Ra based on JIS B 0601 of 0.1 μm or more is used as seen in the present invention, an unnecessary gap is inevitably formed when placing the optical wirings face to face, resulting in the deterioration of the optical connection loss. They have been practically unavoidable disadvantages.

Furthermore, in the optical transmission structural body according to the first aspect of the first group of the present invention, if the core part of the optical waveguide is inevitably formed by curing the photosensitive composition, the core part desirably has the optical refractive index in the above-mentioned range, and the lower limit of the optical refractive index of the core part before curing, i.e., the lower limit of the optical refractive index of the photosensitive composition is desirably 90% of that of the core of the optical wiring, more desirably 95%, most desirably 98%. The upper limit thereof is desirably 110% of the optical refractive index of the core of the optical wiring, more desirably 105%, most desirably 102%.

If the optical refractive index of the photosensitive composition itself falls within the above-mentioned range, the transmission loss of the optical signal between the core of the optical wiring and the core part of the optical waveguide can be reduced, and excellent reliability can be ensured.

The terms "the optical refractive index of the portion of the optical wiring, said portion being connected to the core part of the optical waveguide" means the optical refractive index of the core or the like of a step index optical fiber ("SI optical fiber") which has a single optical refractive index. If the portion connected to the core part of the optical waveguide is a core such as that of a graded index optical fiber ("GI optical fiber"), the core of the optical wiring has an optical refractive index in a certain range. Therefore, the above-mentioned terms means a peak optical refractive index of the core of the optical wiring.

It is noted that if the core part of the optical waveguide formed according to the first aspect of the first group of the present invention has the optical refractive index in a certain range, a peak optical refractive index of the core part is similarly referred to as the optical refractive index of the core part.

Embodiments of the optical transmission structural body according to the first aspect of the first group of the present invention will be described hereinafter with reference to the drawings.

FIG. 1 is a partly cross-sectional view typically showing one embodiment of the optical transmission structural body according to the first aspect of the first group of the present invention.

As shown in FIG. 1, an optical transmission structural body 1100 is constituted so that an optical wiring 1102 comprising a core 1103 and a cladding 1105 is connected to an optical waveguide comprising a core part 1104. A portion 1103a of the optical wiring 1102 connected to the core part 1104 of the optical waveguide is not specially subjected to a planarization processing or has the surface roughness Ra based on JIS B 0601 of 0.1 μm or more. In the optical transmission structural body 1100, a portion 1105a of the cladding 1105 flush with the connected portion 1103a is not specially subjected to the planarization processing or has the surface roughness Ra based on JIS B 0601 of 0.1 μm or more, similarly to the portion 1103a.

In such an optical transmission structural body 1100, it is possible to ensure transmitting an optical signal between the optical wiring 1102 and the core part 1104 of the optical waveguide.

Further, in the optical transmission structural body shown in FIG. 1, an end surface 1104a of the core part of the optical waveguide at opposite side to a side on which the optical wiring is connected is of a shape perpendicular to a longitudinal direction of the core part and plane. However, the shape of the end surface of the optical waveguide that constitutes the optical transmission structural body according to the first aspect of the first group of the present invention is not limited to the shape shown in FIG. 1.

Specifically, as shown in FIGS. 2(a) to 2(c), the shape of the end surface of the core part of the optical waveguide at the opposite side to the side on which the optical wiring is connected may be an inclined face or a spherical face.

FIGS. 2(a) to 2(c) are partly cross-sectional views schematically showing another embodiments of the optical transmission structural body according to the first aspect of the first group of the present invention.

As shown in FIG. 2(a), in an optical transmission structural body 1110, an optical path conversion mirror (inclined face) 1114a is formed on an end surface of a core part 1114 of an optical waveguide at opposite side to a side on which an optical wiring 1112 is connected. If the optical path conversion mirror 1114a is formed, a direction of an optical path of an optical signal transmitted through the optical wiring 1112 and the core part 1114 of the optical waveguide can be changed to a desired direction.

It is noted that the optical transmission structural body 1110 is equal to the optical transmission structural body 1100 shown in FIG. 1 in configuration except that the optical path conversion mirror 1114a is formed. In FIG. 2(a), reference symbol 1113 represents a core and 1115 represents a cladding.

As shown in FIG. 2(b), in an optical transmission structural body 1120, an end surface 1124a of a core part 1124 of an optical waveguide at the opposite side to a side on which an optical wiring 1122 is connected is subjected to an anti optical reflection processing.

Namely, in the optical transmission structural body 1110 shown in FIG. 1, the end surface 1104a of the optical waveguide at opposite side to the side on which the optical wiring is connected is formed to be perpendicular to an optical axis of the core part of the optical waveguide. The end surface 1124a of the core part 1124 of the optical waveguide in the optical transmission structural body 1120 shown in FIG. 2(b), by contrast, is an inclined face inclined at 8°, as compared with the end surface 1104a of the core part 1104 shown in FIG. 1.

Thus, if the end surface of the optical waveguide at the opposite side to the side on which the optical wiring is connected inclined at a predetermined angle, reflection of the optical signal by the end surface can be prevented during transmission of the optical signal through the optical wiring and the optical waveguide. Needless to say, in the optical transmission structural body according to the first aspect of the first group of the present invention, the inclination angle of the inclined face is not limited to a specific angle.

It is noted that the optical transmission structural body 1120 equal in configuration to the optical transmission structural body 1100 shown in FIG. 1 except that the optical path conversion mirror 1124a is formed thereto. In FIG. 2(b), reference symbol 1123 represents a core and 1125 represents a cladding. The cross-sectional view of FIG. 2(b) schematically shows the embodiment according to the first aspect of the first group of the present invention. The inclination angle of the end surface of the core part shown in FIG. 2(b) is shown bigger than 8° so as to help understand the embodiment.

As shown in FIG. 2(c), in an optical transmission structural body 1130, a lens 1134a is formed on an end surface of a core part 1134 of an optical waveguide at an opposite side to a side on which an optical wiring 1132 is connected. If the lens 1134a is formed as described above, the light does not spread when the optical signal transmitted through the optical wiring 1132 and the core part 1134 of the optical waveguide is emitted. Therefore, if an optical component is arranged to be opposed to the end surface on which the lens 1134a is formed, the optical signal can be preferably transmitted between the optical transmission structural body and the optical component.

It is noted that the optical transmission structural body 1130 is equal in configuration to the optical transmission structural body 1100 shown in FIG. 1 except that the lens 1134a is formed on the end surface of the core part. In FIG. 2(c), reference symbol 1133 represents a core and 1135 represents a cladding.

Furthermore, in the optical transmission structural body according to the first aspect of the first group of the present invention, in case a lens is formed on the end surface of the core part, the shape of the lens is not limited to a specific one.

In the optical transmission structural body, the shape of the end surface of the core part of the optical waveguide at the opposite side to the side on which the optical wiring is connected may be a slightly curved face that does not specially function as a lens. The slightly curved end surface can be used when the optical transmission structural bodies each having the end surface of such a shape are physically brought into contact with each other.

Moreover, in the optical transmission structural body according to the first aspect of the first group of the present invention, the shape of the core part of the optical waveguide may be such that the core part is gradually thinner from an end on the side on which the optical wiring is connected to an opposite end, or such that the core part is gradually thicker. In some cases, the shape of the core part of the optical waveguide may be such that the core part is gradually thinner from the end on the side on which the optical wiring is connected to the opposite end, the core part is formed thick at one point, and then thinner again.

Namely, it is not always necessary that the shape of the core part of the optical waveguide such that a cross-sectional shape in a direction perpendicular to an optical axis is equal from one end to the other end of the core part.

Further, in the optical transmission structural body according to the first aspect of the first group of the present invention, the core part of the optical waveguide may include at least one bent portion.

Figure 3:
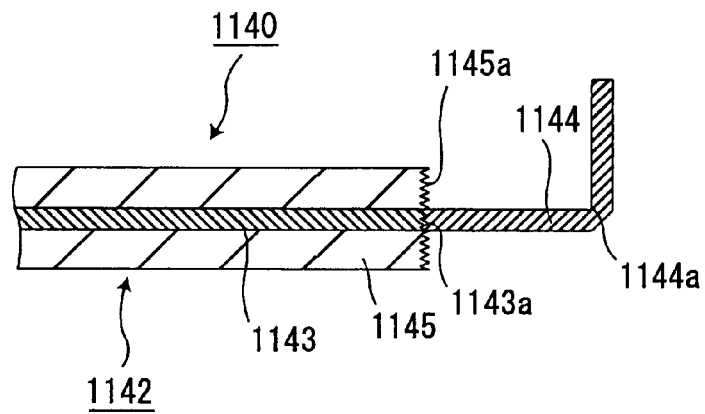
FIG. 3 is a partly cross-sectional view schematically showing still another embodiment of the optical transmission structural body according to the first aspect of the first group of the present invention.

FIG. 3 is a partly cross-sectional view schematically showing still another embodiment of the optical transmission structural body according to the first aspect of the first group of the present invention.

As shown in FIG. 3, in an optical transmission structural body 1140, a bent portion 1144a is formed on a core part 1144 of an optical waveguide. If the bent portion 1144a is formed, a direction of a transmission path of an optical signal through the core part 1144 can be changed to a desired direction. The optical transmission structural body 1140 is equal in configuration to the optical transmission structural body 1100 shown in FIG. 1 except that the bent portion 1144a is formed. In FIG. 3, reference symbol 1143 represents a core and 1145 represents a cladding.

The number of the bent portions formed on the core part is not limited to one, as shown in FIG. 3, but may be two or more.

An angle of the bent portion is not limited to 90°, as shown in FIG. 3, but may be an arbitrary angle.

Figure 2:
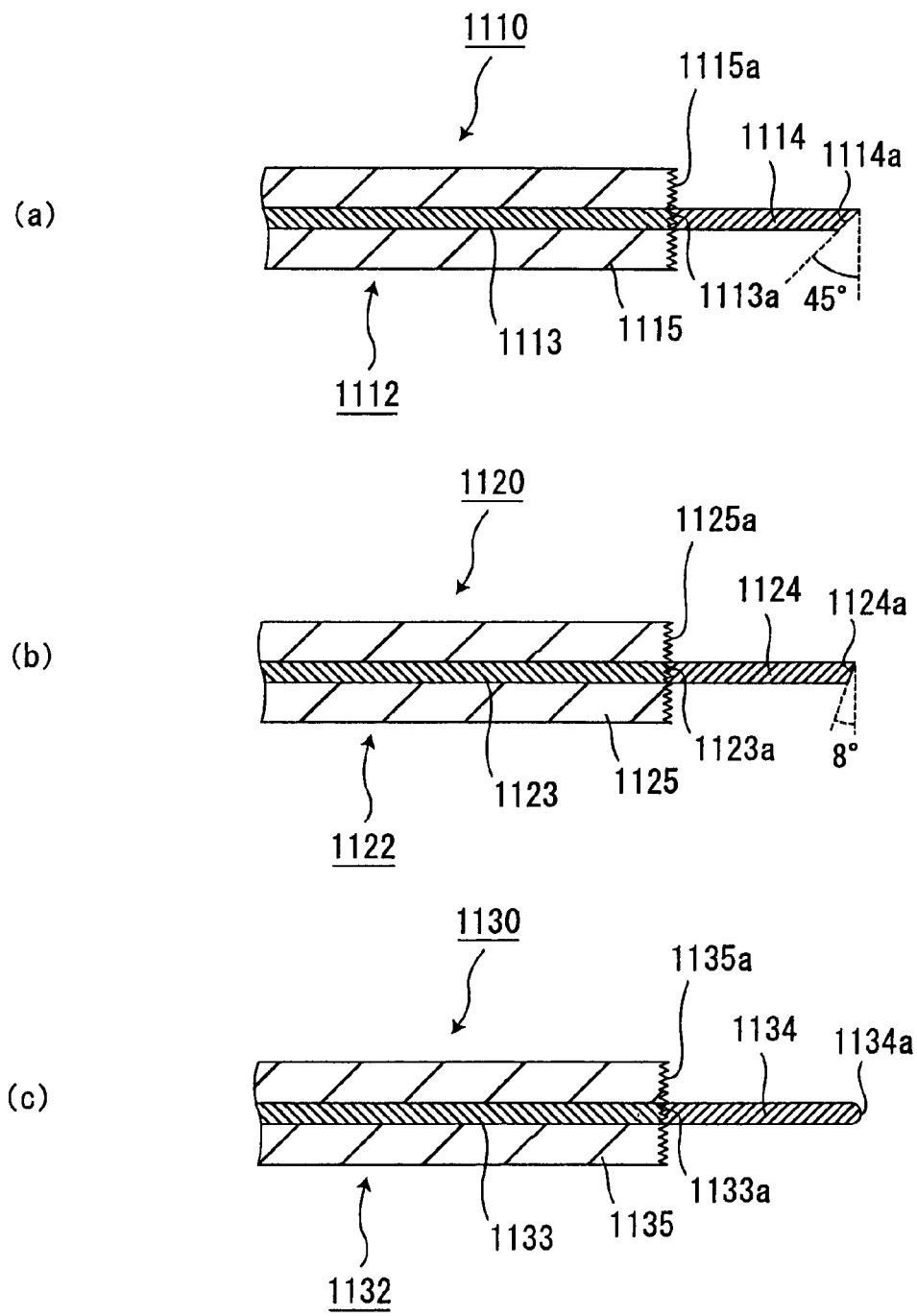
FIGS. 2(a) to 2(c) are partly cross-sectional views each schematically showing another embodiment of the optical transmission structural body according to the first aspect of the first group of the present invention.

In the optical transmission structural body according to the first aspect of the first group of the present invention shown in each of FIGS. 1 to 3, the optical signal is emitted or incident through the end surface of the core part of the optical waveguide at opposite side to the side on which the optical wiring is connected in one direction. However, in the optical transmission structural body according to the first aspect of the first group of the present invention, the optical signal may be emitted or incident in two or more different directions. If the shape of the end surface is made such a shape, the optical transmission structural body according to the first aspect of the first group of the present invention can function as, for example, an optical coupler (an optical branching device). Specific examples of the optical coupler will next be described with reference to the drawings.

FIGS. 4(a) and 4(b) are partly cross-sectional views each schematically showing yet embodiment of the optical transmission structural body according to the first aspect of the first group of the present invention.

As shown in FIG. 4(a), in an optical transmission structural body 1150, a mirror for optical branching 1154a is formed on an end surface of a core part 1154 of an optical waveguide at opposite side to a side on which an optical wiring 1152 is connected. The mirror for optical branching 1154a is constituted by two reflection surfaces at 90° against each other. Therefore, in case an optical signal is emitted through the mirror for optical branching 1154a, the optical signal is emitted in different directions through the respective two reflection surfaces.

The optical transmission structural body 1150 is equal in configuration to the optical transmission structural body 1100 shown in FIG. 1 except that the mirror for optical branching 1154a is formed. In FIG. 4(a), reference symbol 1153 represents a core and 1155 represents a cladding.

In an optical transmission structural body 1160 shown in FIG. 4(b), similarly to the optical transmission structural body 1150 shown in FIG. 4(a), a mirror for optical branching 1164a is formed on an end surface of a core part 1164 of an optical waveguide at opposite side to a side on which an optical wiring 1162 is connected. This optical path conversion mirror can separate an optical signal emitted from the end surface of the core part 1164 of the optical waveguide at opposite side to the side on which the optical wiring 1162 is connected to two optical signals.

The optical transmission structural body 1160 shown in FIG. 4(b) differs from the optical transmission structural body 1150 shown in FIG. 4(a) only in a direction of each reflection surface of the mirror for optical branching. That is, in the optical transmission structural body 1150, the mirror for optical branching 1154a is formed to be concave on the optical wiring 1152 side. In the optical transmission structural body 1160, the mirror for optical branching 1164a is formed to protrude to an opposite side to the optical wiring 1162. In FIG. 4(b), reference symbol 1163 represents a core and 1165 represents a cladding.

The optical transmission structural bodies 1150 and 1160 shown in FIGS. 4(a) and 4(b), respectively, can function as optical couplers.

FIGS. 5(a) and 5(b) are partly cross-sectional views each schematically showing yet another embodiments of the optical transmission structural body according to the first aspect of the first group of the present invention.

As shown in FIG. 5(a), in an optical transmission structural body 1170, a core part 1174 of an optical waveguide that constitutes this optical transmission structural body 1170 includes two end surfaces 1174a and 1174b formed at different positions. The end surface 1174a is an optical path conversion mirror.

In the optical transmission structural body 1170 constituted as described above, an optical signal transmitted from an optical wiring 1172 to the core part 1174 of the optical waveguide can be separated to an optical signal transmitted through the end surface 1174a and an optical signal transmitted through the end surface 1174b. In addition, optical signals separately incident through the end surfaces 1174a and 1174b, respectively can be both transmitted through the optical wiring 1172.

The optical transmission structural body 1170 is equal in configuration to the optical transmission structural body 1100 shown in FIG. 1 except for the structure of the optical waveguide 1174. In FIG. 5(a), reference symbol 1173 represents a core and 1175 represents a cladding.

As shown in FIG. 5(b), in an optical transmission structural body 1180, a core part 1184 of an optical waveguide that constitutes this optical transmission structural body 1180 is branched halfway, and has two end surfaces 1184a and 1184b formed at different positions.

In the optical transmission structural body 1180 constituted as described above, an optical signal transmitted from an optical wiring 1182 to the core part 1184 of the optical waveguide can be separated to an optical signal transmitted through the end surface 1184a and an optical signal transmitted through the end surface 1184b. In addition, optical signals separately incident through the end surfaces 1184a and 1184b, respectively, can be both transmitted through the optical wiring 1182.

Figure 5:
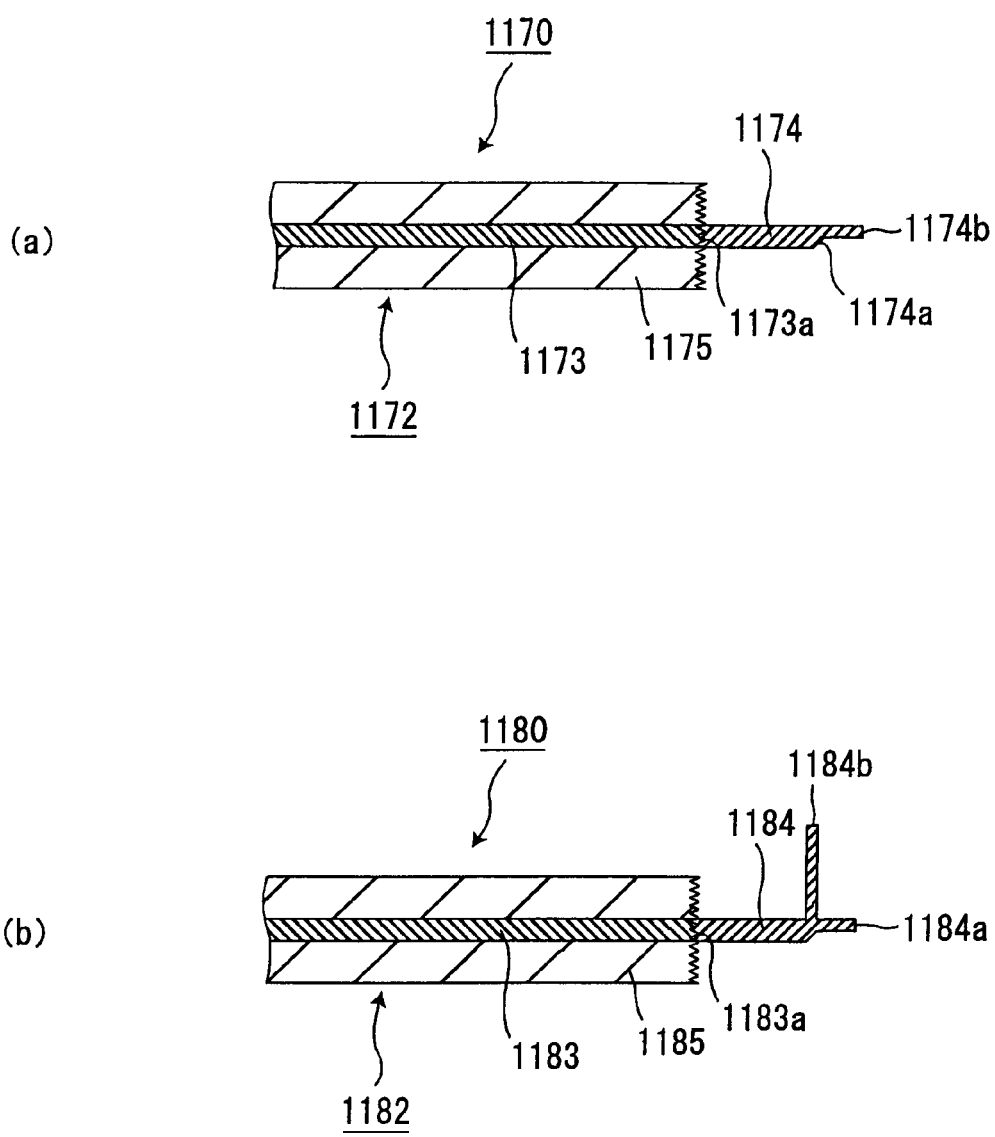
FIGS. 5(a) and 5(b) are partly cross-sectional views each schematically showing yet another embodiment of the optical transmission structural body according to the first aspect of the first group of the present invention.

The optical transmission structural body 1180 is equal in configuration to the optical transmission structural body 1100 shown in FIG. 1 except for the structure of the optical waveguide 1184. In FIG. 5(*a*), reference symbol 1183 represents a core and 1185 represents a cladding.

Figure 4:
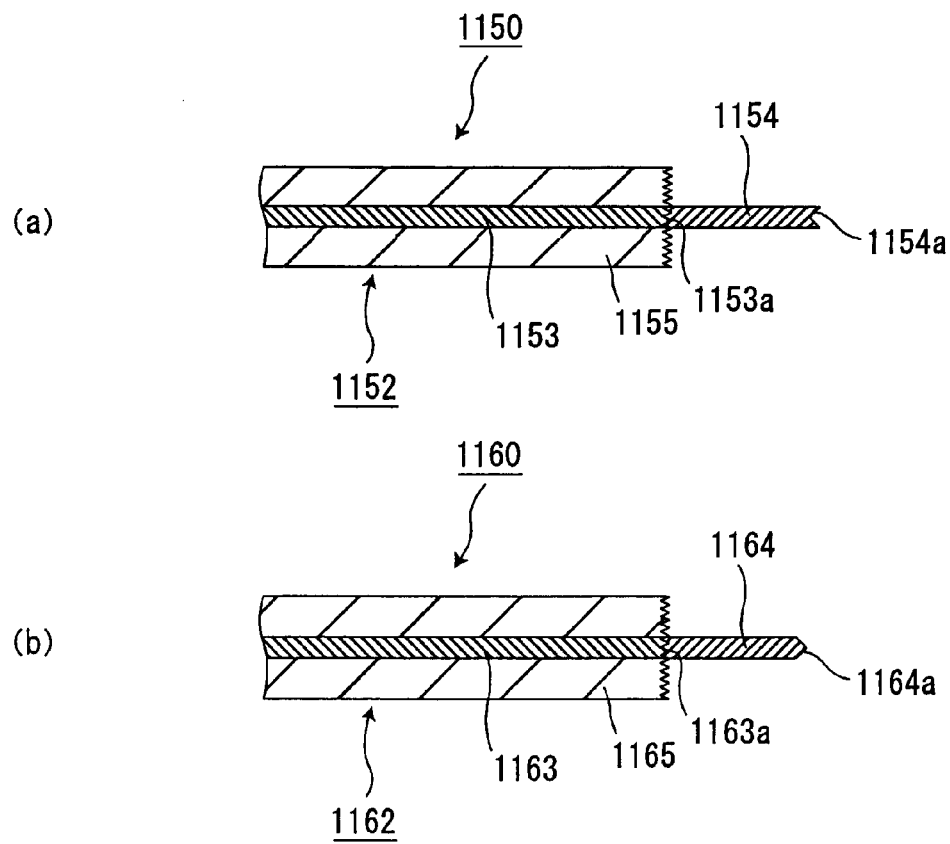
FIGS. 4(a) and 4(b) are partly cross-sectional views each schematically showing yet another embodiment of the optical transmission structural body according to the first aspect of the first group of the present invention.

The optical transmission structural bodies 1170 and 1180 shown in FIGS. 5(*a*) and 5(*b*), respectively, can function as optical couplers similarly to those shown in FIGS. 4(*a*) and 4(*b*).

Furthermore, the optical transmission structural body according to the first aspect of the first group of the present invention may be embodied by the following embodiments to be described below with reference to the drawings.

Figure 6:
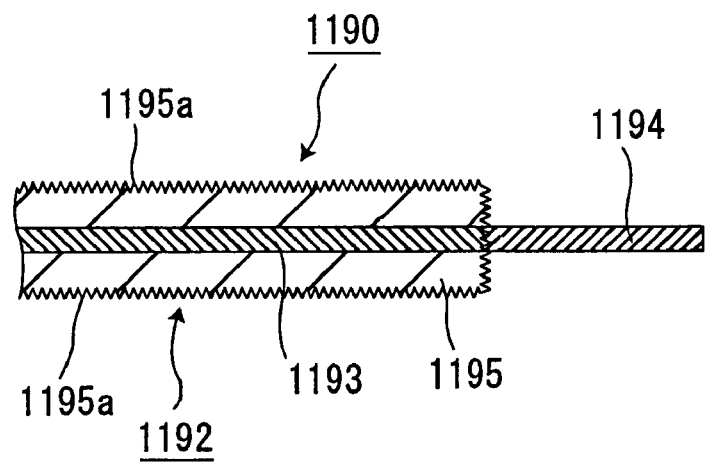
FIG. 6 is a partly cross-sectional view schematically showing yet another embodiment of the optical transmission structural body according to the first aspect of the first group of the present invention.

FIG. 6 is a partly cross-sectional view schematically showing yet another embodiment of the optical transmission structural body according to the first aspect of the first group of the present invention.

As shown in FIG. 6, in an optical transmission structural body 1190, a roughened surface 1195*a* is formed on a surface of a cladding 1195 that constitutes an optical wiring 1192. If the roughened surface 1195*a* is thus formed, adhesion between the optical transmission structural body 1190 according to the first aspect of the first group of the present invention and the other optical component, a ferrule, or the like is improved when the optical transmission structural body is attached to the other optical component, the ferrule, or the like through an adhesive or the like.

The optical transmission structural body 1190 is equal in configuration to the optical transmission structural body 1100 shown in FIG. 1 except that the roughened surface 1195*a* is formed. In FIG. 6, reference symbol 1193 represents a core.

Moreover, in the optical transmission structural body according to the first aspect of the first group of the present invention, a portion on which the roughened surface is formed is not limited to the surface of the cladding, but may be a portion other than that connected to the core part of the optical waveguide on a surface of the optical wiring.

A method for forming the roughened surface on the optical wiring is not limited to a specific method. The roughened surface can be formed by physical polishing, chemical polishing or the like.

As the physical polishing, a method such as a scrub method using sandpaper, a wrapping paper or the like can be used.

As the chemical polishing, a method such as an immersion method for immersing the optical wiring in a solution that can dissolve the optical wiring can be used. Specifically, if the optical wiring is a quartz optical fiber, a method for immersing the optical wiring in a strong alkali solution such as KOH, a strong acid solution such as HF, or the like that can dissolve the cladding comprising quartz glass, or the like can be used.

In the optical transmission structural body, the optical wiring may be subjected to a surface modification processing. If the optical wiring is subjected to the surface modification processing, the adhesion to the other optical component such as a ferrule is improved similarly to the instance in which the roughened surface is formed on the optical wiring.

The shape of the optical waveguide 1194 in the optical transmission structural body 1190 shown in FIG. 6 is equal to the structure of the optical waveguide 1104 in the optical transmission structural body 1100 shown in FIG. 1. However, in the optical transmission structural body in which the roughened surface is formed on the portion other than the portion connected to the core part of the optical waveguide on the surface of the optical wiring, the optical waveguide may have the shape shown in one of FIGS. 2 to 5 or the other shape.

The optical transmission structural body shown in each of FIGS. 1 to 6 is constituted such that the core of the optical wiring is connected to the core part of the optical waveguide. In the optical transmission structural body according to the first aspect of the first group of the present invention, the core of the optical wiring is not always, directly connected to the core part of the optical waveguide as long as the optical transmission structural body is constituted to be able to transmit the optical signal between the optical wiring and the optical waveguide. Therefore, the optical transmission structural body according to the first aspect of the first group of the present invention may have a structure shown in FIG. 7.

Figure 7:
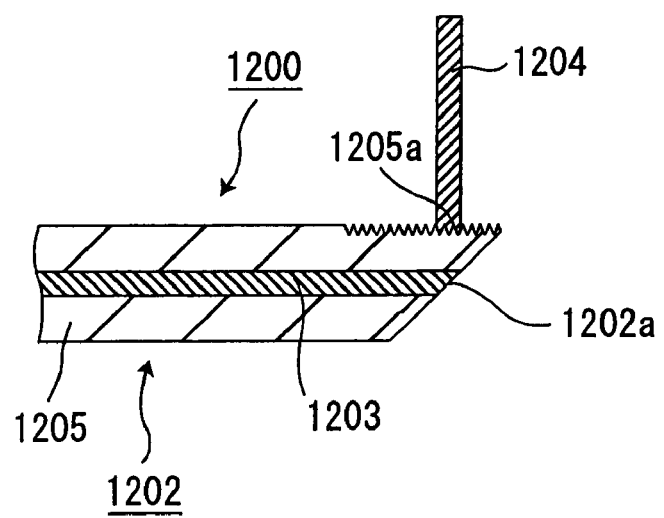
FIG. 7 is a partly cross-sectional view schematically showing yet another embodiment of the optical transmission structural body according to the first aspect of the first group of the present invention.

FIG. 7 is a partly cross-sectional view schematically showing yet another embodiment of the optical transmission structural body according to the first aspect of the first group of the present invention.

In an optical transmission structural body 1200 shown in FIG. 7, one end surface 1202*a* of an optical wiring 1202 is shaped to be able to function as a mirror. Therefore, the optical transmission structural body 1200 is constituted such that a core 1203 of the optical wiring 1202 is not directly connected to a core part 1204 of an optical waveguide, and such that an optical signal can be transmitted through a cladding 1205. In addition, a portion 1205*a* of a cladding 1205 of the optical wiring 1202 connected to the core part 1204 of the optical waveguide and a neighborhood of the portion 1205*a* are not specially subjected to a planarization processing or surface roughness Ra of the portion 1205*a* and that of the neighborhood of the portion 1205*a* based on JIS B 0601 are 0.1 μm or more.

In the optical transmission structural body constituted as described above, the optical signal can be preferably transmitted between the core of the optical wiring and the core part of the optical waveguide through the cladding of the optical wiring. In such an optical transmission structural body, the cladding of the optical wiring is made of a material excellent in optical signal transmissivity.

Further, in the optical transmission structural body according to the first aspect of the first group of the present invention, a length of the optical waveguide connected to the optical wiring is not limited to a specific length, and does not always need to be a length to a certain degree as shown in the optical waveguides shown in FIGS. 1 to 7.

Figure 40:
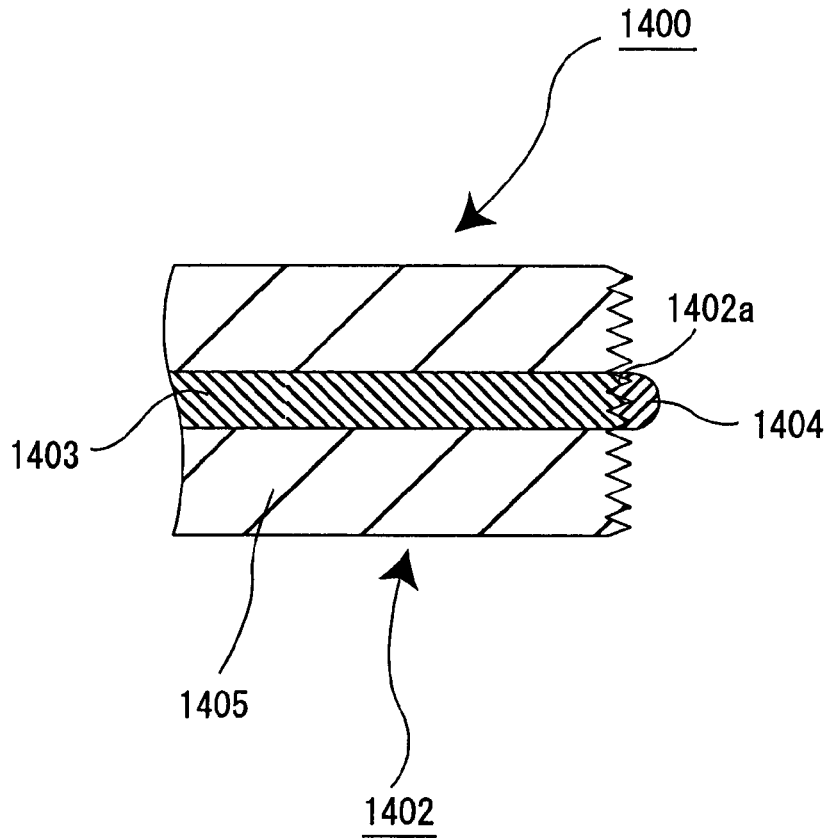
FIG. 40 is a partly cross-sectional view schematically showing another embodiment of the optical transmission structural body according to the first aspect of the first group of the present invention.

FIG. 40 is a partly cross-sectional view schematically showing another embodiment of the optical transmission structural body according to the first aspect of the first group of the present invention.

In an optical transmission structural body 1400 shown in FIG. 40, a semispherical optical waveguide 1404 that can function as a lens is connected to an end surface 1403*a* of a core 1403 of an optical wiring 1402. As can be seen, in the optical transmission structural body according to the first aspect of the first group of the present invention, the optical waveguide that can function as a lens may be directly connected to the optical wiring.

In FIG. 40, reference symbol 1405 represents a cladding.

Further, in the optical transmission structural body according to the first aspect of the first group of the present invention, the portion of the optical wiring connected to the core part of the optical waveguide is not specially subjected to a planarization processing or a surface roughness Ra of the portion based on JIS B 0601 is 0.1 μm. Irregularities are normally present in this portion. The optical transmission structural body according to the first aspect of the first group of the present invention may be constituted to include such an optical wiring, the optical waveguide may be formed only in a concave portion of the end surface of the core of the optical wiring.

In the optical transmission structural body shown in each of FIGS. 1 to 7 and FIG. 40, the optical wiring that constitutes the optical transmission structural body comprises the core and the cladding. The optical wiring that constitutes the optical transmission structural body according to the first aspect of the first group of the present invention may have a coating layer formed on a circumference of an end of the optical waveguide on the side on which the core part of the optical waveguide is connected.

Figure 8:
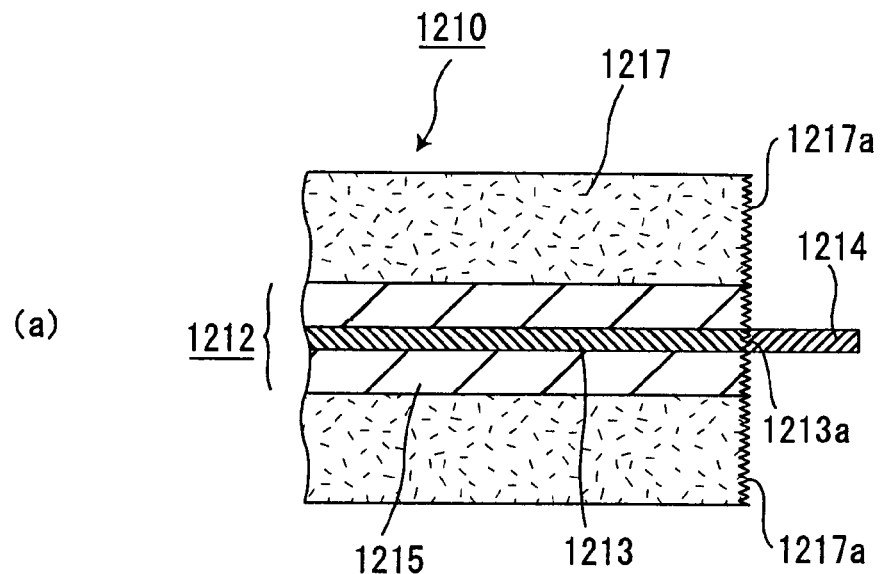
FIGS. 8(a) and 8(b) are partly cross-sectional views each schematically showing yet another embodiment of the optical transmission structural body according to the first aspect of the first group of the present invention.
Figure 8:
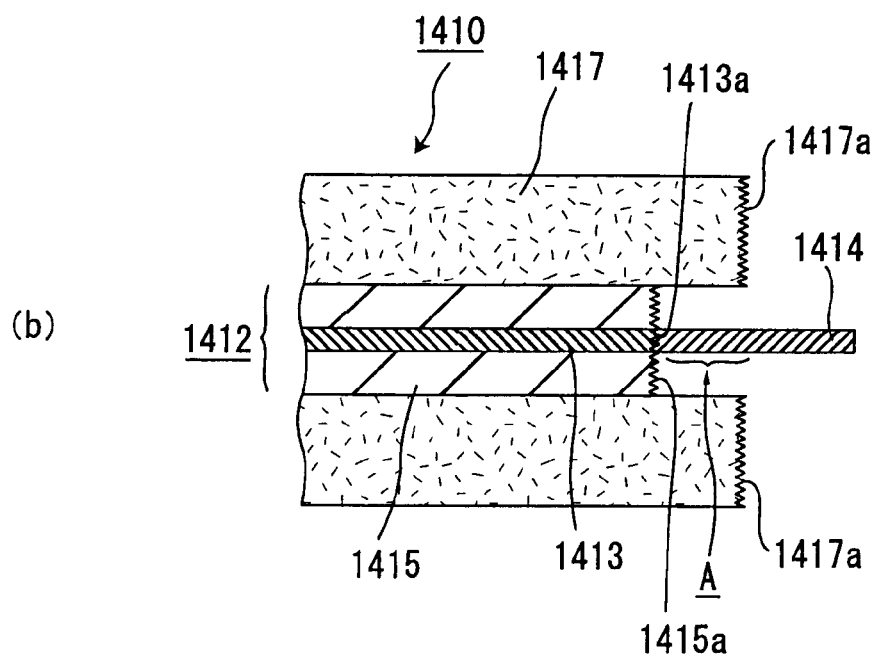

The optical transmission structural body having the coating layer formed on the circumference of the optical wiring will now be described with reference to the drawings. FIGS. 8(a) and 8(b) are partly cross-sectional views each schematically showing yet another embodiments of the optical transmission structural body according to the first aspect of the first group of the present invention.

In an optical transmission structural body 1210 shown in FIG. 8(a), a core 1213 of an optical wiring 1212 is directly connected to a core part 1214 of an optical waveguide, and a coating layer 1217 is formed on a circumference of an end of the optical wiring 1212 on a side on which the core part 1214 of the optical waveguide is connected. It is noted that the optical transmission structural body 1210 is equal in configuration to the optical transmission structural body 1100 shown in FIG. 1 except that the coating layer 1217 is formed. In FIG. 8(a), reference symbol 1215 represents a cladding.

Since the coating layer is formed in such a portion, the optical transmission structural body 1210 is more excellent in mechanical strength. This reason will next be described briefly with reference to the drawing.

Figure 13:
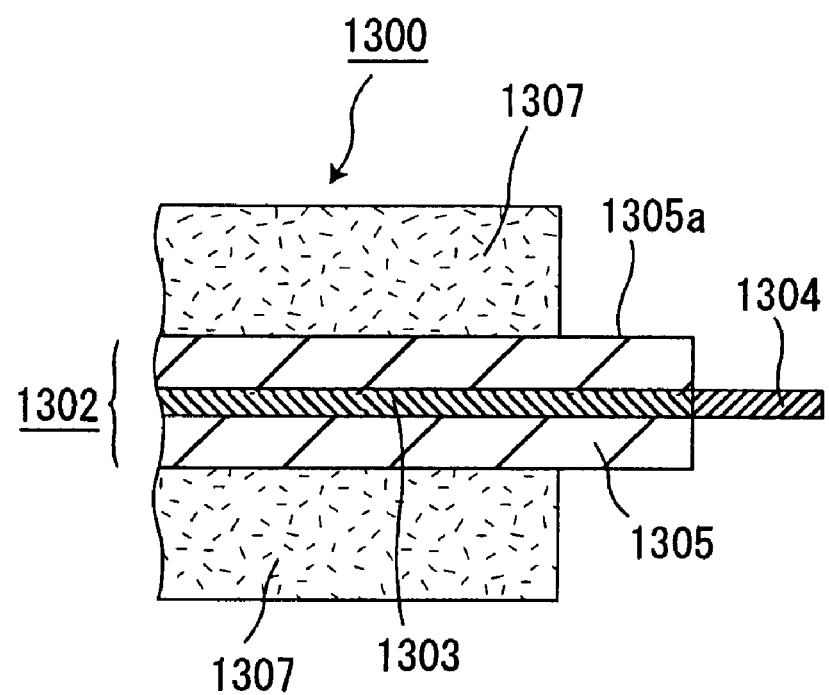
FIG. 13 is a partly cross-sectional view schematically showing another embodiment of a conventional optical transmission structural body.

FIG. 13 is a partly cross-sectional view schematically showing another embodiment of a conventional optical transmission structural body. In a conventional optical transmission structural body 1300 shown in FIG. 13, even if a coating layer is formed on a circumference of an optical wiring, no coating layer is formed on a circumference 1305a of a portion of the optical wiring 1302 which is connected to a core part 1304 of an optical waveguide. Conventionally, when the core of the optical wiring is connected to the core part of the optical waveguide, it has been understood that it is necessary to carry out the planarization processing to the end surface of the optical wiring as described above. To carry out the planarization processing such as a polishing processing, it has been necessary to peel off the coating layer around the end surface of the optical wiring to thereby expose the core 1303 and a cladding 1305 for the planarization processing.

As can be understood, the optical transmission structural body in which the coating layer on the circumference of the portion of the optical wiring 1302 which portion is connected to the core part 1304 of the optical waveguide is peeled off tends to be bent at the portion 1305a from which this coating layer is peeled off when an external force is applied to the optical transmission structural body. This optical transmission structural body is inferior in mechanical strength to the optical transmission structural body 1210 in which the coating layer 1217 is formed on the circumference of the end of the optical wiring 1212 on the side on which the core part 1214 of the optical waveguide is connected shown in FIG. 8.

Furthermore, the optical transmission structural body having the coating layer formed on the circumference of the optical wiring may be an optical transmission structural body 1410 shown in FIG. 8(b) constituted so that: end surfaces (an end surface 1413a of a core 1413 and an end surface 1415a of a cladding 1415) of an optical wiring 1412 on a side on which a core part 1414 of an optical waveguide is connected are present inside of an end surface 1417a of a coating layer 1417, and so that the end surface of the optical wiring having the coating layer formed thereon may be concave.

In the optical transmission structural body 1410 having such a shape, a neighborhood (indicated by "A" in FIG. 8(b)) of a portion of the core part 1414 connected to the optical wiring can be protected to a certain degree. In this case, therefore, the optical transmission structural body is excellent in mechanical strength.

The embodiment of the optical transmission structural body shown in FIG. 8(b) is equal to the embodiment of the optical transmission structural body shown in FIG. 8(a) except that the end face thereof on the side for the connection to the core part of the optical waveguide exists at an inner side from the end face of the coating layer.

Furthermore, in the optical transmission structural body in which the coating layer is formed on the circumference of the end of the optical wiring on the side on which the core part of the optical waveguide is connected as shown in each of FIGS. 8(a) and 8(b), the end surface of the coating layer (represented by reference symbol 1217a in FIG. 8(a), and reference symbol 1417a in FIG. 8(b)) may be subjected to a planarization processing. However, it is desired that: the end surface of the coating layer is not specially subjected to the planarization processing, or a surface roughness Ra of the end surface of the coating layer based on JIS B 0601 is 0.1 μm or more.

Furthermore, the embodiments of the optical transmission structural body having the coating layer formed on the circumference of the optical wiring are not limited to those shown in FIGS. 8(a) and 8(b). If the coating layer is transparent (transparent to a communication wavelength light), for example, a position at which the core part of the optical waveguide is connected to the optical wiring may be on the surface of the coating layer. In this case, if a mirror is formed on the end surface of the optical wiring at a desired angle, the optical signal can be transmitted through the coating layer and this structural body can function as an optical transmission structural body.

In the optical transmission structural body shown in each of FIGS. 1 to 8, the air around the core part of the optical waveguide functions as the cladding part. In the optical transmission structural body according to the first aspect of the first group of the present invention, a cladding part comprising an organic material or the like may be formed around the core part of the optical waveguide. If the optical waveguide is constituted by the core part and the cladding part comprising the air, the core part is quite unstable per se, tends to be damaged, and is required to be dealt with quite carefully. Therefore, the optical transmission structural body is not so practical.

If the cladding part comprising the organic material or the like is formed around the core part, the organic material may be completely cured, semi-cured, or uncured. Desirably, the organic material is completely cured. This is because: if the organic material is semi-cured or uncured, the core part is unstable and should be dealt with quite carefully, similarly to the instance in which the cladding part is made of the air.

If the cladding part comprises the completely cured organic material, by contrast, the mechanical strength of the optical waveguide is improved.

Moreover, in the optical transmission structural body according to the first aspect of the first group of the present invention, the end surface of the optical waveguide at opposite side to the side on which the optical wiring is connected may be subjected to various end surface processings as described above. Alternatively, the other optical components may be directly connected to the end surface of the optical waveguide.

Specific examples of the instance in which the other optical component is directly connected to the end surface of the optical waveguide will be described with reference to the drawings.

Figure 9:
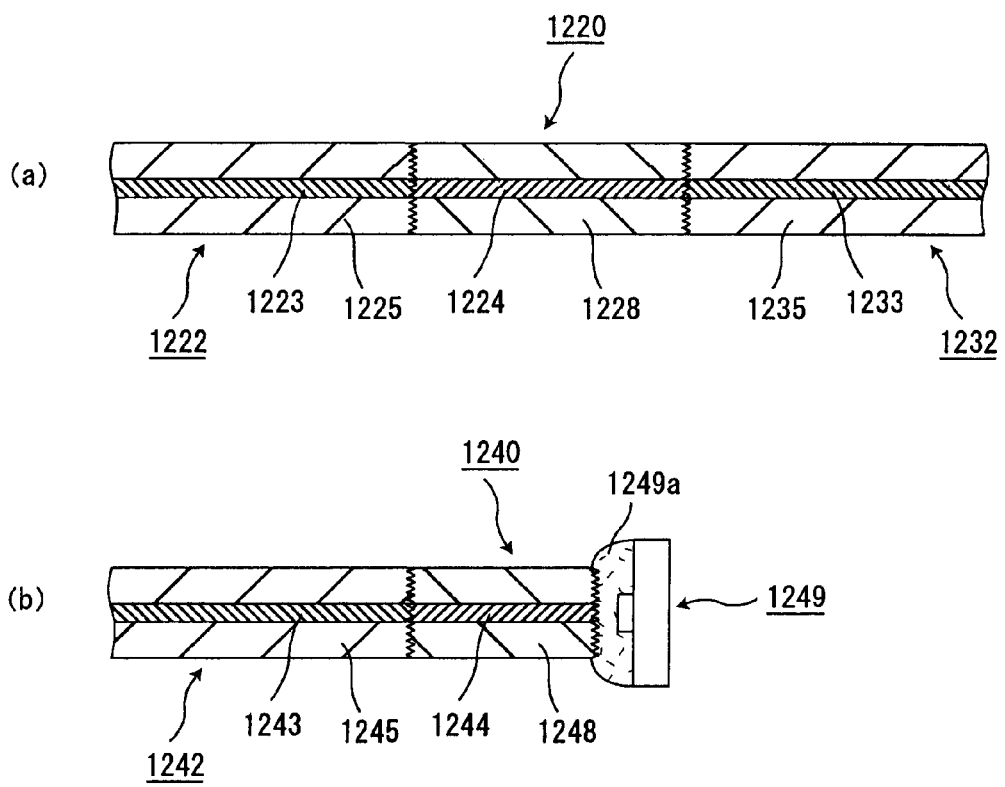
FIGS. 9(a) and 9(b) are partly cross-sectional views each schematically showing yet another embodiment of the optical transmission structural body according to the first aspect of the first group of the present invention.

FIGS. 9(a) and 9(b) are partly cross-sectional views each schematically showing yet another embodiments of the optical transmission structural body according to the first aspect of the first group of the present invention.

As shown in FIG. 9(a), in an optical transmission structural body 1220, an end of a core part 1224 of an optical waveguide on a opposite side to the side on which an optical wiring 1222 is connected is also connected to the other optical wiring 1232. In addition, a solidified cladding part 1228 is formed around the core part 1224.

In the optical transmission structural body 1220 constituted as described above, an optical signal can be preferably transmitted between the optical wiring 1222 and the optical wiring 1232 through the optical waveguide.

In this optical transmission structural body 1220, similarly to the above, at least one of portions of the optical wirings 1222 and 1232 which are connected to the core part 1224 of the optical waveguide is not specially subjected to a planarization processing, or a surface roughness Ra of at least one of the portions based on JIS B 0601 is 0.1 µm or more. In FIG. 9(a), reference symbols 1223 and 1233 represent cores, and 1225 and 1235 represent cladding parts.

As shown in FIG. 9(b), in an optical transmission structural body 1240, an end of a core part 1244 of an optical wiring at opposite side to a side on which an optical wiring 1242 is connected is connected to an optical element 1249. In addition, a solidified cladding part 1248 is formed around the core part 1244.

In the optical transmission structural body 1240 constituted as described above, if the optical element is a light receiving element, an optical signal transmitted through the optical wiring and the optical waveguide can be received by this light receiving element. If the optical element is a light emitting element, an optical signal transmitted from this light emitting element can be transmitted through the optical waveguide and the optical wiring. In FIG. 9(b), reference symbol 1243 represents a core and 1245 represents a cladding part.

Furthermore, in the optical transmission structural body 1240, a surface protection layer 1249a comprising resin is formed on a surface of the optical element 1249 on a side on which the optical element 1249 is connected to the optical waveguide 1244. A portion of this surface protection layer 1249a connected to the optical waveguide may not be specially subjected to a planarization processing. A material for the surface coating layer may be the same as a material for the core part or the cladding part.

As can be seen, in the optical transmission structural body according to the first aspect of the first group of the present invention, if the other optical component (including the optical wiring) is connected to the end surface of the optical waveguide at opposite side to the side on which the optical wiring is connected, then the portion of the optical component connected to the core part of the optical waveguide may not be specially subjected to the planarization processing, or a surface roughness Ra of the portion based on JIS B 0601 may be 0.1 µm or more. In this case, similarly to the above, the optical signal can be preferably transmitted between the optical element and the optical waveguide.

In the optical transmission structural body shown in each of FIGS. 9(a) and 9(b), the optical wiring or the optical element (the light receiving element or the light emitting element) is connected to the end of the optical waveguide at opposite side to the side on which the optical wiring is connected. However, the optical component that can be connected to the end of the optical waveguide is not limited to the optical wiring or the optical element but the other optical component can be connected thereto. Specific examples of the other optical component include optical components such as a lens, a prism, a filter and a mirror.

Furthermore, the optical component formed on the end surface of the optical waveguide on the side on which the optical waveguide is connected to the optical wiring is a optical component such as a lens, a prism, a filter or a mirror, an optical wiring or the like, the other optical waveguide may be connected to the optical component or the optical wiring so as to be able to transmit the optical signal between the other optical waveguide and the optical waveguide connected to the optical wiring through the optical component.

In addition, in the optical transmission structural body in which the optical component (the optical wiring, the optical element, the optical component or the like) is connected to the end of the optical waveguide at opposite side to the side on which the optical wiring of the core part is connected, a roughened surface may be formed on a portion other than the portion of the optical component which is connected to the core part.

This is because if the roughened surface is formed, adhesion is improved when the optical transmission structural body is attached to the other optical component through adhesive.

Figure 10:
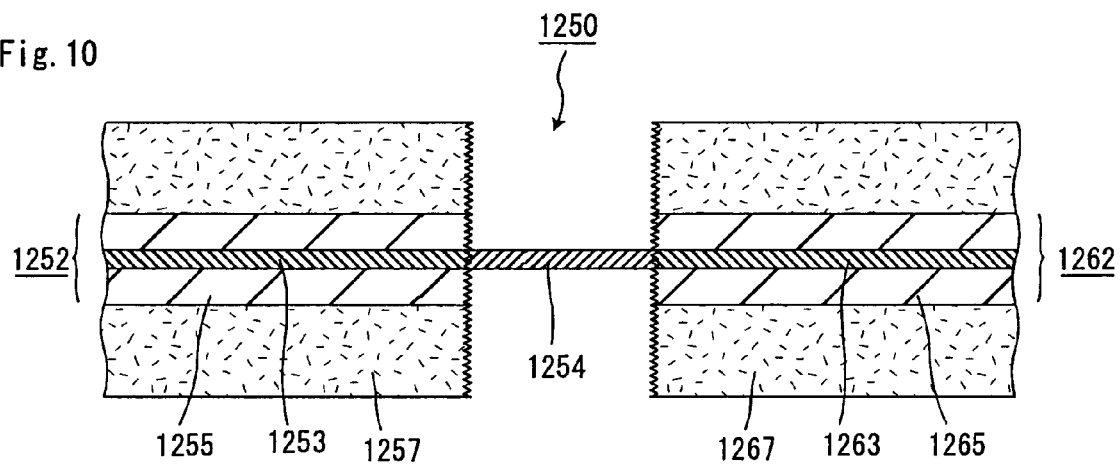
FIG. 10 is a partly cross-sectional view schematically showing yet another embodiment of the optical transmission structural body according to the first aspect of the first group of the present invention.

FIG. 10 is a partly cross-sectional view schematically showing yet another embodiment of the optical transmission structural body according to the first aspect of the first group of the present invention.

As shown in FIG. 10, in an optical transmission structural body 1250, optical wirings 1252 and 1262 are connected to both ends of an optical waveguide comprising a core part 1254, respectively. Coating layers 1257 and 1267 are formed on circumference of ends of the respective optical wirings 1252 and 1262 connected to the core part 1254 of the optical waveguide.

Since the coating layers 1257 and 1267 are formed, the optical transmission structural body 1250 constituted as described above is excellent in mechanical strength for the reasons described above. In FIG. 10, reference symbols 1253 and 1263 represent cores, and 1255 and 1265 represent cladding parts.

Various embodiments of the optical transmission structural body according to the first aspect of the first group of the present invention have been described so far with reference to the drawings. However, embodiments of the optical transmission structural body according to the first aspect of the first group of the present invention are not limited to these embodiments.

A method for manufacturing the optical transmission structural body will be described later in detail.

In addition, embodiments of the single optical transmission structural body have been described so far. A combination of a plurality of optical transmission structural bodies according to the first aspect of the first group of the present invention can be used. Specific embodiments of the combination of the optical transmission structural bodies will be described with reference to the drawings.

Figure 11:
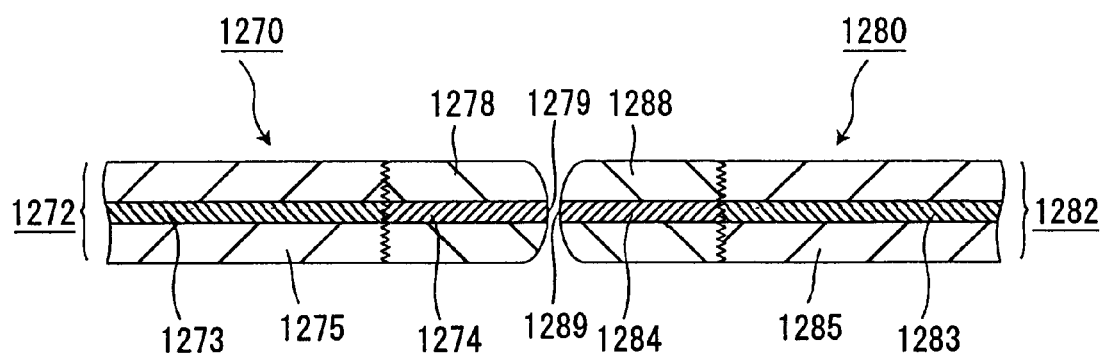
FIG. 11 is a partly cross-sectional view schematically showing an embodiment in which an optical signal is transmitted between the optical transmission structural bodies according to the first aspect of the first group of the present invention.

FIG. 11 is a partly cross-sectional view schematically showing an embodiment in which an optical signal is transmitted between the optical transmission structural bodies according to the first aspect of the first group of the present invention.

In the embodiment shown in FIG. 11, two optical transmission structural bodies 1270 and 1280 are arranged such that an optical signal can be transmitted between the optical transmission structural bodies 1270 and 1280, i.e., so that an end of an optical waveguide of one optical transmission structural body at opposite side to the side on which an optical wiring is connected is opposed to an end of an optical waveguide of the other optical transmission structural body.

It is noted that the optical transmission structural bodies 1270 and 1280 are equal in configuration to the optical transmission structural body shown in FIG. 2(*c*) except that solidified cladding parts 1278 and 1288 are formed around core parts 1274 and 1284 of the respective optical waveguides, and that lenses 1279 and 1289 are formed on end surfaces of core parts 1274 and 1284 of the respective optical waveguides at opposite side to the sides on which the optical waveguides are connected to optical wirings 1272 and 1283. In FIG. 11, reference symbols 1273 and 1283 represent cores, and 1275 and 1285 represent cladding parts.

In this embodiment, the optical signal can be preferably transmitted between the optical transmission structural bodies.

Further, even if a shape of the end surface of each core part is a curved surface which does not specially function as a lens and which is slightly curved, the optical transmission structural bodies are arranged such that the side of the optical waveguide of one optical transmission structural body on which the optical wiring is connected is opposed to the side of the optical waveguide of the other optical transmission structural body, as seen in the embodiment shown in FIG. 11. In addition, by causing these optical transmission structural bodies to press each other, interposition of airs having different optical refractive index can be minimized in a gap between the optical transmission structural bodies, the optical transmission structural bodies can efficiently contact each other in contact portions thereof, and the optical signal can be preferably transmitted between the optical transmission structural bodies.

If the both optical transmission structural bodies are arranged so as to be able to transmit the optical signal between them, it is not always necessary to form the lens on the end surface of one optical transmission structural body opposed to the other optical transmission structural body as shown in FIG. 11 but the end surface may have an arbitrary shape.

Figure 12:
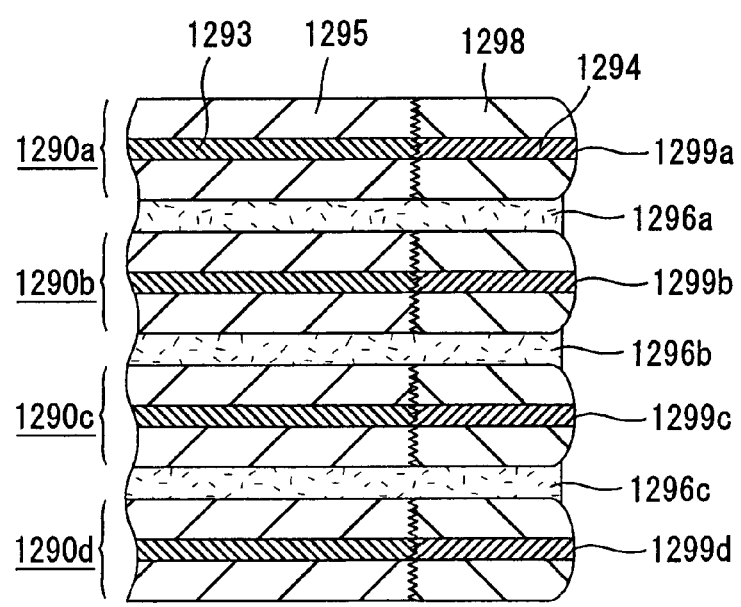
FIG. 12 is a partly cross-sectional view schematically showing an embodiment in which the optical transmission structural bodies according to the first aspect of the first group of the present invention are used while being arranged.

FIG. 12 is a partly cross-sectional view schematically showing an embodiment in which the optical transmission structural bodies according to the first aspect of the first group of the present invention are used while being arranged.

In the embodiment shown in FIG. 12, four optical transmission structural bodies 1290*a* to 1290*d* are arranged equidistantly, and lenses 1299*a* to 1299*d* are formed on ends of optical waveguides in the optical transmission structural bodies opposite to sides on which the optical waveguides are connected to optical wirings, respectively.

Resin layers 1296*a* to 1296*c* are formed in gaps between the optical transmission structural bodies and adjacent optical transmission structural bodies, respectively. The resin layers 1296*a* to 1296*c* fix the adjacent optical transmission structural bodies to one another. A material for the resin layers 1296*a* to 1296*d* may be either the same as or different from a material for a core part 1294 or a cladding part 1298. In addition, the layers 1296*a* to 1296*c* are not limited to resin layers but may be simply air layers or layers of an inorganic matter such as glass.

By employing optical transmission structural bodies in such an embodiment, the optical transmission structural bodies can function as an array-like optical transmission structural body capable of transmitting an optical signal on many paths simultaneously.

It is noted that each of the optical transmission structural bodies 1290*a* to 1290*d* is equal in configuration to the optical transmission structural body 1270 shown in FIG. 11. In FIG. 12, reference symbol 1293 represents a core and 1295 represents a cladding part.

In the embodiment shown in FIG. 12, portions of the optical wirings connected to the optical waveguides in all the optical transmission structural bodies 1290*a* to 1290*d* are uniform. However, the portions are not always uniform in the respective optical transmission structural bodies.

Figure 41:
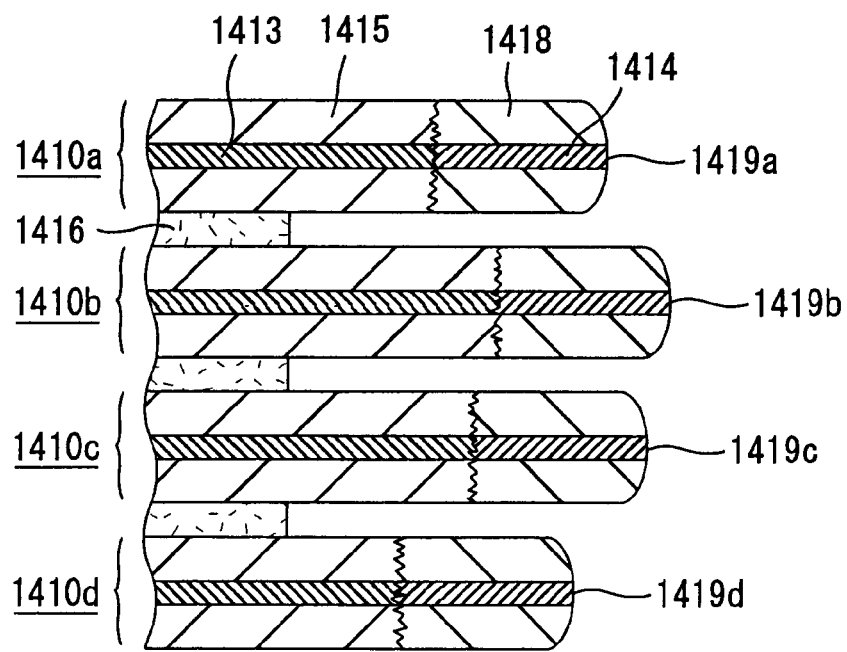
FIG. 41 is a partly cross-sectional view schematically showing another embodiment in which the optical transmission structural bodies according to the first aspect of the first group of the present invention are used while being arranged.

FIG. 41 is a partly cross-sectional view schematically showing another embodiment in which the optical transmission structural bodies according to the first aspect of the first group of the present invention are used while being arranged.

In the embodiment shown in FIG. 41, four optical transmission structural bodies 1410*a* to 1410*d* are arranged equidistantly, and lenses 1419*a* to 1419*d* are formed on ends of optical waveguides in the optical transmission structural bodies opposite to sides on which the optical waveguides are connected to optical wirings, respectively, similarly to the embodiment shown in FIG. 12.

Further, in the embodiment shown in FIG. 41, positions of interfaces between the optical wirings each comprising a core part 1413 and a cladding part 1415 and the optical waveguides each comprising a core part 1414 and a cladding part 1418 are not uniform. Shapes of the ends of the optical wirings on the sides on which the optical wirings are connected to the optical waveguide are not the same among the optical transmission structural bodies 1410*a* to 1410*d*.

In the embodiment shown in FIG. 41, a gap between one of the optical transmission structural bodies and the adjacent optical transmission structural body is constituted by a resin layer 1416 and an air layer. Specifically, the gap between each optical transmission structural body and the adjacent optical transmission structural body and the gap between a neighborhood of the end of each optical wiring on the side on which the optical wiring is connected and the adjacent optical wiring is constituted by the air layers, respectively. On the other hand, the gap between the adjacent optical wirings other than the neighborhoods of the ends thereof comprises the resin layer. It is noted that the resin layer fixes the adjacent optical wirings to each other.

Specific examples of the embodiment shown in FIG. 41 include an optical transmission structural body in which optical waveguides are connected to fibers of fiber ribbons (tape fibers) which are cut by a nipper, scissors, or the like, and from which coating layers near cut ends of the fiber ribbons are removed, respectively.

In the embodiments shown in FIGS. 12 and 41, all the optical waveguides have an equal length, an equal shape of an end surface, and the like. However, in embodiments in which the optical transmission structural bodies according to the first aspect of the first group of the present invention are used while being arranged, optical waveguides may differ in length, the shape of an end surface, and the like.

In the embodiments shown in FIGS. 12 and 41, the optical wirings are arranged equidistantly. However, in embodiments in which the optical transmission structural bodies according to the first aspect of the first group of the present invention are used while being arranged, optical wirings are not necessarily arranged equidistantly.

In the array-like optical transmission structural body that employs a plurality of optical transmission structural bodies according to the first aspect of the first group of the present invention, the adjacent optical transmission structural bodies need not necessarily fixed to each other by the resin layer. The respective optical transmission structural bodies may be fixed to substrates in which a plurality of V-grooves are formed, and may function as the array-like optical transmission structural body in this state.

In each of the array-like optical transmission structural bodies shown in FIGS. 12 and 41, the lens is formed on the end surface of the optical waveguide at opposite side to the side on which the optical wiring is connected. However, in the array-like optical transmission structural body, the end surface may not be lens-shaped but may be subjected to an end surface processing or an optical component or the like may be connected to the end surface.

An optical waveguide formation method according to a second aspect of the first group of the present invention will be described hereinafter.

The optical waveguide formation method according to the second aspect of the first group of the present invention is an optical waveguide formation method which comprising steps of:

immersing a part of an optical wiring in a photosensitive composition;

irradiating light into the above-mentioned photosensitive composition through the above-mentioned optical wiring; and forming a core part corresponding to an optical path of light in the above-mentioned photosensitive composition, wherein a portion of the above-mentioned optical wiring, the portion being connected to the core part of the above-mentioned optical waveguide, is not specially subjected to a planarization processing or has a surface roughness Ra based on JIS B 0601 of 0.1 μm or more.

With the optical waveguide formation method according to the second aspect of the first group of the present invention, even if the portion of the optical waveguide connected to the core part of the optical wiring for irradiating the photosensitive composition with the light is not specially subjected to the planarization processing or has the surface roughness Ra based on JIS B 0601 of 0.1 μm or more, the core part excellent in connection performance with the optical wiring can be formed.

Accordingly, the portion connected to the core part of the optical wiring can be formed by cutting the portion using a cutting tool normally used for cutting an electric wiring or the like, or using an arbitrary cutting method (e.g., snapping the portion by the hand) without the cutting tool even if a highly accurate end surface processing is not carried out. Thus, the formation method according to the second aspect of the first group of the present invention can simplify an optical waveguide formation step. Besides, since the formation step can be simplified, the method is economically advantageous.

As already described with respect to the optical transmission structural body according to the first aspect of the first group of the present invention, if the surface roughness Ra of the end surface of the optical wiring is set at less than 0.1 μm, a complicated polishing processing is required. If the optical fiber is cut by using the fiber cleaver, the surface roughness Ra of the end surface of the optical fiber can be set at less than 0.1 μm. However, if a cutting operation using the fiber cleaver is carried out, yield is deteriorated and the operation itself requires skill to a certain degree.

The optical waveguide formation method according to the second aspect of the first group of the present invention, by contrast, does not require the above-mentioned complicated polishing processing, and can simplify the step. The formation method is also economically advantageous.

By using this optical waveguide formation method according to the second aspect of the first group of the present invention, the optical transmission structural body according to the first aspect of the first group of the present invention in which the optical wiring is connected to the optical waveguide can be preferably manufactured.

In the optical waveguide formation method according to the second aspect of the first group of the present invention, it is desirable that a photosensitive composition to be used includes a component which is cured when being photosensitized, i.e., contains a photocurable resin. This is because the resin is cured by being irradiated with the light and stably present without a core part formed being mixed with surroundings.

The photosensitive composition will refer to the photosensitive composition containing the photocurable resin hereinafter unless specified otherwise.

The optical waveguide formation method according to the second aspect of the first group of the present invention will be described with reference to the drawings.

In the drawings for describing the formation method according to the second aspect of the first group of the present invention, the portion of the optical wiring connected to the core part is shown to be plane. However, the drawings typically depict the formation method. As already described, the portion of the optical wiring connected to the core part is not specially subjected to the planarization processing or has the surface roughness Ra based on JIS B 0601 of 0.1 μm or more.

Figure 14:
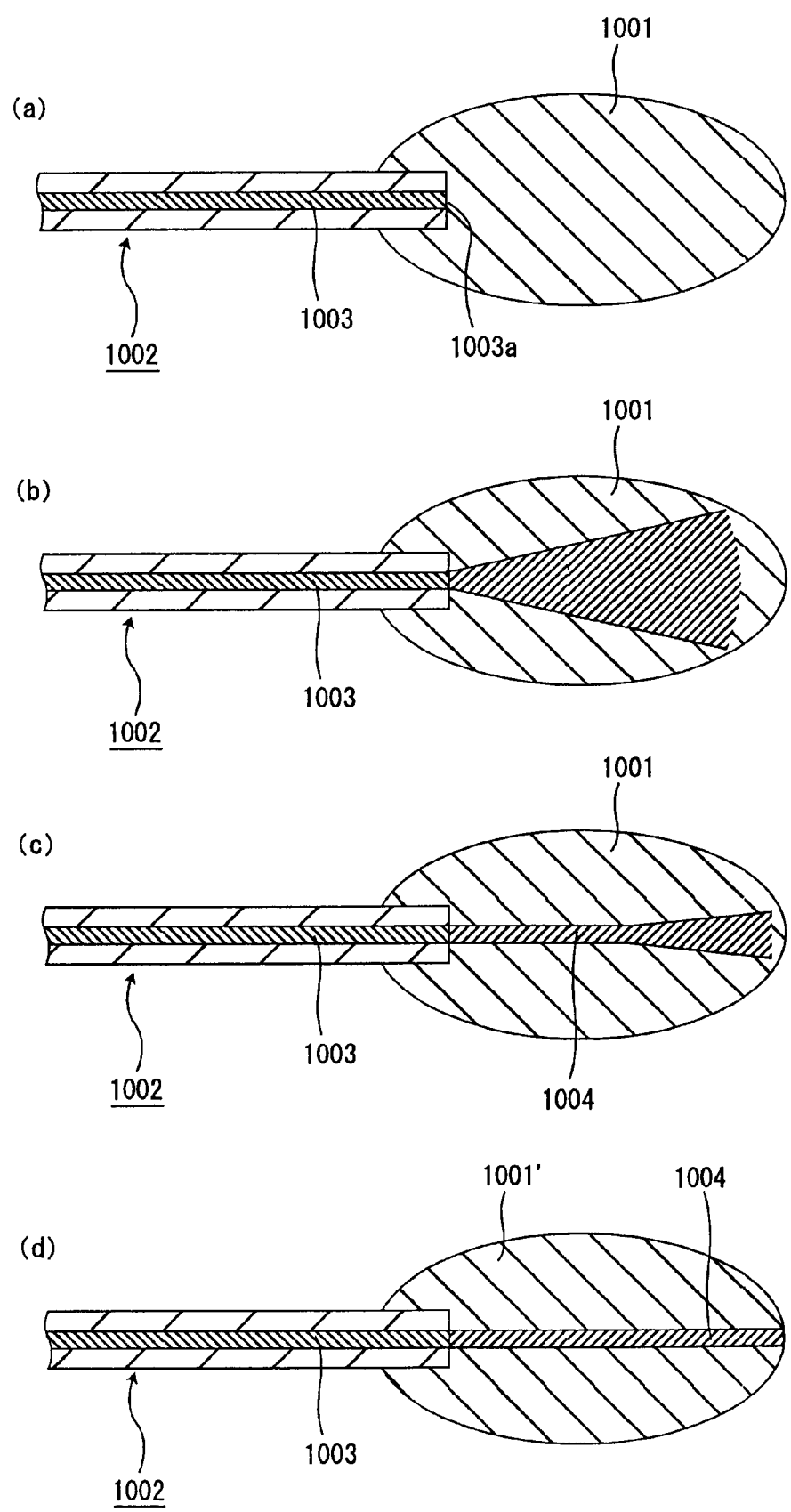
FIGS. 14(a) to 14(d) are schematic diagrams for describing one example of an optical waveguide formation method according to the second aspect of the first group of the present invention.

FIGS. 14(*a*) to 14(*d*) are schematic diagrams for describing one example of the optical waveguide formation method according to the second aspect of the first group of the present invention.

In the optical waveguide formation method according to the second aspect of the first group of the present invention, one end of an optical wiring is immersed in a photosensitive composition, and light is irradiated to the photosensitive composition through this optical wiring, thereby forming a core part corresponding to an optical path and providing an optical waveguide.

Examples of the optical wiring may include the same optical wiring that constitutes the optical transmission structural body according to the first aspect of the first group of the present invention.

Specifically, a photosensitive composition 1001 is coated so as to surround a portion of an optical wiring 1002 connected to a core part (see FIG. 14(*a*)), the photosensitive composition 1001 is put in a container, and one end of the optical wiring is immersed in the photosensitive composition 1001.

Optical refractive indexes of the photosensitive composition before and after curing are not limited to specific indexes. Desirably, however, a lower limit the optical refractive index of the cured photosensitive composition (the optical refractive index of the core part) is 90% of that of the portion of the optical wiring connected to the core part, and an upper limit thereof is 110% of the portion of the optical wiring connected to the core part.

By using the photosensitive composition that can form the core part having the optical refractive index in such a range, the core part excellent in connection performance with the optical wiring can be formed even if the portion of the optical wiring connected to the core part has the surface roughness in the above-mentioned range.

The lower limit of the optical refractive index of the core part is more desirably 95% of that of the portion of the optical wiring connected to the core part, most desirably 98%. The upper limit of the optical refractive index of the core part is more desirably 105% of that of the portion of the optical wiring connected to the core part, further desirably 102%.

The reason that it is desirable to form the core part having the optical refractive index in such a range is as follows. If the optical waveguide connected to the optical wiring is formed using the formation method according to the second aspect of the second group of the present invention, the optical transmission structural body in which the optical wiring is connected to the optical waveguide is excellent in optical signal transmission performance.

A specific return loss in case the core part (optical waveguide) having the optical refractive index in the above-mentioned range is formed is already described with respect to the optical transmission structural body according to the first aspect of the first group of the present invention.

The optical refractive index of the core of the optical wiring differs depending on a material. The optical refractive index $n_D$ of pure quartz glass is about 1.46. Therefore, if the pure quartz glass is used for the optical wiring, the optical refractive index $n_D$ of the core of the optical wiring after the photosensitive composition is cured is desirably in a range of about 1.31 to 1.61. The optical refractive index $n_D$ means an optical refractive index of the core when a light having a bright line Na of 589 nm is caused to pass.

In addition, the optical refractive index of resin or the like used for the optical wiring and the optical waveguide changes depending on a wavelength. However, a ratio (of the optical refractive index of the core part of the optical waveguide to that of the core of the optical wiring) hardly changes in an ultraviolet range to a near-infrared range.

Furthermore, in the formation method according to the second aspect of the first group of the present invention, it is desirable that the core part formed by photosensitizing the photosensitive composition has the optical refractive index falling within the above-mentioned range, and that the optical refractive index of the core part before photosensitizing the photosensitive composition, i.e., that of the photosensitive composition itself desirably falls within the following range.

A lower limit of the optical refractive index of the photosensitive composition itself is desirably 90% of that of the portion of the optical wiring connected to the core part of the optical waveguide, more desirably 95%, most desirably 98%. An upper limit of the optical refractive index of the photosensitive composition itself is desirably 110% of that of the portion of the optical wiring connected to the core part of the optical waveguide, more desirably 105%, most desirably 102%.

This is because: if the optical refractive index of the core part before photosensitizing the photosensitive composition falls within the above-mentioned range, and if the photosensitive composition is irradiated with light through the optical wiring, then it is ensured that this light is irradiated in a desired direction, and the light is not scattered on an interface between the optical wiring and the photosensitive composition.

If the core part before and after photosensitization has the optical refractive indexes in the above-mentioned ranges, respectively, it is possible to form an optical waveguide connected to the optical wiring, which is not subjected to a highly accurate end surface processing, with higher reliability.

Furthermore, there is the other reason that it is desirable that the core part has the refractive indexes in the above-mentioned ranges in the formation method according to the second aspect of the first group of the present invention.

The reason will be described briefly with reference to the drawings.

Figure 42:
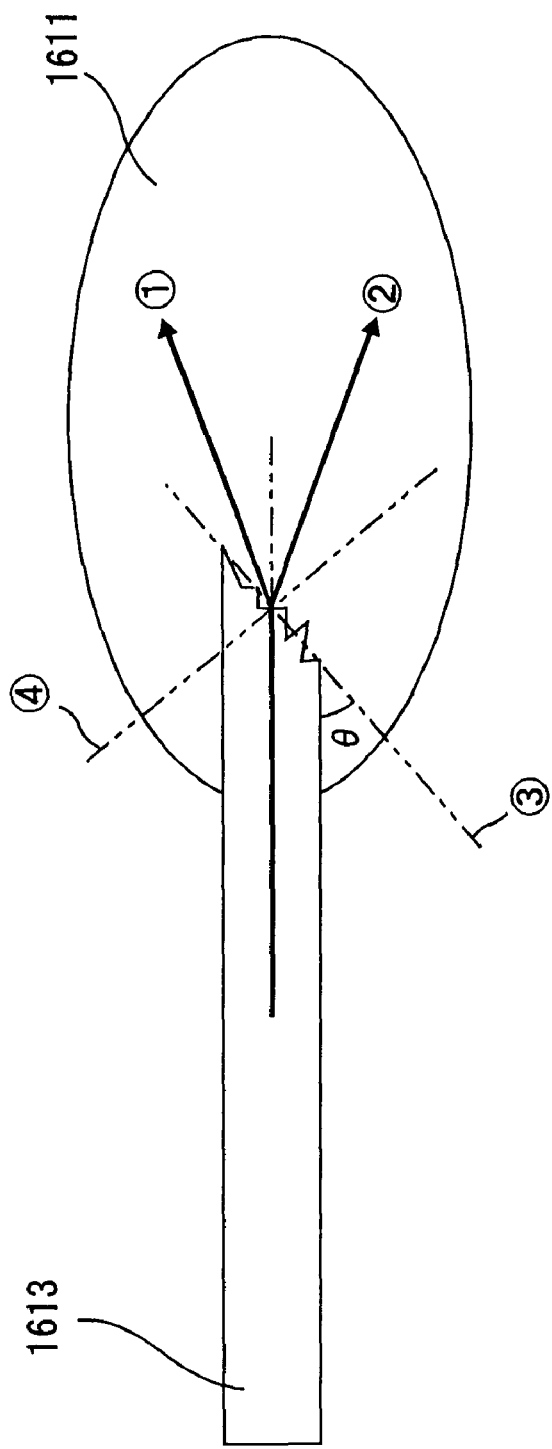
FIG. 42 is an illustration for describing an optical path of light irradiated to a photosensitive composition through a facet of an optical wiring in the optical waveguide formation method according to the second aspect of the first group of the present invention.

FIG. 42 is an illustration for describing an optical path of light irradiated to a photosensitive composition through a facet of an optical wiring in the optical waveguide formation method according to the second aspect of the first group of the present invention.

Generally, if the end surface of the optical wiring such as an optical fiber is not specially subjected to a planarization processing, it is unlikely that a centerline of the end surface (represented by ③ in FIG. 42) is perpendicular to an optical axis.

Normally, it is considered that an angle θ (see FIG. 42) between the centerline of the end surface of the optical wiring and the optical axis is at least an angle other than 90°. The angle is unavoidably an arbitrary value. In this case, if there is an optical refractive index difference between the core of the optical wiring and the core part of the optical waveguide, and if the light is irradiated to the photosensitive composition in the formation method according to the second aspect of the second group of the present invention, the optical path of the irradiated light is bent in an arbitrary direction. As a result, the core part of the optical waveguide is formed to be bent at an arbitrary angle corresponding to the optical path.

Generally, if the optical path is considered an optical path approximately to the Snell's law, the optical path of the irradiated light is bent in a direction indicated by ① in FIG. 42 at θ>90° and (the optical refractive index of the core of the optical wiring)>(the optical refractive index of the core part of the optical waveguide). The optical waveguide is bent in a direction indicated by ② in FIG. 42 at θ<90° and (the optical refractive index of the core of the optical wiring)<(the optical refractive index of the core part of the optical waveguide). In FIG. 42, ④ represents a normal line of the centerline.

As described above, if a bending angle is irregular, the formation method according to the second aspect of the first group of the present invention can be applicable to any optical refractive index. However, the core part of the optical waveguide eventually formed is formed in a predetermined arbitrary direction, and characteristic values of final optical waveguide components are irregular.

The reason is as follows. The bending angle can take various values with respect to the arbitrary angle θ between the centerline and the optical axis for the optical wiring which is not specially subjected to the planarization processing. Therefore, the bending angle cannot be specified to a certain angle.

This disadvantage can be solved by the center line of the end surface of the optical wiring which is not specially subjected to the planarization processing so as to set the angle of the center line with respect to the optical axis at 90° by simple polishing. The "simple polishing" may be polishing for setting the Ra of the end surface at 0.1 μm or more. This is because this polishing can greatly simplify a polishing step as compared with conventional polishing using fine grinder powders.

To solve the disadvantage, another method for reducing the optical refractive index difference between the core of the optical wiring and the core part of the optical waveguide while using the optical wiring which is not specially subjected to the planarization processing can be used. Accordingly, for this reason, it is desirable that the optical refractive index falls within the above-mentioned range.

Specifically, on assumption that the angle θ is 45°, a possible bending angle while the optical refractive index of the core of the optical wiring is set at 1.48 will be described. If the optical refractive index of the core part of the optical waveguide is 90 to 110% of that of the core of the optical wiring, a core part formation direction is bent arbitrarily between 6.8° to −5.0°. If the optical refractive index of the core part of the optical waveguide is 95 to 105% of that of the core of the optical wiring, the core part formation direction is bent arbitrarily between 3.1° to −2.7°. If the optical refractive index of the core part of the optical waveguide is 98 to 102% of that of the core of the optical wiring, the core part formation direction is bent arbitrarily between 1.2° to −1.1°. It is assumed herein that the bending angle in the direction indicated by ① shown in FIG. 42 is a positive value.

As can be understood, if the optical refractive index difference between the core of the optical wiring and the core part of the optical waveguide is smaller, then the bending angle is narrower, and the irregularities of the characteristic values of the final optical waveguide components are smaller.

The photosensitive composition is not limited to a specific photosensitive composition as long as a photosensitive composition has a basic characteristic as an optical waveguide, that is, transmissivity relative to light in a desired wavelength band and has the optical refractive index in the above-mentioned range. Specific examples of the photosensitive composition may include compositions which contain acrylic resins, such as PMMA (polymethyl methacrylate), PMMA deuteride, PMMA deuteride fluoride, and PMMA fluoride, and which also contain various additives, solvents, and the like such as a monomer, a photo polymerization initiator, and an intensifier if it is necessary.

Examples of the photosensitive composition also may include compositions each containing, as a photosensitized resin component, silicone resin such as epoxy resin, epoxy resin fluoride, polyolefin resin, or silicone resin deuteride, benzocyclobutene, or the like, and also containing various additives, solvents, and the like such as a monomer, a photo polymerization initiator, and an intensifier if it is necessary.

Examples of a method for photosensitizing the resin component may include a method for adding an acrylic group or an acryloyl group to a terminal or a side chain of the resin component, and the like.

Further, a material which contains a polyene compound having an acrylic group or an acryloyl group added to a terminal or side chain of a molecule, a polythiol compound, and a photo polymerization initiator, as well as various additives, solvents, and the like such as a monomer, a photo polymerization initiator, and an intensifier if it is necessary, can be used as the photosensitive composition.

In the present specification, it is assumed that the photosensitive composition consisting of an organic composition includes not only a polymer having a chemical reaction when being irradiated with a light as described above but also a monomer a photo polymerization reaction of which progresses when being irradiated with the light, such as methyl methacrylate, and those both/either of two or more resin components and two or more monomers that have a chemical reaction when being irradiated with the light and that form a resin complex.

It suffices that the photosensitive composition used for the formation method according to the second aspect of the first group of the present invention is a photosensitive composition a curing reaction of which progresses when the composition is irradiated with the light. For example, the photosensitive composition may contain epoxy resin, and a photoinitiator which generates a Lewis acid when being irradiated with the light such as an aromatic diazonium salt or an aromatic iodonium salt. Further, the photosensitive composition may contain a photoinitiator which generates radicals when being irradiated with the light such as benzoin alkyl ether, an acetophenone derivative, benzophenone, or a benzophenone derivative, and contain a resin component polymerization of which progresses by a radical polymerization mechanism, or may contain a photoinitiator from which strong acid is let loose when being irradiated with the light such as chlorinated acetophenone or a chlorinated acetophenone derivative, and contain a resin component polymerization of which progresses by an acid.

In the present specification, therefore, a composition in which even if the resin component does not include a photosensitive functional group, the curing reaction progresses when being irradiated with a light, will be referred to as a photosensitive composition.

Furthermore, the photosensitive composition used for the optical waveguide formation method may be a mixture of two or more photosensitive compositions.

The photosensitive composition may further contain particles such as resin particles, inorganic particles, or metal particles.

By forming the optical waveguide using the photosensitive composition containing such particles, the thermal expansion coefficient of the optical wiring can be matched to that of the optical waveguide.

Examples of the resin particles include those of thermosetting resin, thermoplastic resin, photosensitive resin, resin obtained by photosensitizing a part of thermosetting resin, a resin complex of thermosetting resin and thermoplastic resin, and a complex of photosensitive resin and thermoplastic resin.

Specifically, examples of the resin particles may include those of thermosetting resin such as epoxy resin, phenol resin, polyimide resin, bismaleimide resin, polyphenylene resin, polyolefin resin, and fluororesin; resin obtained by reacting the thermosetting groups (e.g., the epoxy group of the epoxy resin) of these thermosetting resins with a methacrylic acid or an acrylic acid to thereby acrylate it; thermoplastic resin such as phenoxy resin, polyethersulfone (PES), polysulfone (PSF), polyphenylenesulfone (PPS), polyphenylene sulfide (PPES), polyphenyl ether (PPE), and polyetherimide (PI); and photosensitive resin such as acrylic resin.

Further, a resin complex of the thermosetting resin and the thermoplastic resin, or a resin complex of the acrylated resin, the photosensitive resin, and the thermoplastic resin can be used.

As the resin particles, rubber-comprising resin particles can be also used.

Examples of the inorganic particles may include those of aluminum compounds such as alumina and aluminum hydroxide, calcium compounds such as calcium carbonate and calcium hydroxide, potassium compounds such as potassium carbonate, magnesium compounds such as magnesia, dolomite, basic magnesium carbonate, and silicon compounds such as silica and zeolite.

As the inorganic particles, those comprising phosphorus or phosphorus compounds can be also used.

Examples of the metal particles may include those comprising gold, silver, copper, palladium, nickel, platinum, iron, zinc, lead, aluminum, magnesium and calcium.

These resin particles, inorganic particles and metal particles may be used alone or in combination of two or more of them.

The shapes of the particles are not limited to specific shapes and the particles may be spherical, elliptic, crushed form, polygonal or the like. Among these shapes, the spherical or elliptic particles are desirable. Since the spherical or elliptic particles have no edges, cracks and the like is less likely to occur to the optical waveguide.

The particle diameter of each particle is desirably smaller than a communication wavelength. When the particle diameter is larger than the communication wavelength, the transmission of the optical signal is hampered in some cases.

In the present specification, the particle diameter of the particle refers to a length of a longest part of the particle.

If the photosensitive composition contains particles, a lower limit of a blending ratio of the particles after the photosensitive composition is cured is desirably 10% by weight, more desirably 20% by weight. An upper limit of the blending ratio the particles after the photosensitive composition is cured is desirably less than 80% by weight, more desirably 70% by weight. If the blending ratio of the particles is less than 10% by weight, an advantage of blending the particles cannot be greatly acquired. If it exceeds 80% by weight, transmission of the optical signal is often hampered.

The photosensitive composition is cured when being irradiated with light, and provided as the core part having the optical refractive index within the specific range as described above.

Therefore, in the formation method according to the second aspect of the first group of the present invention, the photosensitive composition may be selected and used so that the core part has the optical refractive index within the above-mentioned range. However, even if the photosensitive composition having an optical refractive index out of this range is used, the photosensitive composition can be used by adjusting the optical refractive index. If the optical refractive index of the photosensitive composition is to be adjusted, it is desirable to adjust it so that the optical refractive index of the core part after the photosensitive composition is cured falls within the above-mentioned range.

Generally, if a ratio of a molecular refraction to a molecular volume is higher, the optical refractive index of a polymer is higher. Therefore, by adjusting the molecular refraction and/or the molecular volume, the optical refractive index of the polymer can be adjusted.

Specifically, in case the molecular refraction (a sum of atomic refractions of individual groups that constitute a cyclical unit of the high polymer) is adjusted, a group having a high polarizability such as chlorine or sulfur is introduced, then the atomic refraction becomes higher, and the molecular refraction can be, therefore, increased.

Also, if a double-bond group or an aromatic ring group is introduced to lower symmetry of molecules, the polarizability can be increased.

In adjustment of density, the density can be increased by reducing a molecular weight between bridge points.

Furthermore, since fluorine is large in volume relative to its polarizability, the density can be also increased by introducing a fluorine-containing group.

In addition, one end surface 1003a of the core of the optical wiring 1002 used in the second aspect of the first group of the present invention may not be specially subjected to the planarization processing such as the polishing processing. In this case, a surface roughness Ra of the end surface based on JIS B 0601 is not limited to a specific roughness. Nevertheless, it is unlikely that the surface roughness Ra of the end surface is set at less than 0.1 μm without carrying out any planarization processing to the end surface. Normally, therefore, the surface roughness Ra of the end surface is at least 0.1 μm or more.

Further, if the fiber array or the like is manufactured, a cutting processing or the like is necessary. Therefore, according to the second aspect of the first group of the present invention, the planarization processing such as a simple polishing processing may be often carried out. In that case, there is no need to carry out an accurate polishing processing so as to set the surface roughness Ra of the end surface at less than 0.1 μm. The cutting processing using a fiber cutter or the like is a kind of the planarization processing for the end surface.

Therefore, according to the second aspect of the first group of the present invention, the cutting processing is included in the planarization processing.

According to the second aspect of the first group of the present invention, if the end surface of the optical wiring is subjected to the planarization processing, the polishing processing may be carried out so that the surface roughness Ra of at least the end surface of the optical wiring is set at 0.1 μm or more. In addition, the surface roughness Ra of the end surface of the optical wiring after the polishing processing may be 1 μm or more. This is because the polishing processing can be carried out more easily at a lower cost. The portion having such a surface roughness is also excellent in connection performance with the core part formed substantially in an extension of the portion.

In the optical waveguide formation method according to the second aspect of the first group of the present invention, the portion connected to the core part of the optical waveguide is not subjected to the planarization processing or has the surface roughness Ra based on JIS B 0601 being 0.1 μm or more. After immersing this portion in the photosensitive composition, the photosensitive composition is irradiated with light through the optical wiring 1002 (see FIG. 14(b)).

By thus irradiating the light through the optical wiring 1002, the photosensitive composition 1001 starts to be cured from an optical wiring side correspondingly to the optical path, and a core part 1004 of the optical waveguide connected to the optical wiring 1002 is thereby formed (see FIGS. 14(c) and 14(d)).

In this optical waveguide formation method, a fitting plate is arranged on the optical path in the photosensitive composition 1001 in advance when the photosensitive composition 1001 is irradiated with the light through the optical wiring 1002. It is thereby possible to form an optical waveguide having a smoother end surface at opposite side to the side on which the optical wiring is connected.

In the optical waveguide formation method according to the second aspect of the first group of the present invention, the core part is gradually formed from the optical waveguide side corresponding to the path of the irradiated light.

It is therefore desirable that the photosensitive composition used in the formation method according to the second aspect of the first group of the present invention is a photosensitive composition the optical refractive index of which after being cured is higher than the optical refractive index of the uncured photosensitive composition. By setting the optical refractive index of the cured photosensitive composition higher than that of the uncured photosensitive composition, the light is intensively irradiated through the optical wiring into the photosensitive composition from the tip end of the core part while the light is constrained in the core part. It is therefore possible to further ensure forming the optical waveguide corresponding to the optical path.

Furthermore, in the formation method according to the second aspect of the first group of the present invention, the type of the light irradiated when curing the photosensitive composition is not limited to a specific type of light. The light may be appropriately selected based on components of the photosensitive composition, and a light containing an ultraviolet ray having a wavelength of 200 to 500 nm or the like can be used as the light.

As a light source for irradiating the light having such a wavelength, a high pressure mercury lamp or the like can be used. Alternatively, a metal halide lamp, a xenon lamp, a laser or the like can be used as the light source.

In the optical waveguide formation method according to the second aspect of the first group of the present invention, when the light is irradiated through the optical wiring, the light is normally introduced from the end of the optical wiring at opposite side to the side on which the optical wiring is immersed in the photosensitive composition. However, the light may be often introduced from the side surface of the optical wiring. This is because the light can be efficiently introduced if the light is introduced from the side surface of the optical wiring, depending on the shape of the optical wiring or the like. As a specific method for introducing the light from the side surface of the optical wiring, the same method as that used in the optical waveguide formation method according to the second aspect of the first group of the present invention, or the like can be used.

Through these steps, the core part of the optical waveguide connected to the optical wiring can be formed.

If the optical waveguide formation method shown in FIGS. 14(a) to 14(d) is used, the optical transmission structural body shown in FIG. 1 can be manufactured. In the formation method according to the second aspect of the first group of the present invention, the optical transmission structural bodies as shown in FIGS. 2 to 8 can be also used by using the reflection plate, the fitting plate, or the like.

Specific examples of the formation of the optical transmission structural bodies shown in FIGS. 2 to 8 will next be described with reference to the drawings.

FIGS. 15 to 19 are schematic diagrams for describing a part of steps of the optical waveguide formation method according to the second aspect of the first group of the present invention.

Figure 15:
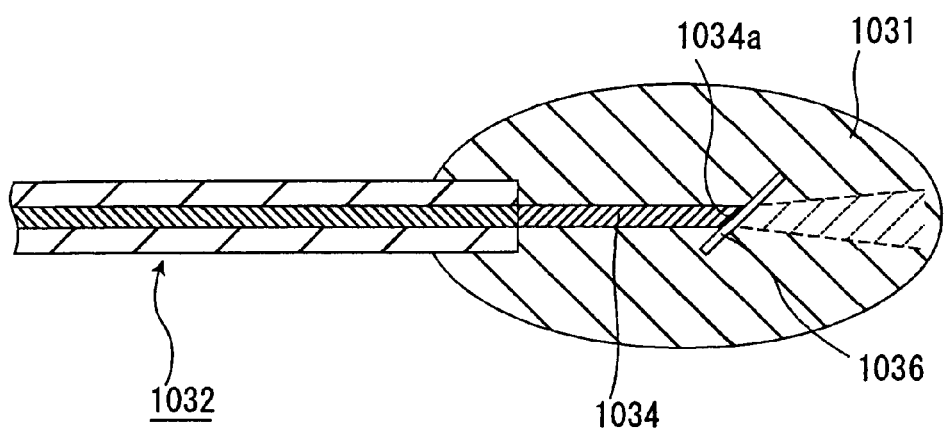
FIG. 15 is a schematic diagram for describing part of steps of the optical waveguide formation method according to the second aspect of the first group of the present invention.

If the optical waveguide having the optical conversion mirror formed on the end surface of the optical waveguide at opposite side to the side on which the optical wiring is connected shown in FIG. 2(a) is to be formed as shown in FIG. 15, a fitting plate 1036 is arranged on an optical path of light when the light is irradiated into a photosensitive composition 1031 through an optical wiring 1032 in the optical waveguide formation method according to the second aspect of the first group of the present invention. In this condition, an end surface 1034a of the optical waveguide at opposite side to a side on which the optical wiring is connected can be formed along a shape of the fitting plate 1036, so that the end surface can be provided as the optical conversion mirror.

In the optical waveguide formation method shown in FIG. 15, the fitting plate is arranged such that an inclination angle of a surface irradiated with the light from the fitting plate with respect to the end surface of the optical wiring is 45°, thereby forming the optical path conversion mirror at 90°. However, the inclination angle of the surface irradiated with the light from the fitting plate with respect to the end surface of the optical wiring is not limited to 45° but may be an arbitrary angle. Specifically, by setting the inclination angle of the surface irradiated with the light from the fitting plate with respect to the end surface of the optical wiring at 8°, the end surface of the optical waveguide at opposite side to the side on which the optical wiring is connected can be provided as an antireflection processing surface as seen in the optical transmission structural body shown in FIG. 2(b).

If a fitting plate having a spherical surface is arranged on the optical path of irradiated light, a lens can be formed on an end surface of an optical waveguide at opposite side to a side on which an optical wiring is connected as seen in the optical transmission structural body shown in FIG. 2(c).

Further, a fitting plate having a light-irradiated surface at an inclination angle of 0° (a fitting plate having a light-irradiated surface in parallel to the end surface of the optical wiring) may be employed as the fitting plate. If such a fitting plate is employed, the end surface of the optical waveguide at opposite site at opposite side to the side on which the optical wiring is connected can be made smoother in the optical transmission structural body shown in FIG. 1.

According to the second aspect of the first group of the present invention, "the inclination angle of the surface irradiated with the light from the fitting plate with respect to the end surface of the optical wiring" means an angle formed between the end surface and the fitting plate if it is assumed that the end surface of the optical wiring is a surface perpendicular to an optical axis of an emission end (or incidence end) of the optical wiring.

As the fitting plate, a plate which substantially completely transmits and absorbs or either transmits or absorbs the irradiated light, or the like can be employed. A material for the fitting plate may be appropriately selected based on a wavelength of the light irradiated through the optical wiring, the optical refractive index of the photosensitive composition, and the like.

Figure 16:
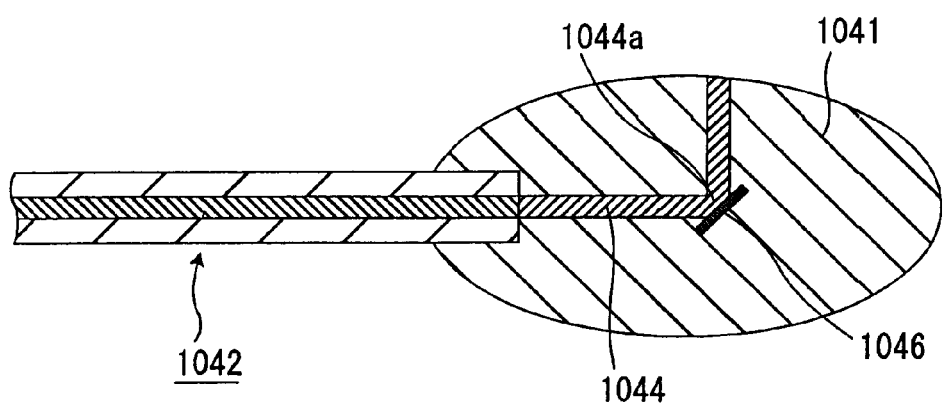
FIG. 16 is a schematic diagram for describing part of steps of the optical waveguide formation method according to the second aspect of the first group of the present invention.

Further, if the optical transmission structural body having the bent portion formed on the core part of the optical waveguide as shown in FIG. 3 is to be manufactured, a mirror 1046 is arranged on an optical path of light when the light is irradiated into a photosensitive composition 1041 through an optical wiring 1042 in the optical waveguide formation method according to the second aspect of the first group of the present invention as shown in FIG. 16. In this condition, the optical path of the irradiated light is bent, so that a core part 1044 of the optical waveguide that includes a bent portion 1044a can be formed.

In the formation method shown in FIG. 16, the mirror is arranged such that an angle of the formed bent portion is 90°. However, the angle of the formed bent portion is not limited to 90°, but the mirror may be arranged such that the bent portion at a desired angle can be formed.

Furthermore, the number of bent portions formed in the formation method according to the second aspect of the first group of the present invention is not limited to one but may be two or more. Accordingly, in the formation method according to the second aspect of the first group of the present invention, the mirror may be arranged on the optical path of the irradiated light in accordance with the number of bent portions to be formed.

A material for the mirror (a material for a reflection surface) is not limited to a specific material as long as a material has a high reflectance with respect to the light irradiated through the optical wiring. The material may be appropriately selected based on the wavelength of the irradiated light and the like. Specifically, examples of the material may include aluminum and silicon.

In addition, the reflection surface of the mirror needs to be subjected to a planarization processing to a certain degree so as to change the angle of the optical path to a predetermined degree. Alternatively, a surface roughness Ra of the reflection surface based on JIS B 0601 may be 0.1 μm or more.

Figure 17:
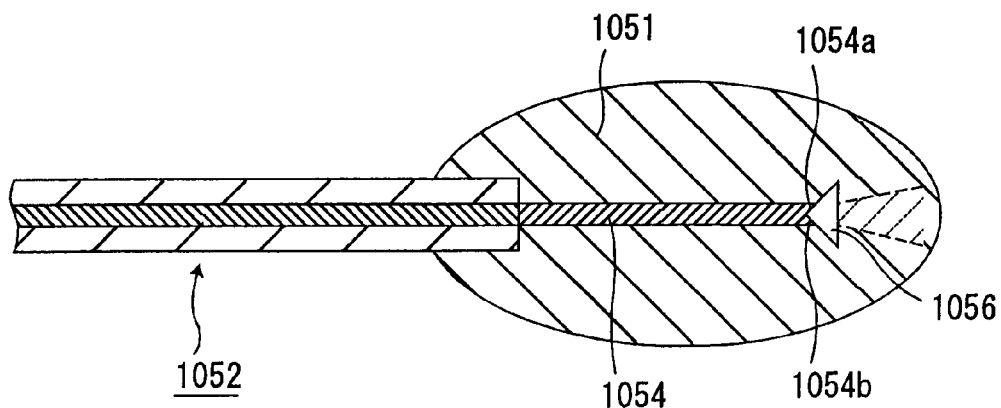
FIG. 17 is a schematic diagram for describing part of steps of the optical waveguide formation method according to the second aspect of the first group of the present invention.

Further, if the optical transmission structural body having the mirror for optical branching formed on the end surface of the optical waveguide at opposite side to the side on which the optical wiring is connected as shown in FIG. 4(a) is to be formed, a fitting plate 1056 having two surfaces at 90° with respect to each other is arranged on an optical path of light when the light is irradiated into a photosensitive composition 1051 through an optical wiring 1052 as shown in FIG. 17. In this condition, the end surface of a core part 1054 to be formed at opposite side to the side on which the optical wiring is connected can be formed along a shape of the fitting plate 1056. The end surface can be, thus, provided as the mirror for optical branching having reflection surfaces 1054a and 1054b.

The shape of the fitting plate when the optical waveguide including the mirror for optical branching is formed is not limited to the shape shown in FIG. 17, but may be appropriately selected in accordance with the shape of the mirror for optical branching to be formed.

If the optical waveguide having a plurality of end surfaces formed at different positions, respectively, at opposite side to the side on which the optical wiring is connected as shown in FIG. 5(a) is to be formed, a fitting plate 1066 is arranged only on a part of an optical path of a light when the light is irradiated into a photosensitive composition 1061 through an optical wiring 1062 as shown in FIG. 18(a).

By thus arranging the fitting plate 1066 on a part of the optical path, an optical path conversion mirror 1064a having a shape along the fitting plate 1066 can be formed on a part of a core part 1064 to be formed. The shape of the fitting plate employed in this method is not limited to a specific shape, but the fitting plate may be thick as shown in FIG. 18(a) or thin.

If the optical waveguide shown in FIG. 5(b) is to be formed, a mirror 1076 is arranged only at the part of an optical path of a light when the light is irradiated into a photosensitive composition 1071 through an optical wiring 1072 as shown in FIG. 18(b). By arranging the mirror at such a position, a part of the irradiated light is reflected by this mirror 1076, so that a core part 1074 as shown in FIG. 5(b) can be formed.

Further, if the optical waveguide is constituted so that the optical signal can be transmitted between the optical waveguide and the optical wiring, and so that the optical waveguide is not directly connected to the core part of the optical wiring as shown in FIG. 7 is to be formed, a mirror 1086 is attached to an end of an optical wiring 1082 immersed in a photosensitive composition 1081 in advance as shown in FIG. 19(a). By irradiating the light through the optical wiring 1082 while the mirror is attached in this state, a core part 1084 which enables an optical signal to be transmitted between the optical waveguide and the optical wiring and which is connected to a cladding part 1085 of the optical wiring 1082 can be formed.

Furthermore, if the mirror 1086 is attached to the end of the optical wiring, an end surface of the optical wiring on a side on which the mirror is attached to the optical wiring is not subjected to a planarization processing or has a surface roughness within the above-mentioned range. Due to this, the end surface is not formed to be closely attached to the mirror, and gaps (indicated by $A_1$ and $A_2$ in FIG. 19(b)) are normally, sometimes present between the end surface of the optical wiring and the mirror, as shown in FIG. 19(b).

In this case, in the formation method according to the second aspect of the first group of the present invention, when the optical wiring in this state is immersed in the photosensitive composition and the light is irradiated into the photosensitive composition through the optical wiring, resin layers 1087a and 1087b (functioning as a core part of the optical waveguide) made of the same material as that for a core part 1084 of the optical waveguide are formed in the respective gaps between the end surface of the optical wiring and the mirror 1086. As a result, the optical waveguide formed can preferably transmit an optical signal to the optical wiring.

FIG. 19(b) is a partial enlarged view of FIG. 19(a). In FIG. 19(b), the photosensitive composition is not shown.

As described with reference to FIGS. 16, 18(b) and 19, in the formation method according to the second aspect of the first group of the present invention, the mirror employed when the optical waveguide is formed may be kept attached to the optical waveguide after the optical waveguide is formed. Besides, after the optical waveguide is formed, the mirror may be detached and a portion of the optical waveguide in contact with the mirror may be exposed to the air or the like.

Since the optical waveguide and the air greatly differ in optical refractive index, the air acts as a mirror per se. Further, after detaching the mirror, another metal film, multilayer film, or the like more excellent in reflected light efficiency with respect to the communication wavelength may be attached to the optical waveguide by a method such as sputtering or deposition.

If the mirror is detached as described above, a reflection surface (e.g., a coating layer) of the mirror employed when forming the optical waveguide is desirably plane. If the mirror is not detached, the reflection surface of the mirror is not necessarily subjected to the planarization processing.

In the optical waveguide formation method according to the second aspect of the first group of the present invention, the optical waveguide comprising the cured core part and the uncured cladding part can be formed corresponding to the optical path by using the above-mentioned method.

However, the uncured cladding part is normally a liquid. In this state, the core part tends to be fluidized and the optical waveguide is quite unstable.

It is therefore desirable to form a solid cladding part by curing the uncured cladding part after forming the core part. To do so, after the core part is formed, the uncured cladding part is irradiated with a light, thereby solidifying an entire system. However, if a member containing only one type of the photosensitive component is used as the photosensitive component, the core part and the cladding part are substantially equal in optical refractive index after the cladding part is cured. As a result, the light cannot be constrained in the core part, and the core part cannot function as the optical waveguide.

It is therefore desirable that the solidified cladding part is formed by the following method, thereby providing a stable optical waveguide having the entire system solidified.

The method including forming the core part, removing the photosensitive composition around the core part, and then carrying out a curing processing to form the cladding part can be used. Nevertheless, as described above, if only the core part is cured, the core part is often quite unstable. To remove the uncured photosensitive composition in this state, it is necessary to handle the photosensitive composition very carefully.

Accordingly, the cladding part is desirably formed by the following method.

Resin or a resin composition (hereinafter, also referred to as "cladding formation resin") other than a photosensitive composition for forming the core part (hereinafter, also referred to as "core formation resin") is mixed together in the photosensitive composition. As the cladding formation resin, a photosensitive composition which is not polymerized until a light higher in intensity than the light for the core formation resin, and optical refractive indexes of which before and after curing are both lower than that of the core part is selected. As long as the composition has the above-mentioned properties, one of the above-mentioned photosensitive compositions can be appropriately selected as the cladding formation resin and used.

As already described, the light is irradiated through the optical wiring. At this time, the light having an intensity with which the light can polymerize the core formation resin but the light substantially cannot polymerize the cladding formation resin is irradiated. In this condition, in the photosensitive composition, only the core formation resin higher in photosensitivity selectively starts to be polymerized. If only the core formation resin starts to be polymerized in the photosensitive composition including the core formation resin and the cladding formation resin, the photosensitive composition starts to be removed from the core formation resin to be cured. This is because the uncured cladding formation resin keeps fluidity. In addition, since the core part is higher in optical refractive index than the uncured cladding formation resin, the light irradiated through the optical wiring is intensively irradiated on the tip end while being constrained in the core part which is formed. As a result, by the light irradiated from one end of the optical wiring, the core formation resin is preferentially cured corresponding to the optical path, the core part corresponding to the optical path is formed, and the uncured photosensitive composition surrounds the core part.

Thereafter, the light from the light source is set so as to be able to irradiate the entire uncured photosensitive composition. A power of the light source is increased, and the light having an intensity with which the cladding formation resin can be polymerized is irradiated. Thus, the cladding formation resin and the uncured core formation resin are cured, thereby making it possible to form the cladding part that surrounds the core part.

As can be seen, if two types of photosensitive compositions different in light intensity for triggering a polymerization reaction are mixed together in advance, and the optical waveguide is formed using the mixture photosensitive compositions, resins polymerization reactions of which are triggered through different polymerization reaction mechanisms can be selected as the core formation resin and the cladding formation resin, respectively.

Namely, a radical-polymerized photosensitive composition, represented by acrylic resin, polymerization of which is triggered by a sequential polymerization reaction by radicals, and a cation-polymerized photosensitive composition, represented by epoxy resin, polymerization of which is triggered through ion pairs can be selected. If these photosensitive compositions are selected, the polymerization reaction of the radical polymerized photosensitive composition progresses faster than that of the cation polymerized photosensitive composition. Therefore, if weak light is irradiated, only the acrylic resin is selectively polymerized.

Alternatively, by irradiating the weak light, progress states of the polymerization of the two types of photosensitive compositions may be made more different so as to be able to ensure polymerizing one of the photosensitive compositions.

This can be done by increasing a polymerization reaction speed of the radical-polymerized photosensitive composition. Specifically, the acrylic resin will be taken as an example. By increasing the number of acrylic groups contained per unit weight of the acrylic resin (that is, an acrylic equivalent weight) or increasing a density of a monomer, a density of reaction groups relating to polymerization is increased, thereby enabling increasing a polymerization reaction speed. Alternatively, by increasing a quantum yield (a quantity of generated radicals per phonon quantity) or a density of a photo polymerization initiator, the polymerization reaction speed can be increased.

Further, by decreasing the polymerization reaction speed of the cation-polymerized photosensitive composition, the progresses of the polymerization of the two types of photosensitive compositions can be made different. Specifically, the epoxy resin will be taken as an example. By decreasing the number of epoxy groups contained per unit weight of the epoxy resin (that is, an epoxy equivalent weight) or decreasing a density of a monomer, the density of reaction groups relating to polymerization is decreased, thereby enabling decreasing the polymerization reaction speed. Further, by decreasing the quantum yield (a quantity of generated cations per phonon quantity) or the density of the photo polymerization initiator, the polymerization reaction speed can be decreased.

Furthermore, even if two photosensitive compositions polymerization reactions of which progress through the same mechanism are mixed together, only one of the photosensitive compositions can be selectively polymerized. In this case, since their reactions progress through the same mechanism, it is difficult to selectively polymerize one of the photosensitive compositions even by mixing two resins different in the photo polymerization initiator or the intensifier used therefor. However, by making densities of reaction groups of matrix oligomer molecules different, only one of the photosensitive compositions can be selectively polymerized. If the radical-polymerized acrylic resins are used, one of them containing more reaction groups reactive to a certain irradiated light (i.e., having a less acrylic equivalent weight) is selectively polymerized.

If the optical waveguide is formed using the core formation resin and the cladding formation resin, the polymerization reactions of the both resins can be triggered using one light source. An equipment cost and the number of steps can be therefore reduced.

In selection of the core formation resin and the cladding formation resin, even if curing wavelengths of the both resins are not completely equal, the polymerization reactions of the resins can be triggered using one light source by adding the intensifier or the like. The reason is as follows. Even if the photosensitive compositions do not absorb the irradiated light in wavelength regions of the compositions or absorb only a small quantity of the light, the polymerization reactions can progress by adding an appropriate intensifier which can absorb the light in the wavelength range and using an energy absorbed by the initiator. In other words, if the intensifier is added, the photosensitive composition can largely absorb the irradiated light in the wavelengths of the light, and eventually increase a sensitivity. Generally, an absorption wavelength range thus widened is expanded to a longer-wave side than an original absorption wavelength region of a radical generator, and photons generated by the light source can be used efficiently. The sensitivity is thereby improved.

Alternatively, resin which is not polymerized until a heat treatment is carried out may be selected in place of the photosensitive composition having the above-mentioned properties as the cladding formation resin. The cladding part may be formed by a method for thermally curing an uncured resin in place of the method for forming the core part and then irradiating the light having the high intensity with the entire uncured photosensitive resin, thereby providing the optical waveguide.

Further, resin which is not polymerized until the resin is irradiated with light having a wavelength different from that of light for the core formation resin, and the optical refractive index of which after curing is lower than the optical refractive index of the core formation resin after curing may be selected as the cladding formation resin. The cladding part may be formed by a method for irradiating the light at a wavelength at which the cladding formation resin is polymerized to the entire uncured photosensitive resin, thereby providing the optical waveguide.

By using one of these formation methods, the optical waveguide excellent in connection performance with the optical wiring, and excellent in stability after the entire system is solidified, can be formed.

If the photosensitive compositions comprising two or more types of photosensitive compositions (e.g., the core formation resin and the cladding formation resin) are used, a blending ratio of the photosensitive compositions is not limited to a specific ratio.

Moreover, the method according to the second aspect of the first group of the present invention can be also used as a method for forming an optical waveguide that optically connects two optical wirings to each other.

FIGS. 20(a) to 20(d) are schematic diagrams for describing another embodiment of the optical waveguide formation method according to the second aspect of the first group of the present invention. The optical formation method will be described, while referring to an example in which an optical fiber is employed as the optical wiring.

Specifically, optical fibers 1012 and 1012' that form a pair to be optically connected are first arranged face to face with each other, and a photosensitive composition is, for example, coated so as to surround an area between the faced ends of the optical fibers 1012 and 1012'. By doing so, both the ends of the optical fibers 1012 and 1012' are immersed in a photosensitive composition 1011 (see FIG. 20(a)).

Next, light for curing the photosensitive composition 1011 is irradiated from one optical fiber 1012 to the optical fiber 1012' that faces the optical fiber 1012 (see FIG. 20(b)).

By thus irradiating the light from one optical fiber 1012 to the other optical fiber 1012', the photosensitive composition 1011 is gradually cured from an optical fiber 1012 side correspondingly to an optical path of the light, thereby forming a core part of an optical waveguide that connects the optical fiber 1012 to the optical fiber 1012' (see FIGS. 20(c) and 20(d)).

Thereafter, a cladding part is formed by the same method as one of those described above if it is necessary, whereby the optical waveguide that optically connects the two optical fibers to each other can be formed.

In the method for forming the optical waveguide that connects the two optical fibers to each other, the light is irradiated only through one optical fiber. Alternatively, lights may be irradiated from the two optical fibers, respectively, to the counterpart optical fibers. If so, the lights may be irradiated simultaneously through two optical fibers or alternately irradiated from the optical fibers.

Furthermore, if the lights are irradiated simultaneously from the two optical fibers to the counterpart optical fibers, the core part that connects the two optical fibers to each other can be formed even if optical axes of the two optical fibers are from each other.

FIGS. 21(a) to 21(c) are schematic diagrams for describing another example of the optical waveguide formation method according to the second aspect of the first group of the present invention.

First, one ends of two optical fibers 1022 and 1022' which are optically connected to each other are immersed in the photosensitive composition 1021 and, also, the optical fibers are arranged such that the ends thereof substantially face each other. Herein, the optical axes of the two optical fibers are deviated from each other (see FIG. 21(a)).

Lights for curing a photosensitive composition 1021 are irradiated from the two optical fibers 1022 and 1022' to the counterpart optical fibers 1022' and 1022, respectively (see FIG. 21(b)). In this case, an intensity of the light is higher in a portion Z in which emission lights X and Y emitted from the optical fibers 1022 and 1022' are superposed on each other. Therefore, if the intensity of the light in the superposed portion Z is set so that only the core formation resin can be polymerized, a core part 1024 can be formed in the portion Z in which the emission lights are superposed on each other (see FIG. 21(c)).

With this method, even if the optical axes of the paired optical fibers 1022 and 1022' are deviated from each other, then the core part 1024 is formed on an optical path of the light that connects ends of the optical fibers 1022 and 1022' to each other, and the two optical fibers 1022 and 1022' can be optically connected with a high probability.

In addition, as described with reference to FIG. 20, if the optical waveguide that connects the two optical fibers to each other is to be formed by arranging the two optical fibers face to face with each other, and by irradiating the light from one of the optical fibers or the lights from the both optical fibers, coating layers may be formed on circumference of the ends of the two optical fibers immersed in the respective photosensitive compositions. By forming the optical waveguide using the optical fibers thus coated with the coating layers, respectively, the optical transmission structural body shown in FIG. 10 can be manufactured.

If the optical waveguide is to be formed using the optical fibers coated with these coating layers, it is desirable that an end surface of each coating layer flush with the core part of the optical fiber is not specially subjected to a planarization processing or has the surface roughness Ra based on JIS B 0601 of 0.1 μm or more. This is because the end surfaces of the coating layers having the above-mentioned shape can be formed only using a cutting tool used to cut an electric wiring and the like. The cutting of the optical wirings may be carried out by using the other arbitrary cutting method without particularly using the cutting tool.

Further, if the cladding part is to be formed around the core part after forming the core part that connects the two optical wirings, the cladding part may be formed while pulling both ends of the core part or while keeping a state of pulling the both ends of the core part.

By thus pulling the both ends of the core part, the shape of the core part can be stabilized. Therefore, by forming the cladding part around this core part, the optical waveguide comprising the core part of the stabilized shape and the stable cladding part can be formed.

Further, the method for forming the cladding part while pulling the core part as described above can be used as the following method for forming the stable cladding part. After the core part using the photosensitive composition only comprising the core formation resin, the uncured photosensitive composition is removed. Next, after immersing the core part in another photosensitive composition, the stable cladding part is formed by subjecting this photosensitive composition to a curing processing.

The method for forming the stabilized-shape core part and the stable cladding part by pulling the both ends of the core part as described above can be used when forming not only for forming the optical waveguide that connects the optical wirings to each other but for the method, in which irradiation of a light from the optical wirings toward the mirror, the fitting plate, the optical component, and the like is conducted, thereby forming the core part, and the stable cladding part around the core part. In this case, by pulling the optical wirings as well as the mirror, the fitting plate, the optical component and the like, the both ends of the core part may be pulled.

In addition, to pull the both ends of the core part is advantageous in that even if a cured cladding part is not formed, the core part can be stabilized.

Moreover, by using the formation method according to the second aspect of the first group of the present invention, an optical signal transmission optical path on which the optical wiring and the optical component are connected to each other through the optical waveguide (see FIG. 9(b)) can be formed.

Figure 22:
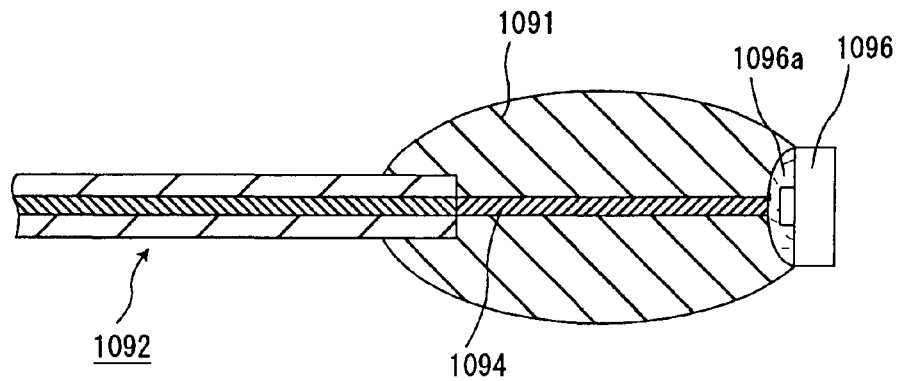
FIG. 22 is a schematic diagram for describing part of steps of the optical waveguide formation method according to the second aspect of the first group of the present invention.

Specifically, as shown in FIG. 22, when a light is irradiated into a photosensitive composition 1091 through an optical wiring 1092, an optical component 1096 is arranged on an optical path of the irradiated light in advance. In this state, by irradiating the light through the optical wiring 1092, a core part 1094 of the optical wiring that connects the optical wiring 1092 to the optical component 1096 can be formed. It is noted that a surface protection layer 1096a is formed on a surface of the optical component 1096 connected to the core part.

After thus forming the core part, a cladding part is formed around the core part by one of the above-mentioned methods, thereby providing the optical transmission structural body shown in FIG. 9(b).

Furthermore, by forming the optical waveguide connected to one end of the optical wiring using the formation method according to the second aspect of the first group of the present invention, the array-like optical transmission structural body can be manufactured.

Figure 23:
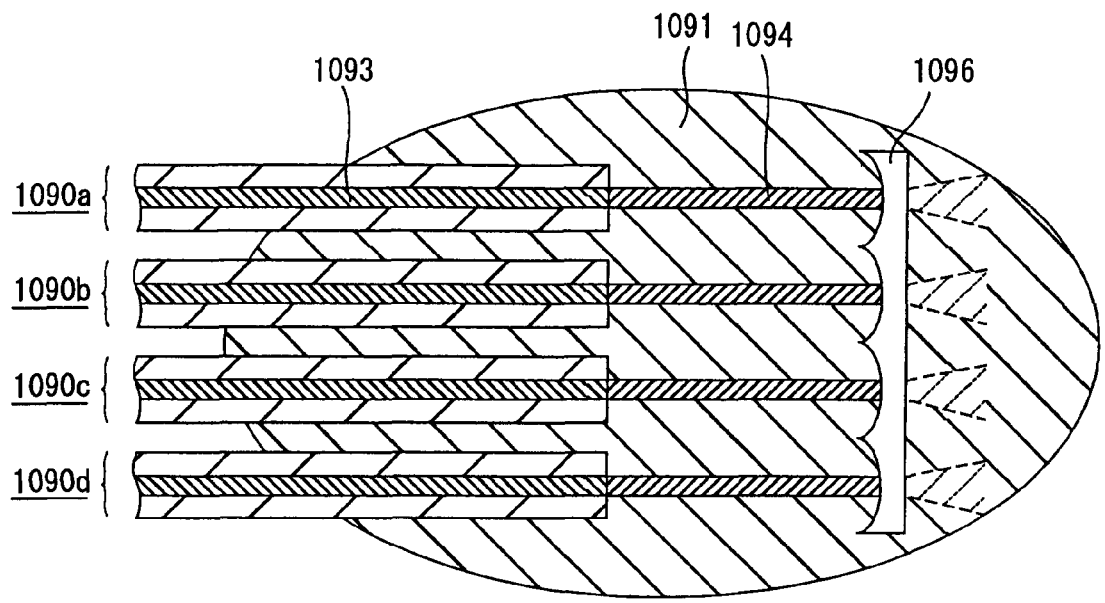
FIG. 23 is a schematic diagram for describing part of steps of the optical waveguide formation method according to the second aspect of the first group of the present invention.

Specifically, a plurality of optical wirings 1090a to 1090d (four optical wirings in FIG. 23) are arranged equidistantly. In this state, one end of each of the optical wirings thus arranged is immersed in a photosensitive composition 1091. In this state, light is irradiated through all the optical wirings. A fitting plate 1096 for forming a lens on the end surface of the optical waveguide is formed on the optical path of the irradiated light. By forming the solidified cladding part around the core part by one of the above-mentioned methods, an array-like optical transmission structural body can be formed (see FIG. 23). In FIG. 23, reference symbol 1093 represents a core of each optical wiring, and 1094 represents the core part of the optical wiring.

In the array-like optical transmission structural body manufactured by such a method, a resin layer made of the same material as that for the cladding part is formed between the adjacent optical wirings.

In the formation of the array-like optical transmission structural body, if a plurality of optical wirings are arranged equidistantly, and if the respective optical wirings are fixed into grooves of a substrate on which a plurality of grooves are formed equidistantly, the array-like optical transmission structural body can be provided without fixing an area between the adjacent optical wirings with a resin layer.

An optical waveguide according to the first aspect of the second group of the prevent invention will be described.

The optical waveguide according to the first aspect of the second group of the present invention is an optical waveguide comprising a core part and a cladding part, each of both ends thereof being connected to optical wirings or optical components, respectively, wherein both ends of at least said core part are pulled.

In the optical waveguide according to the first aspect of the second group of the present invention, since the both ends of the core part are pulled, a shape of the core part is stabilized, and an optical loss in the optical waveguide can be reduced.

Further, a force for pressing the core part and each optical wiring or optical component against each other is not applied, damage, deformation or the like does not occur to an end surface of the optical waveguide and those of the optical wirings and the like connected to the both ends of the optical wiring, respectively. Therefore, a connection loss resulting from diffuse reflection of a transmitted light, radiation of the light to an outside, and the like is less likely to occur.

Therefore, the optical waveguide according to the first aspect of the second group of the present invention can realize low connection loss between the different optical wirings and the like.

"The both ends are pulled" means herein a state in which a tensile stress is generated in at least the core part by pulling the both ends of at least the core part in a direction substantially equal to or a direction opposite to a progress direction of the transmitted light on the optical waveguide (which direction will be generically referred to as "direction substantially parallel to the progress direction of the transmitted light" hereinafter). This tensile stress is a force generated at least on the core part due to the fact that the optical wirings and the like connected to the both ends are pulled.

Accordingly, a state in which the core part is pulled in the direction substantially parallel to the progress direction of the transmitted light by a gravity and the like also corresponds to "the both ends are pulled" in the present invention. On the other hand, a state in which the both ends of the core part are pulled in a direction other than the direction substantially parallel to the progress direction of the transmitted light, e.g., a direction substantially perpendicular to the progress direction of the transmitted light, does not correspond to "the both ends are pulled" according to the present invention.

It is also assumed herein that examples of the optical waveguide according to the first aspect of the second group of the present invention includes an optical waveguide in which one end of at least the core part is fixed and in which only the other end of the core part is pulled. Even if only the other end is pulled, the tensile stress applied to the core part is similar in state to that applied to the core part the both ends of which are pulled, so that the low connection loss between the different optical wirings and the like can be realized.

Examples of the optical component include optical elements such as light receiving elements, e.g., a PD (photodiode) and an APD (avalanche photodiode), and light emitting elements, e.g., an LD (a semiconductor laser), a DFB-LD (distributed feedback-type semiconductor laser), and an LED (light emitting diode), and optical parts such as a lens, a mirror, a prism, and a filter.

Examples of the optical wiring include that similar to the optical wiring that constitutes the optical wiring connection body according to the first aspect of the first group of the present invention. An end of each optical wiring used according to the second group of the present invention may be either subjected to a planarization processing or not specially subjected to the planarization processing.

The configuration of the optical waveguide according to the first aspect of the second group of the present invention will next be described.

A length of the optical waveguide according to the first aspect of the second group of the present invention is not limited to a specific length. However, the length is desirably set in light of a material for the optical waveguide and the like. Specifically, the length of the optical waveguide is normally about 50 to 5000 μm, desirably about 100 to 3000 μm.

If the length falls within the above-mentioned range, it is possible to sufficiently acquire the advantage of the first aspect of the second group of the present invention in that the shape of the core part is stabilized by pulling the both ends of the core part.

If the length of the optical waveguide is less than 50 μm, then the optical waveguide is too short, and it is almost unlikely that the shape of the optical waveguide is made unstable. Therefore, the advantage of the first aspect of the second group of the present invention, that is, the shape of the core part is stabilized by pulling the both ends of the core part may not possibly be able to be sufficiently acquired. If the length exceeds 5000 μm, then the optical waveguide is too long. Even if the both ends of the core part are pulled, it is difficult to stabilize the shape of the core part. Therefore, the advantage of the first aspect of the second group of the present invention, that is, the shape of the core part is stabilized by pulling the both ends of the core part may not possibly be able to be sufficiently acquired.

In the optical waveguide according to the first aspect of the second group of the present invention, a cross-sectional shape of the core part is not limited to a specific shape but examples of the cross-sectional shape include a generally complete round. The cross-sectional shape means herein a shape of a cut surface of the core part perpendicular to the progress direction of the transmitted light.

In the optical waveguide according to the first aspect of the second group of the present invention, a size of a cross section of the core part is not limited to a specific size. However, if the both end of the optical waveguide are connected to the respective optical wirings, the size of the cross section of the core part on each end is desirably, substantially equal to that of a cross section of the core of each optical wiring. This is because it is possible to further ensure realizing the low connection loss.

In addition, if the both ends of the optical waveguide are connected to the respective optical components such as optical elements or optical parts, and the connected optical components are light emitting elements, it is desirable that the size of the cross section of the core part on each end is substantially equal to or larger than that of a light emitting surface (light emitting portion) of each light emitting element. This is because it is possible to further ensure realizing the low connection loss.

If the connected optical components are light receiving elements, it is desirable that the size of the cross section of the core part on each end is substantially equal to or smaller than that of a light receiving surface (light receiving portion) of each light receiving element. This is because it is possible to further ensure realizing the low connection loss.

It is noted that the magnitude of the cross section of the core part is not always fixed. Accordingly, the shape of the core part is not limited to a specific shape but may be partially thicker or gradually thicker from one end to the other end.

It is desirable, however, that the shape of the core part according to the first aspect of the second group of the present invention is such that a progress direction of a transmitted light incident from the optical wiring or optical component connected to one end of the core part, a progress direction of the transmitted light on the optical waveguide, and a progress direction of a transmitted light emitted to the optical wiring or optical component connected to the other end are equal. Specifically, if the optical waveguide connects optical wirings each having a cylindrical core to each other, the shape of the core part of the optical waveguide is desirably cylindrical. This is because the optical loss in the optical waveguide can be reduced.

A material and the like for the optical waveguide according to the first aspect of the second group of the present invention will be described.

The material for the optical waveguide according to the first aspect of the second group of the present invention is not limited to a specific material. However, an organic material is desirable, and it is particularly desirable that the core part consists of an organic material. If the core part consists of an organic material, the both ends of the core part are pulled, thereby facilitating stabilizing the shape of the core part and making it possible to sufficiently acquire the advantage of the first aspect of the second group of the present invention.

Specific examples of the organic material include resin compositions which have a photosensitivity, each of which contains a resin component such as PMMA (polymethyl-methacrylate) PMMA deuteride, PMMA deuteride fluoride, or PMMA fluoride, and in each of which a monomer, a photo polymerization initiator, an intensifier, a solvent, and the like is blended with the resin component if it is necessary; and resin compositions in each of which various additives are blended with a resin component such as epoxy resin. Examples of the photosensitive composition also include compositions each of which contains, as a photosensitized resin component, epoxy resin, epoxy resin fluoride, polyolefin resin, silicone resin such as silicone resin deuteride, resin consisting of benzocyclobutene, and the like, and each of which also contains various additives, solvents, and the like such as a monomer, a photo polymerization initiator, and an intensifier if it is necessary.

In the present specification, the resin compositions particularly having the photosensitivity among the resin compositions will be referred to as photosensitive compositions.

As the resin composition, the photosensitive composition is desirable. It is particularly desirable that the core part consists of the photosensitive composition. The use of such a photosensitive composition is suitable for forming the optical waveguide according to the first aspect of the second group of the present invention, particularly suitable for forming the core part. Accordingly, as the organic material, the same compositions as the photosensitive compositions used according to the second aspect of the first group of the present invention are available.

The core part may further contain particles. The optical waveguide containing such particles enables matching the thermal expansion coefficient of the optical waveguide to that of each optical component when the optical waveguide is directly attached to the optical component or the optical wiring.

Specific examples of the particles may include the same as those contained in the photosensitive compositions used in the optical waveguide formation method according to the second aspect of the first group of the present invention.

Further, the shape and diameter of each particle are the same as those of the particle contained in the photosensitive compositions used in the optical waveguide formation method according to the second aspect of the first group of the present invention.

If the core part contains particles, a blending ratio of the particles after curing is desirably 10 to 80% by weight, more desirably 20 to 70% by weight. If the blending ratio of the particles is less than 10% by weight, an advantage of blending the particles cannot be greatly acquired. If it exceeds 80% by weight, transmission of the optical signal is often hampered.

In the optical waveguide according to the first aspect of the second group of the present invention, the cladding part is not limited to a specific one if it functions as means for constraining a light guided into the core part by the core part. The cladding part may consist of a resin composition. If a gas such as the air is present around the core part, the gas functions as the cladding part.

It is however desirable that the cladding part consists of the resin composition in the optical waveguide according to the first aspect of the second group of the present invention.

As described above, even if the air is present around the core part, the core part made of one of the above-mentioned materials has normally higher optical refractive index than that of the air. The core part can therefore function as the optical waveguide. Nevertheless, by forming the cladding part around the core part, it is possible to further ensure transmitting the optical signal.

According to the second group of the present invention, the resin composition is a composition in which various additives are blended with the resin component if it is necessary. Needless to say, the photosensitive composition is assumed to be one resin composition.

Further, if the material for the core part is the photosensitive composition, and the refractive index of the photosensitive composition after being cured is higher than that of the photosensitive composition before being cured, then a part of the photosensitive composition is cured to form the core part, and the uncured photosensitive composition remaining around the core part can function as the cladding part. In this case, however, the core part has fluidity, which is undesirable for reliability of the optical waveguide. It is therefore desirable that the cladding part is cured and thereby stabilized.

A material for the cladding part is not limited to a specific material as long as an optical refractive index of the material is lower than that of the core part. Specific examples of the material for the cladding part include the same as those for the core part.

In addition, a shape of the cladding part is not limited to a specific shape. Examples of an outside shape of the cladding part include a cylindrical shape and a prismatic shape.

The cladding part may contain the above-mentioned particles similarly to the core part.

In the optical waveguide according to the first aspect of the second group of the present invention, a magnitude of a force for pulling both ends of at least the core part is desirably set in a range in which the optical waveguide is not broken, or the optical waveguide and the optical wirings and the like connected to the both ends of the optical waveguide are not disconnected from one another, according to the thickness, length, material or the like of the optical waveguide. In addition, the magnitude of the force for pulling the both ends of at least the core part is not necessarily always constant.

The optical waveguide according to the first aspect of the second group of the present invention comprises means for maintaining a state where at least both ends of the core part are pulled. Desirably, the means is integrally formed with the optical waveguide. It is therefore possible to easily move the optical waveguide in the state where the both ends of the core part are pulled.

The optical waveguide according to the first aspect of the second group of the present invention may not always include the above-mentioned means. If the optical wirings and the like connected to the optical waveguide are disposed in a device such as an optical high precision slide base (e.g., an X stage) and the like and pulled by the device to thereby pull the both ends of the core part, then the optical waveguide serves as the optical waveguide according to the first aspect of the second group of the present invention although the optical waveguide does not include the above-mentioned means. This is because the both ends of the core part are pulled. In this case, the optical wirings may be placed on the optical high precision slide base either directly or through a member for fixing the optical wirings such as an optical fiber fixing base.

The optical waveguide according to the first aspect of the second group of the present invention will next be described with reference to the drawings.

FIGS. 26(a) to 26(c) are cross-sectional views schematically showing embodiments of the optical waveguide according to the first aspect of the second group of the present invention, respectively.

Figure 26:
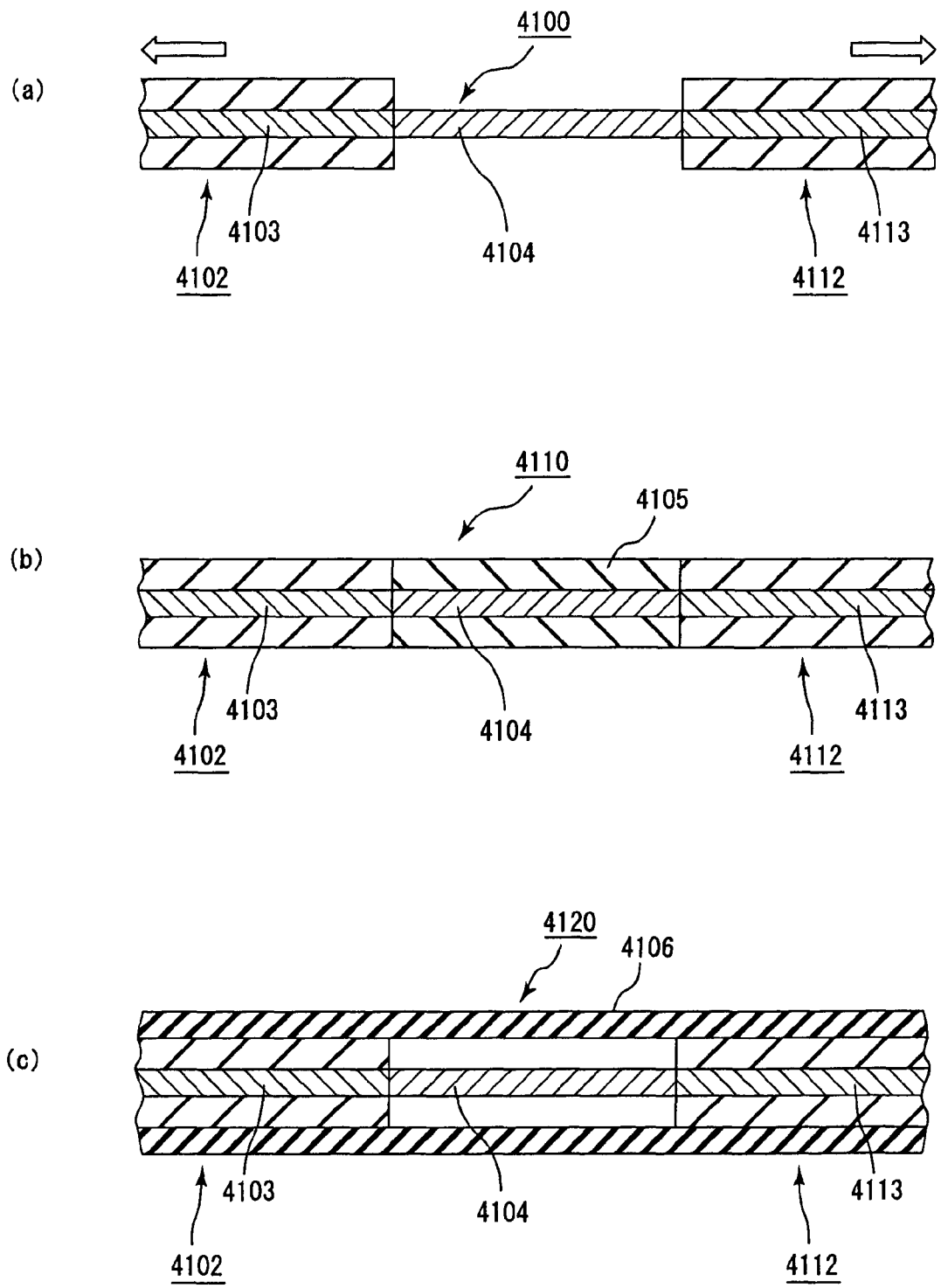
FIGS. 26(a) to 26(c) are cross-sectional views each schematically showing one example of an optical waveguide according to the first aspect of the second group of the present invention.

In FIG. 26, an outlined arrow indicates a direction in which a tensile force is applied.

An optical waveguide 4100 shown in FIG. 26(a) is comprising a core part 4104 and an air cladding part (not shown). One end of the optical waveguide 4100 is connected to a core 4103 of an optical wiring 4102, and the other end thereof is connected to a core 4113 of an optical wiring 4112. The optical wirings 4102 and 4112 are placed on different devices such as optical high precision slide bases (not shown), and pulled by the corresponding devices, respectively. Since the optical wirings 4102 and 4112 are pulled by the corresponding devices in arrow directions, respectively, so that both ends of the core part 4104 of the optical waveguide 4100 are pulled.

An optical waveguide 4110 shown in FIG. 26(b) is an optical waveguide in which a cladding part 4105 comprising the resin composition is formed around the core part 4104 of the optical waveguide 4100 shown in FIG. 26(a).

In the optical wirings 4102 and 4112, a force for pulling by the devices such as the optical high precision slide bases, respectively, is removed. However, the core part 4104 of the optical waveguide 4110 is kept in a state in which the both ends of the core part 4104 are pulled. Accordingly, the cladding part 4105 functions as means for keeping the state in which the both ends of the core part 4104 as well.

An optical waveguide 4120 shown in FIG. 26(c) is an optical waveguide in which a coating layer 4106 which integrally coats the optical wirings 4102 and 4112 connected to both ends of the optical waveguide 4100 shown in FIG. 26(a), respectively, is formed.

In the optical wirings 4102 and 4112, a force for pulling by the devices such as the optical high precision slide bases, respectively, is removed. However, the core part 4104 of the optical waveguide 4120 is kept in a state in which the both ends of the core part 4104 are pulled. Accordingly, the coating layer 4106 functions as means for keeping the state of pulling the both ends of the core part 4104 as well.

By allowing the force for pulling the both ends of the core part to be adjustable, the optical waveguide according to the first aspect of the second group of the present invention can function as an On/Off switch. Namely, by intensifying the force for pulling the both ends of the core part to stabilize the shape of the core part, and by reducing an optical loss of a transmitted light, the transmitted light can be caused to pass, and the switch is turned "On". In addition, by weakening the force for pulling the both ends of the core part to make the shape of the core part unstable, and by intensifying the optical loss of the transmitted light, it is difficult to cause the transmitted light to pass, and the switch can be turned "Off".

Further, by allowing the force for pulling the both ends of the core part to be accurately adjustable, the optical waveguide according to the first aspect of the second group of the present invention can function as an optical attenuator.

Namely, by adjusting the force for pulling the both ends of the core part to change the shape of the core part, and by adjusting the optical loss of the transmitted light, an intensity of the transmitted light passing through the optical waveguide can be adjusted.

The optical waveguide according to the first aspect of the second group of the present invention can be formed by, for example, an optical waveguide formation method according to the second aspect of the second group of the present invention to be described later.

The optical waveguide formation method according to the second aspect of the second group of the present invention will be described.

The optical waveguide formation method according to the second aspect of the second group of the present invention comprises the steps of:
arranging different optical wirings such that
one end of one of the optical wirings substantially faces one end of the other optical wiring and at least both of the faced ends thereof are immersed in a photosensitive composition; and irradiating light at least from one of said optical wirings to the other optical wiring, thereby forming a core part that connects said optical wirings to each other, wherein both ends of the core parts are pulled.

In the optical waveguide formation method according to the second aspect of the second group of the present invention, the core part can be formed while the both ends are connected to the respective optical wirings. Besides, since the both ends of the core part are pulled, it is unnecessary to press the optical wirings against each other and fix them to each other when connecting them, and the core part and the optical wirings are not pressed against one another as seen in the conventional art. As a result, the optical waveguide can be formed without generating a damage, a deformation, and the like on end surfaces of the optical wirings and the like. In addition, since the both ends of the core part are pulled, the core part is not fluidized and the optical waveguide including the core part having a stable shape can be obtained.

Therefore, the optical waveguide obtained by the optical waveguide formation method according to the second aspect of the second group of the present invention can realize low connection loss between the optical wirings connected to the optical waveguide.

In the optical waveguide formation method according to the second aspect of the second group of the present invention, the optical wirings are arranged such that one end of one of the optical wirings substantially faces one end of the other optical wiring, and such that at least both of the faced ends thereof are immersed in the photosensitive composition. Alternatively, optical components such as optical elements or optical parts can be employed in place of the optical wirings.

Accordingly, a light emitting element and a light receiving element may be arranged such that a light emitting surface (light emitting portion) of the light emitting element substantially faces a light receiving surface (light receiving portion) of the light receiving element, and such that at least the light emitting surface and the light receiving surface facing each other are immersed in the photosensitive composition. Further, the optical wiring and the optical part may be arranged face to face with each other, and the optical waveguide connecting the optical wiring to the optical part may be formed.

Furthermore, "one end of one of the optical wirings substantially faces one end of the other optical wiring" means that: the different optical wirings are not necessarily arranged such that optical axes thereof are aligned with each other, that the optical axes of the different optical wirings may be deviated each other within a range in which the core part that connects the optical wirings to each other can be formed by irradiating a light from at least one of the optical wirings to the other optical wiring.

An instance of arranging the different optical wirings such that the optical axes of the optical wirings are aligned with each other will first be described. An instance in which the optical axes of the different optical wirings are deviated from each other will be described later.

Now, the optical waveguide formation method according to the second aspect of the second group of the present invention will be described with reference to the drawings. The formation method will be described herein while referring to FIG. 20 which is referred to when describing the optical waveguide formation method according to the second aspect of the first group of the present invention.

In the optical waveguide formation method according to the second aspect of the second group of the present invention, the different optical wirings are arranged such that one end of one of the optical wirings substantially faces one end of the other optical wiring, and such that at least the ends facing each other are immersed in the photosensitive composition.

Figure 20:
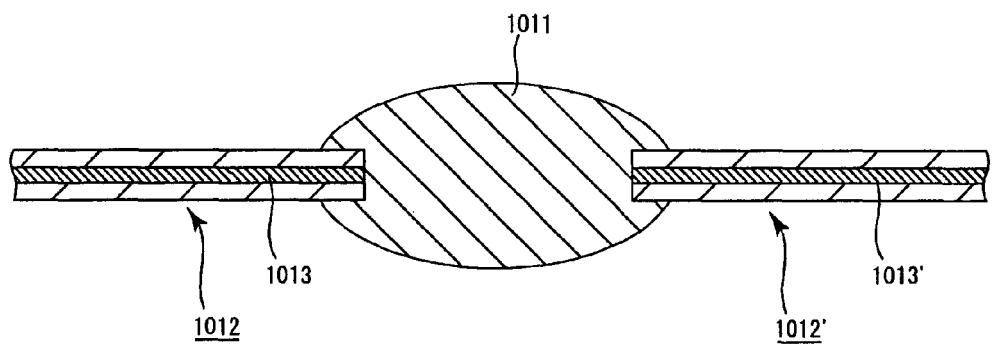
FIGS. 20(a) to 20(d) are schematic diagrams for describing another example of the optical waveguide formation method according to the second aspect of the first group of the present invention.
Figure 20:
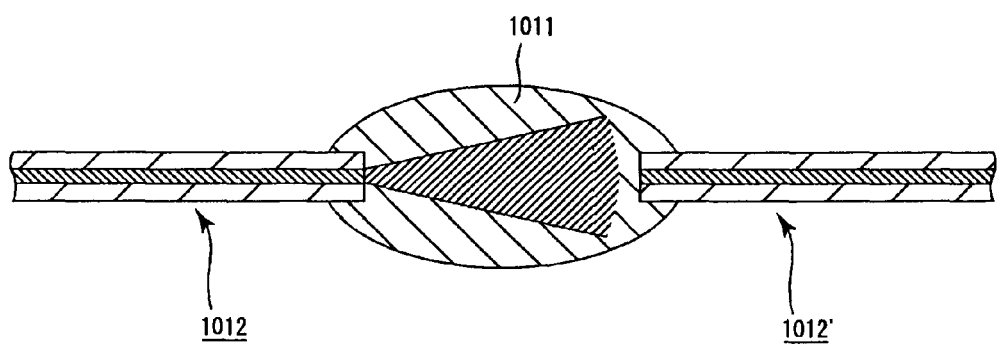
Figure 20:
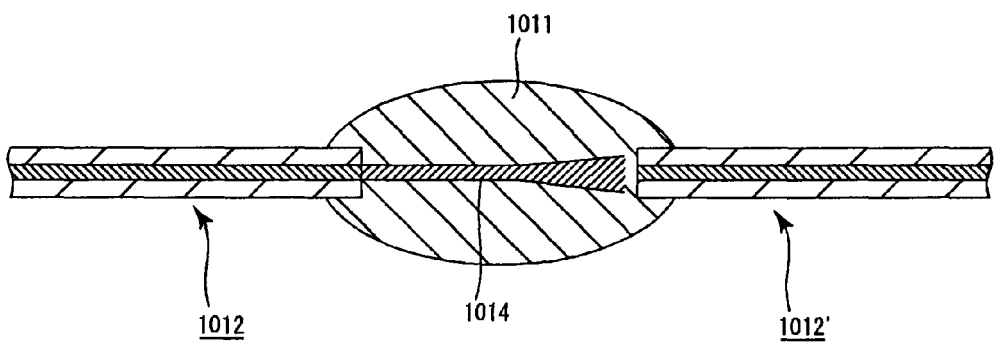
Figure 20:
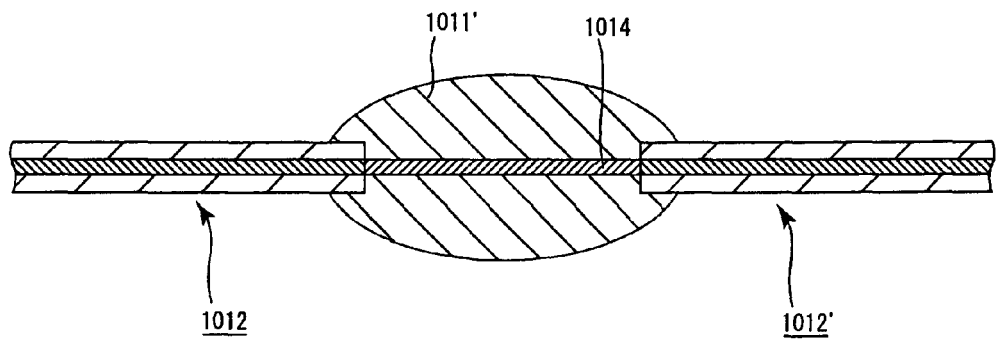

Specifically, optical fibers 1012 and 1012' are arranged such that one end of the optical fiber 1012 faces one end of the optical fiber 1012', and the photosensitive composition 1011 is, for example, coated so as to surround the area between the ends of the optical fibers 1012 and 1012', thereby immersing the ends of the both optical fibers 1012 and 1012' in the photosensitive composition 1011 (see FIG. 20(*a*)).

Next, light for curing the photosensitive composition is irradiated from one optical fiber 1012 to the optical fiber 1012' which is arranged to face the optical fiber 1012 (see FIG. 20(*b*)).

By thus irradiating the light from one optical fiber 1012 to the other optical fiber 1012', the photosensitive composition is gradually cured from the optical fiber 1012 side correspondingly to the optical path of the light, and the core part of the optical waveguide that connects the optical fiber 1012 to the optical fiber 1012' is formed (see FIGS. 20(*c*) and 20(*d*)).

In the present specification, it is defined that a cured matter grown by irradiating the light includes a semi-cured matter. Therefore, it is defined that to cure the photosensitive composition by irradiating the light also contain to semi-cure the photosensitive composition.

In the formation method for the optical waveguide that connects the two optical fibers to each other, the light is irradiated only through one of the optical fibers. Alternatively to this method, lights may be irradiated from the two optical fibers to the counterpart optical fibers, respectively. In that case, the lights may be irradiated through the two optical fibers simultaneously or alternately.

In the optical waveguide formation method according to the second aspect of the second group of the present invention, the type of the light irradiated when curing the photosensitive composition is not limited to a specific type of light. The light may be appropriately selected based on components of the photosensitive composition. If the photosensitive composition exhibits a photosensitivity in an ultraviolet range, light having a wavelength in the ultraviolet range may be irradiated. As a light source for irradiating the light having such a wavelength, a high pressure mercury lamp and the like can be used. Alternatively, a metal halide lamp, a xenon lamp, a laser, and the like can be used as the light source.

As can be seen, in the optical waveguide formation method according to the second aspect of the second group of the present invention, the core part is gradually formed from the optical wiring side corresponding to the optical path of the irradiated light.

Accordingly, the refractive index of the photosensitive composition used in the optical waveguide formation method according to the second aspect of the second group of the present invention after curing is desirably higher than that of the photosensitive composition before curing. By setting the optical refractive index of the cured photosensitive composition higher, the light irradiated through the optical wiring can be intensively irradiated from a tip end thereof while the light is constrained in the formed core part. It is, therefore, possible to further ensure forming the optical waveguide corresponding to the optical path of the light.

In the optical waveguide formation method according to the second aspect of the second group of the present invention, a lower limit of the optical refractive index of this photosensitive composition after curing is desirably 90% of that of the core of the optical wiring and an upper limit thereof is desirably 110% so as to form the core part while one end of each of the optical wirings is immersed in the photosensitive composition.

If the photosensitive composition which can form the core part having the optical refractive index within the above-mentioned ranges is used, it is possible to form the core part more excellent in connection performance with the optical wirings.

The lower limit of the optical refractive index of the photosensitive composition after curing is more desirably 95% of that of the core of the optical wiring, most desirably 98%. The upper limit thereof is more desirably 105% of that of the core of the optical wiring, most desirably 102%.

Accordingly, if a material for the core of the optical wiring is pure quartz glass and an optical refractive index $n_D$ of pure quartz glass is about 1.46, for example, it is desirable to use the photosensitive composition the optical refractive index $n_D$ of which after being cured is about 1.31 to 1.61.

Further, the optical refractive index of the resin or the like used for the optical wirings or the optical waveguide changes depending on a wavelength. However, a ratio (of the optical refractive index of the core part of the optical waveguide to that of the core of the optical wiring) hardly changes from, for example, an ultraviolet range to a near-infrared range.

In addition, a lower limit of the optical refractive index of the core part before curing, i.e., that of the photosensitive composition and the like itself is also, desirably 90% of that of the core of the optical wiring, more desirably 95%, most desirably 98%. An upper limit thereof is desirably 110%, more desirably 105%, most desirably 102%.

As can be seen, in the optical waveguide formation method according to the second aspect of the second group of the present invention, it is desirable to select and use the photosensitive composition having the optical refractive index within the above-mentioned range after curing. Even if the photosensitive composition has an optical refractive index out of the above-mentioned range, the photosensitive composition can be used by adjusting the optical refractive index. If the optical refractive index of the photosensitive composition is to be adjusted, it is desirable to make adjustment so that the optical refractive indexes of the core part before and after curing fall within the respective ranges mentioned above.

As a method for adjusting the optical refractive index of the photosensitive composition, the same method as that described in relation to the second aspect of the first group of the present invention, that is, a method for adjusting a molecular refraction and a molecular volume can be used.

"The optical refractive index of the core of the optical wiring" means the optical refractive index of the core if the core of the optical wiring has a single optical refractive index similarly to a step index optical fiber ("SI optical fiber"). "The optical refractive index of the core of the optical wiring" means a peak optical index of the core of the optical wiring if the core has the optical refractive index in a certain range similarly to a graded index optical fiber ("GI optical fiber").

Through these steps, in the optical waveguide formation method according to the second aspect of the second group of the present invention, the optical waveguide comprising the cured core part and the uncured cladding part corresponding to the optical path of the light can be formed.

However, the uncured cladding part is normally a liquid. In this state, the core part tends to be fluidized and the optical waveguide is quite unstable.

Therefore, in the optical waveguide formation method according to the second aspect of the second group of the present invention, after the core part is formed, the both ends of the core part are pulled to stabilize the shape of the core part.

Examples of a method for pulling the both ends of the core part includes a method including steps of: mounting different optical wirings on separate devices such as optical high precision slide bases, respectively; forming the core part that connects the different optical wirings to each other while mounting them; and pulling the different optical wirings by the respective devices. The number of devices such as optical high precision slide bases is not always two but may be one. In the latter case, one of the optical wirings may be placed and fixed onto a base for fixing the one optical wiring, the other optical wiring may be placed on the device such as the optical high precision slide base, and the other optical wiring may be pulled by the device. As the method for pulling the both ends of the core part, a method using a gravity as a force for pulling the core part can be adopted. Namely, after forming the core part that connects the different optical wirings to each other, one of the optical wirings is raised and the core part is suspended in a vertical direction, whereby the both ends of the core part can be pulled.

It is noted that even if one of the optical wirings is fixed and only the other optical wiring is pulled, or even if one of the optical wirings is raised and the core part is suspended in the vertical direction as described above, the both ends of the core part are pulled.

The magnitude of the force for pulling the core part is desirably set based on the thickness, length, material, and the like of the optical waveguide described above. Specifically, the force is desirably set so that the length of the core part extends by about 5 to 50%. This force is not always constant.

In the optical waveguide formation method according to the second aspect of the second group of the present invention, after or while pulling the core part by one of the above-mentioned methods, the stable cladding part is desirably formed around the core part.

The reason is as follows. By forming the stable cladding part around the core part after or while pulling the both ends of the core part, the optical waveguide in which the state of pulling the both ends of the core part is kept can be formed.

Accordingly, in the optical waveguide thus obtained, even after the force for pulling the optical wirings connected to the both ends of the optical waveguides, respectively, is removed, the state of pulling the both ends of the core part can be kept. Further, by forming the stable cladding part, the optical waveguide capable of transmitting the optical signal is provided further surely.

"While pulling" means a state in which at least one end of the core part is displaced by being pulled. "After pulling" means not a state in which the pulling force is removed but a state in which the both ends of the core part are pulled and in which a displacement generated on the end of the core part is stopped. Accordingly, even "while pulling" or "after pulling" the core part, a tensile stress is applied to the core part.

If the above-mentioned cladding part is to be formed, a more stable cladding part can be formed by forming the core part, removing the uncured photosensitive composition around the core part, immersing the core part in another resin composition (which may be either the photosensitive composition or non-photosensitive composition), and subjecting this resin composition to a curing processing.

With this method, it is required to deal with the core part very carefully when removing the uncured photosensitive composition and the like. Therefore, the method is not so practical.

However, according to the optical waveguide formation method according to the second aspect of the second group of the present invention, by contrast, the core part connected to the optical wirings is raised from the uncured photosensitive composition while pulling the both optical wirings. It is thereby possible to remove the uncured photosensitive composition around the core part while pulling the core part and stabilizing the shape of the core part. Thereafter, while keeping a state in which the core part is pulled, the core part is immersed in another resin composition, and this resin composition is subjected to a curing processing. Thus, the optical waveguide comprising the core part having a stabilized shape and the stable cladding part can be formed.

Incidentally, processing for pulling the core part may only be carried out before the resin composition is subjected to the curing processing after the core part is immersed in another resin composition, without specially carrying out the pulling processing or the like at the time of removing the uncured photosensitive composition around the core part.

Further, besides the above-mentioned methods, the same method as that described in relation to the optical waveguide formation method according to the second aspect of the first group of the present invention, that is, the method for forming the core part and the cladding part using the photosensitive composition in which the core formation resin and the cladding formation resin are mixed together in advance as the photosensitive composition can be used.

As the photosensitive composition containing the core formation resin and the resin cladding formation resin, one of the same photosensitive compositions as those used according to the second aspect of the first group of the present invention can be used.

According to the second aspect of the second group of the present invention, by irradiating a light having an intensity with which the light can polymerize the core formation resin but the light substantially cannot polymerize the cladding formation resin into the photosensitive composition, only the core formation resin is preferentially cured, the core part corresponding to the path of the light is formed, and the uncured photosensitive resin surrounds the core part, similarly to the second aspect of the first group of the present invention.

Next, by curing the cladding formation resin after or while pulling the core part by one of the above-mentioned methods, the stable cladding part can be formed around the core part. If the cladding formation resin is cured using such a method, the uncured core formation resin is sometimes cured when curing the cladding formation resin similarly to the second aspect of the first group of the present invention.

By using such a formation method, the optical waveguide excellent in connection performance with the optical wirings and excellent in stability after the entire system is solidified, can be formed.

The method for forming the optical waveguide by immersing one end of each optical wiring in the photosensitive composition has been described. Alternatively, an optical element such as a light emitting element can be used in place of the optical wiring. By immersing a light emitting surface (light emitting portion) of the light emitting element in the photosensitive composition or coating the photosensitive composition on the light emitting surface, the core part directly attached to the light emitting surface of the optical component can be formed.

For the optical wirings or the optical components to which the core part is directly attached, positioning of the optical waveguide (core part) and each optical wiring or the like is unnecessary.

The optical waveguide formation method in case the optical axes of the different optical wirings are not completely aligned with each other will next be described. The formation method will be described herein while referring to FIG. 21 which is referred to when describing the optical waveguide formation method according to the second aspect of the first group of the present invention.

By simultaneously irradiating lights from the two optical fibers to the counterpart optical fibers, the core part that connects the two optical fibers to each other can be formed even if the optical axes of the two optical fibers are deviated from each other.

That is, the optical fibers 1022 and 1022' are arranged such that one end of each of the two optical fibers 1022 and 1022' optically connected to each other is immersed in the photosensitive composition 1021, and such that one end of one of the optical fibers substantially faces one end of the other optical fiber. The optical axes of the optical fibers are deviated from each other (see FIG. 21(*a*)).

Figure 21:
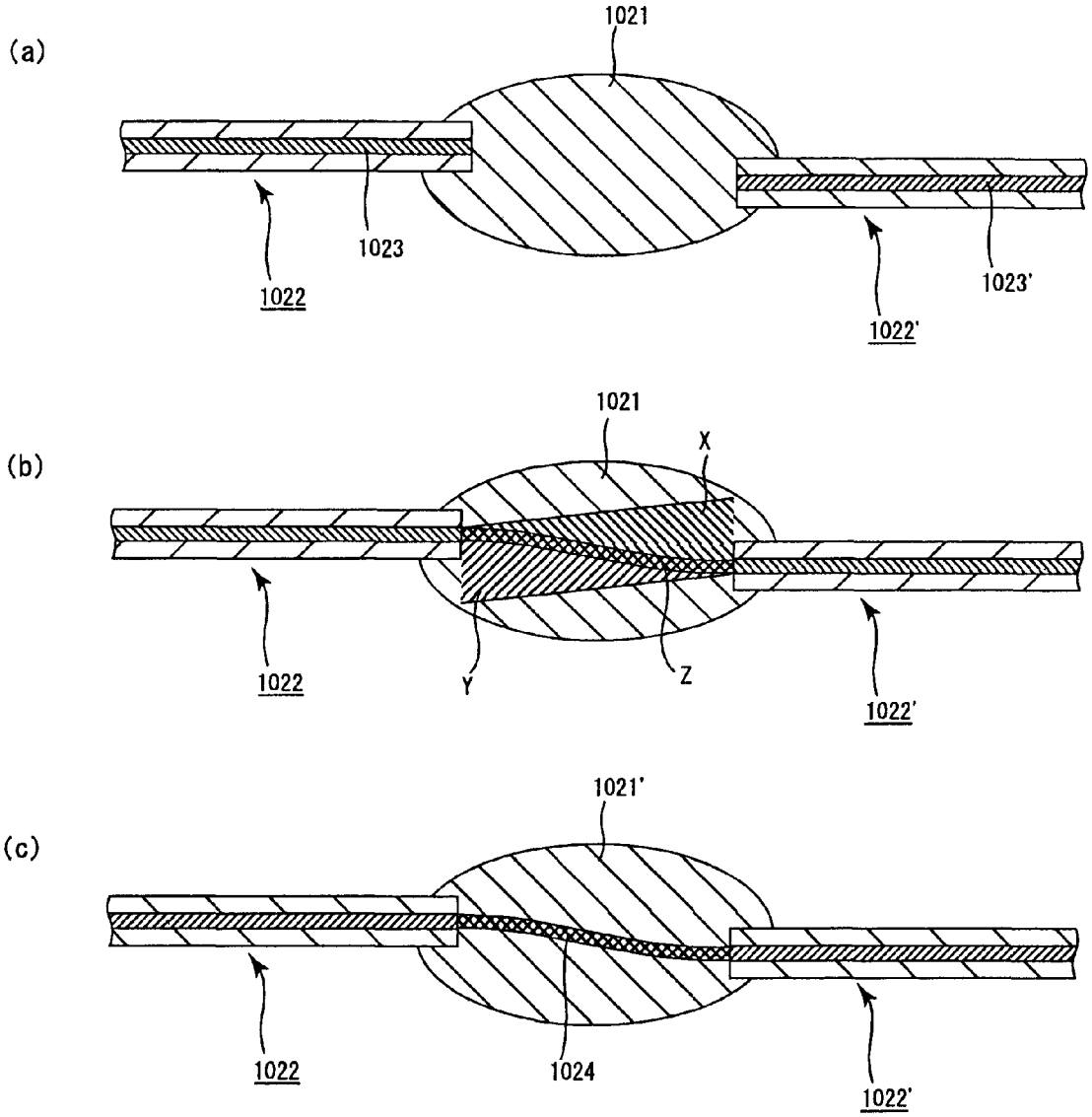
FIGS. 21(a) to 21(c) are schematic diagrams for describing another embodiment of the optical waveguide formation method according to the second aspect of the first group of the present invention.

Lights for curing the photosensitive composition 1021 are irradiated from the two optical fibers 1022 and 1022' to the counterpart optical fibers 1022' and 1022, respectively (see FIG. 21(*b*)). In this case, the intensity of the light is higher in a portion Z in which emission lights X and Y emitted from the optical fibers 1022 and 1022' are superposed on each other. Therefore, if the intensity of the light in the superposed portion Z is set so that only the core formation resin can be polymerized, the core part 1024 can be formed in the portion Z in which the emission lights are superposed on each other (see FIG. 21(*c*)).

With this method, even if the optical axes of the paired optical fibers 1022 and 1022' are deviated each other, then the core part 1024 is formed on the optical path of the light that connects ends of the optical fibers 1022 and 1022' to each other, and the two optical fibers 1022 and 1022' can be optically connected with a high probability.

In addition, in the optical waveguide formation method according to the second aspect of the second group of the present invention, if the optical waveguide is formed as described above, the core part 1024 may then be pulled so that the optical axes of the optical fibers 1022 and 1022' are aligned with each other, or the core part 1024 may then be pulled while the axes of the optical fibers are deviated.

Herein, the method for forming the optical waveguide using the photosensitive composition has been described. If the optical waveguide according to the second aspect of the second group of the present invention consists of a resin composition other than the photosensitive composition, the optical waveguide can be formed by the following method.

Different optical wirings are arranged such that one end of one optical wiring faces one end of the other optical wiring. A cylindrical core formation member filled with a resin composition including thermosetting resin is arranged between the respective ends, and heating is carried out at a predetermined temperature, thereby forming a core part that connects the different optical wirings to each other. Thereafter, the core part formation member is removed while the core part is left, and the both ends of the core part are pulled, whereby the optical waveguide according to the second aspect of the second group of the present invention can be formed.

An optical waveguide according to the first aspect of the third group of the present invention will next be described.

The optical waveguide according to the first aspect of the third group of the present invention is an optical waveguide formed independently of an optical wiring, wherein a shape of a core part is formed to be gradually thinner toward one end of the core part. In the optical waveguide according to the first aspect of the third group of the present invention, the thinner one end of the core part will be also referred to as an apex and the other end will be also referred to as a bottom hereinafter.

Since the shape of the core part is such that the core part is gradually thinner toward one end of the core part in the optical waveguide according to the first aspect of the third group of the present invention, a light incident from the bottom can be condensed and the condensed light can be efficiently emitted from the apex.

"A shape of a core part (is) formed to be gradually thinner toward one end of the core part" is not limited to a specific shape as long as the core part is shaped such that the apex is smaller than the bottom. The shape of the core part may be such that only a pair of parallel surfaces of a square column are planed so as to have substantially an equal inclination. The shape of the core part is desirably a generally conical shape, a generally pyramid shape, or an icicle-like shape, also desirably a shape such that the apex is smaller than the bottom and the apex and the bottom are substantially analogous, or such that the apex is smaller than the bottom and the apex and the bottom are non-analogous (e.g., such that the apex is circular and the bottom is polygonal). With such a shape, it is possible to ensure condensing the light incident from the bottom.

Further, if the shape of the core part is such that the apex is smaller than the bottom and such that the apex and the bottom are non-analogous, the shape is useful when, for example, a core of an optical fiber having a circular cross section and a core of an optical wiring having a rectangular cross section (e.g., a core of a plane optical waveguide consisting of quartz or polymer) are connected to each other through the optical waveguide, or when a core of an optical fiber having a circular cross section and a rectangular emission port of a laser diode are connected to each other through the optical waveguide.

Conventionally, if optical wirings or optical components having different cross-sectional shapes are connected to each other, an optical connection loss might have occurred due to the different cross-sectional shapes. As described above, if the optical waveguide shaped such that the apex and the bottom are non-analogous is used, the cross-sectional shape is gradually changed. Thus if this optical waveguide is used, it is possible to suppress the occurrence of the optical connection loss due to the difference in cross-sectional shape between the optical wirings or optical components to be connected to each other, and to further ensure that the light incident from the bottom is condensed toward the apex.

"Formed independently of an optical wiring" means not that the optical waveguide is formed integrally as an extension of the optical wiring using the same material but that the optical waveguide and the optical wiring are formed at different timings using different materials. It does not matter whether the optical waveguide and the optical wiring are formed to be bonded to each other. Accordingly, as will be described later, this optical waveguide can be dealt with as an independent component. However, if the optical waveguide is formed on a tip end of the optical wiring, then the optical waveguide and the optical wiring are bonded to each other, and the optical waveguide and the optical wiring are desirably used as they are. This is because it is possible to ensure receiving an optical signal without performing positioning.

In the optical waveguide according to the first aspect of the third group of the present invention, when optical components, optical wirings, or an optical component and an optical wiring are optically connected to each other, the optical waveguide according to the first aspect of the third group of the present invention interposes between them so that an optical signal is transmitted from the bottom to the apex. With this constitution, it is possible to ensure transmitting the optical signal without using an expensive lens such as a collimator lens or a condensing lens.

Furthermore, by directly attaching the bottom of the core part to the optical component or the optical wiring on an optical signal emission side, the optical signal can be transmitted surely and efficiently through the core part.

Examples of the optical component include optical elements such as light receiving elements, e.g., a PD (photodiode) and an APD (avalanche photodiode), and light emitting elements, e.g., an LD (a semiconductor laser), a DFB-LD (distributed feedback-type semiconductor laser), and an LED (light emitting diode), and optical parts such as a lens, a mirror, a prism, and a filter.

Examples of the optical wiring include that similar to the optical wiring that constitutes the optical wiring connection body according to the first aspect of the first group of the present invention. An end of the optical wiring used according to the third group of the present invention may be either subjected to a planarization processing or not specially subjected to the planarization processing.

In the optical waveguide according to the first aspect of the third group of the present invention, it suffices that the shape of the core part is such that the core part is gradually thinner toward one end thereof, and a material for the core part is not limited to a specific material.

The core part may therefore comprise either an inorganic material or an organic material.

In particular, the core part desirably comprise an organic material since the organic material is excellent is workability.

Specific examples of the inorganic material include insulator crystals such as $LiNbO_3$ (lithium niobate) and YIG (yttrium iron garnet); semiconductor compounds such as GaAs (gallium arsenide) and InP (indium phosphide); and multi-component glass such as quartz glass and $SiO_2$—$B_2O_3$—$Na_2O$.

Specific examples of the organic material include photosensitive compositions each of which contains a resin component such as PMMA (polymethylmethacrylate), PMMA deuteride, PMMA deuteride fluoride, or PMMA fluoride, and in each of which a monomer, a photo polymerization initiator, an intensifier, a solvent, or the like is blended with the resin component if it is necessary; and resin compositions each of which contains a resin component such as epoxy resin, epoxy resin fluoride, polyolefin resin, silicone resin such as silicone resin deuteride, or resin consisting of benzocyclobutene, and in each of which various additives are blended with the resin component if it is necessary.

Among the examples of the organic material, the photosensitive composition is desirably used. The use of such a photosensitive composition is suitable for forming the core part having the above-mentioned shape. Accordingly, as the organic material, the same compositions as the photosensitive compositions used in the formation of the optical waveguide according to the second aspect of the first group of the present invention and the like are available.

Further, the photosensitive composition may be an inorganic composition containing quartz doped with Ge, P or the like.

The method for forming the core part having the above-mentioned shape using such a photosensitive composition will be described later.

The core part may further contain particles. The optical waveguide using the photosensitive composition containing such particles enables the thermal expansion coefficient of the optical wiring to be matched to that of the optical waveguide when the optical waveguide is directly attached to the optical component or the optical wiring.

Specific examples of the particles include the same particles as those contained in the photosensitive compositions used in the optical waveguide formation method according to the second aspect of the first group of the present invention.

Further, the shape and diameter of each particle are the same as those of the particle contained in the photosensitive compositions used in the optical waveguide formation method according to the second aspect of the first group of the present invention.

If the core part contains particles, a blending ratio of the particles after curing is desirably 10 to 80% by weight, more desirably 20 to 70% by weight. If the blending ratio of the particles is less than 10% by weight, an advantage of blending the particles cannot be greatly acquired. If it exceeds 80% by weight, transmission of the optical signal is often hampered.

In the optical waveguide according to the first aspect of the third group of the present invention, it is desirable that a cladding part is formed around the core part having the above-mentioned shape. By forming the cladding part around the core part, it is possible to further ensure transmitting the optical signal.

If the material for core part is the photosensitive composition and an optical refractive index of the photosensitive composition after being cured is higher than that of the photosensitive composition before being cured, then an uncured photosensitive composition left around the core part when curing a part of the photosensitive composition and forming the core part can function as the cladding part. In this case, however, the cladding part has a fluidity and is not desirable in light of reliability of the optical waveguide. Desirably, therefore, the cladding part is stabilized by being cured.

If the core part is made of the above-mentioned material, the optical refractive index of the material is higher than that of the air. Therefore, the air present around the core part functions as the cladding part and the optical signal can be transmitted by the core part without the need to form the cladding part consisting of the inorganic material or the organic material around the core part.

In the optical waveguide according to the first aspect of the third group of the present invention, therefore, the air can also function as the stable cladding part.

A material for the cladding part is not limited to a specific one as long as the material is lower in optical refractive index than the core part. Specifically, examples of the material for the cladding part include the same materials as those for the core part.

Further, a shape of the cladding part is not limited to a specific shape. The cladding part may have such an outside shape as to be gradually thinner toward one end, a cylindrical shape, or a prismatic shape similarly to the core part.

Further, the cladding part may also contain the above-mentioned particles.

As a method for adjusting the optical refractive indexes of the core part and the cladding part, a conventionally well-known method can be used.

Namely, if the optical waveguide consists of the inorganic material, the optical refractive indexes can be adjusted by blending a dopant for increasing the optical refractive indexes such as titania ($TiO_2$), alumina ($Al_2O_3$), germania ($GeO_2$), or sulfur (S), a dopant for decreasing the optical refractive indexes such as boronia ($B_2O_3$) or fluorine (F), or the like.

As a method for forming the optical waveguide according to the first aspect of the third group of the present invention, a conventionally well-known method can be used if the core part consists of the inorganic material.

Namely, in order to form the optical waveguide consisting of the inorganic material, an epitaxial growth method using vapor-phase epitaxy (VPE), liquid-phase epitaxy (LPE), molecular beam epitaxy (MPE), or the like; a deposition method such as chemical vapor deposition, e.g., plasma CVD, thermal CVD, or optical CVD, vacuum deposition, or physical vapor deposition (PVD), e.g., sputtering, or the like can be used.

If the shape of the core part is set such that the core part is gradually thinner toward one end of the core part when forming the core part consisting of the inorganic material using one of these methods, a raw material may be grown or deposited into such a shape, or a cylindrical or prismatic optical waveguide may be formed first, and the optical waveguide may be then subjected to an etching processing, a polishing processing, or the like, thereby providing the optical waveguide having the above-mentioned shape.

An instance in which the core part consists of the organic material will be described later. The optical waveguide can be formed by an optical waveguide formation method according to the second aspect of the third group of the present invention.

The core part shaped such that the core part is gradually thinner toward one end thereof has been described above. Alternatively, the core part may have one of shapes shown in FIGS. 28(a) to 28(d).

Figure 28:
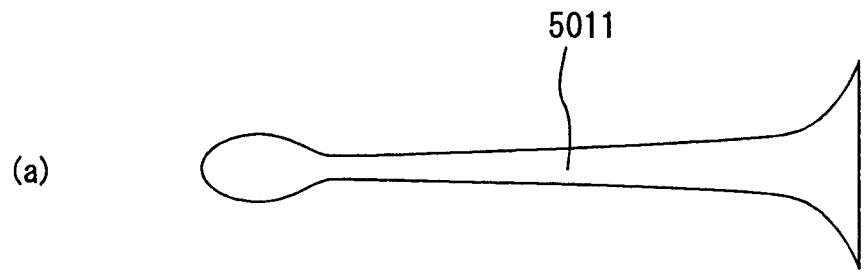
FIGS. 28(a) to 28(d) are schematic diagrams showing examples of shapes of a core part that constitutes the optical waveguide.
Figure 28:
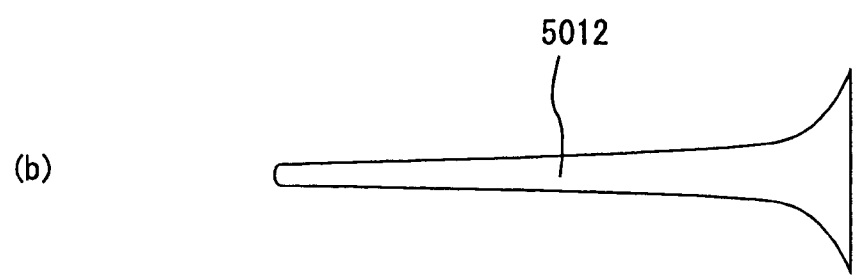
Figure 28:
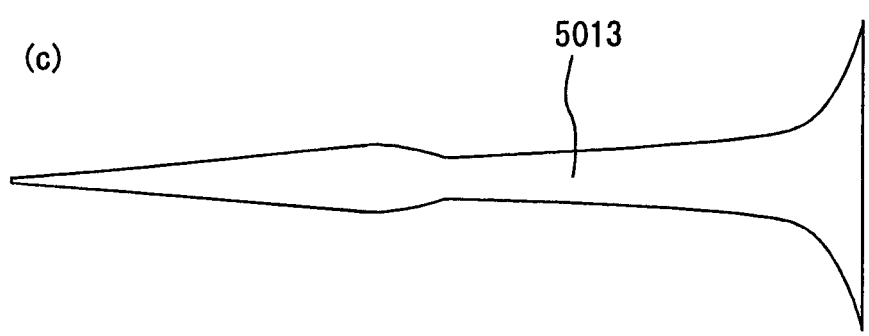
Figure 28:
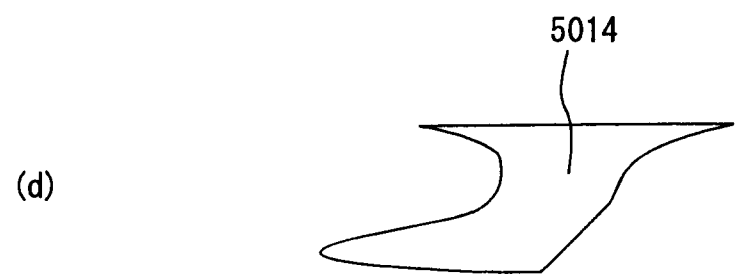

Namely, the shape of a core part 5011 shown in FIG. 28(a) is such that the core part 5011 is gradually thinner toward one end thereof, becomes thick once near the end, and gradually thinner again. The shape of a core part 5012 shown in FIG. 28(b) is such that the core part 5012 is gradually thinner toward one end thereof. However, in FIG. 28(b), the end of the core part 5012 is not steeple-shaped but suddenly thinned to form substantially a sphere. The shape of a core part 5013 shown in FIG. 28(c) is such that the core part 5013 is gradually thinner toward one end thereof, thick by a short distance, and gradually thinner again. The shape of a core part 5014 shown in FIG. 28(d) is such that the core part 5014 is gradually thinner toward one end thereof but bent substantially perpendicularly halfway.

Figure 29:
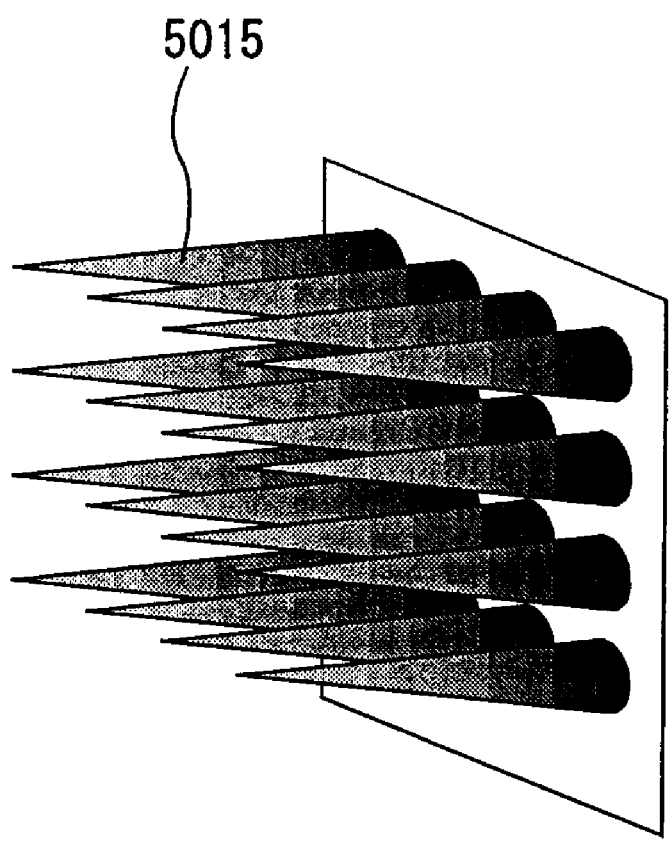
FIG. 29 is a schematic diagram showing an optical waveguide in which a number of core parts are formed in an array.

Further, the optical waveguide according to the first aspect of the third group of the present invention may be such that many core parts 5054 are formed in an array as shown in FIG. 29. In such an optical waveguide, it is possible to ensure that many optical components or optical wirings can be optically connected simultaneously, or to optically connect many optical components and optical wirings simultaneously. It is, therefore, possible to ensure transmitting an optical signal.

The optical waveguide formation method according to the second aspect of the third group of the present invention will be described.

The optical waveguide formation method according to the second aspect of the third group of the present invention comprises a step of irradiating light into a photosensitive composition through an optical wiring, thereby growing a cured matter of said photosensitive composition having a shape for condensing said light to form a core part having such a shape that the core part becomes gradually thinner toward one end of the core part.

With the optical waveguide formation method according to the second aspect of the third group of the present invention, the core part of a shape such that the core part is gradually thinner toward one end thereof can be appropriately formed.

In the optical waveguide formation method according to the second aspect of the third group of the present invention, the core part is formed by forming the cured matter according to an optical path of the irradiated light, and this cured matter is grown into a shape so as to condense the irradiated light. Therefore, the irradiated light follows an optical path condensed in the photosensitive composition. As a result, the core part having the shape such that the core part is gradually thinner toward one end thereof can be formed.

In the optical waveguide formation method according to the second aspect of the third group of the present invention, by irradiating the light into the photosensitive composition through the optical wiring, the photosensitive composition is cured. In the irradiation of the light, one of the following methods may be used.

(i) A method including steps of immersing one end of the optical wiring into the photosensitive composition, and of irradiating the light (hereinafter, also referred to as "a first formation method according to the second aspect of the third group of the present invention").

(ii) A method including steps of putting the photosensitive composition in a container, and of irradiating the light through a wall surface of this container (hereinafter, also referred to as "a second formation method according to the second aspect of the third group of the present invention").

With the first formation method according to the second aspect of the third group of the present invention, an optical waveguide directly attached to the optical wiring can be formed. With the second formation method according to the second aspect of the third group of the present invention, an optical waveguide which can be used in place of a lens when optically connecting mainly the optical components, the optical wirings, or the optical component to the optical wiring.

The first formation method according to the second aspect of the third group of the present invention will f irstbe described with reference to the drawings.

FIGS. 30(a) to 30(c) and FIGS. 31(a) to 31(c) are schematic diagrams for describing embodiments of the optical waveguide formation method according to the second aspect of the third group of the present invention (the first formation method according to the second aspect of the third group of the present invention), respectively.

In the first formation method according to the second aspect of the third group of the present invention, one end of an optical wiring is first immersed in a photosensitive composition, and a light is irradiated into the photosensitive composition through this optical wiring, thereby forming a core part corresponding to an optical path of the light and providing an optical waveguide.

Figure 30:
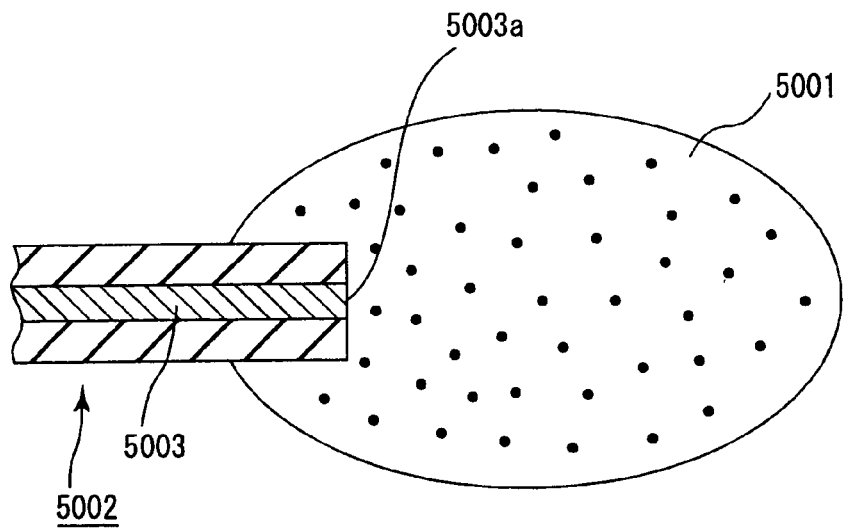
FIGS. 30(a) to 30(c) are schematic diagrams for describing one embodiment of the optical waveguide formation method according to the second aspect of the third group of the present invention.
Figure 30:
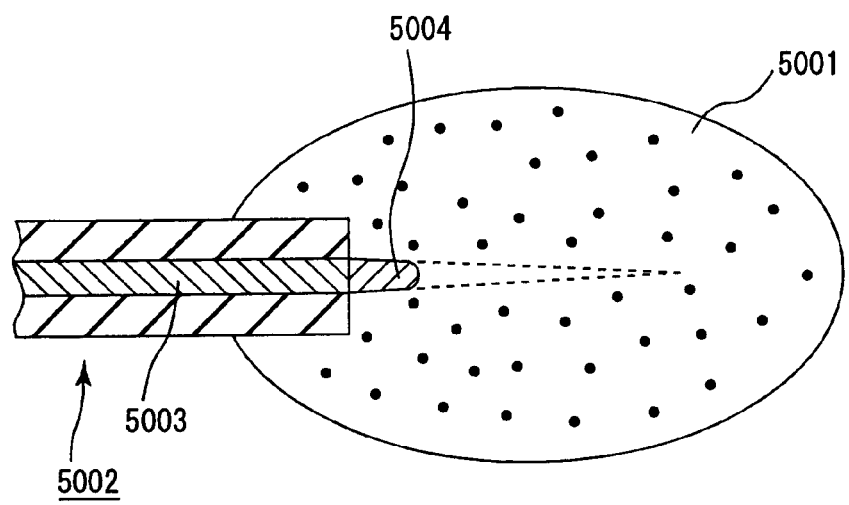
Figure 30:
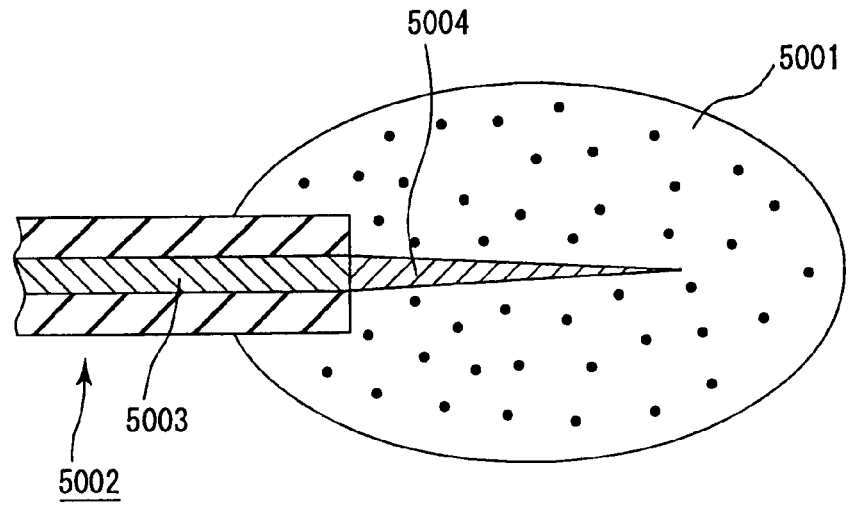
Figure 31:
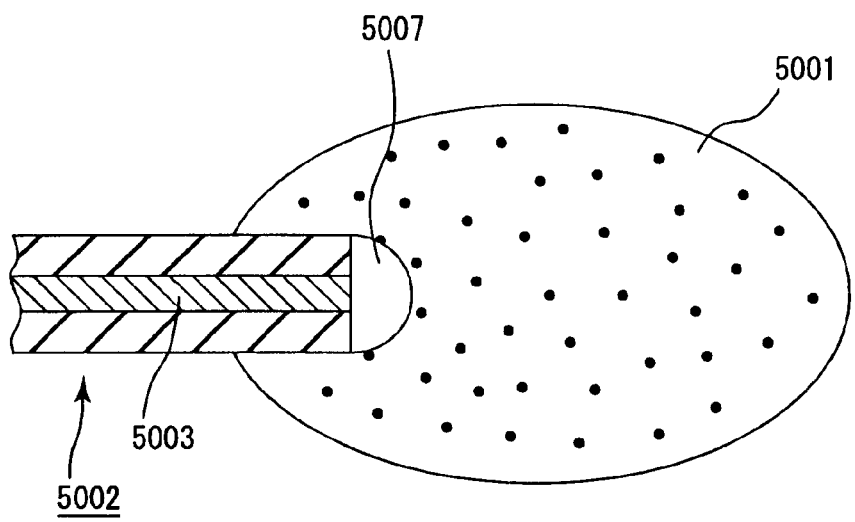
FIGS. 31(a) to 31(c) are schematic diagrams for describing another embodiment of the optical waveguide formation method according to the second aspect of the third group of the present invention.
Figure 31:
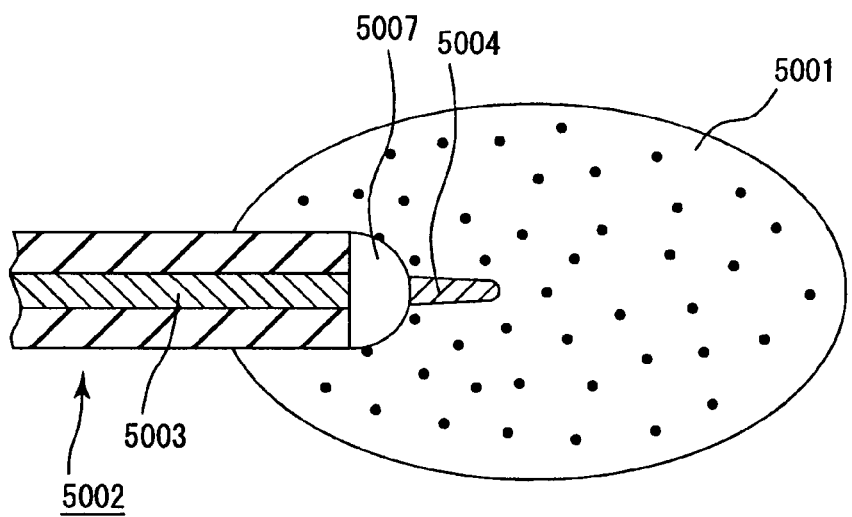
Figure 31:
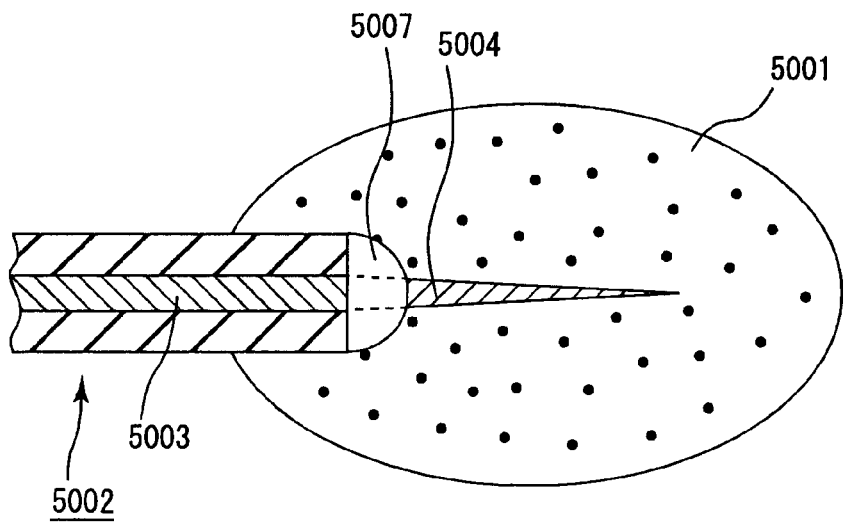

Specifically, a photosensitive composition 5001 is coated so as to surround a tip end of an optical wiring 5002 (see FIGS. 30(a) and 31(a)), the photosensitive composition is put in a container, and one end of the optical wiring is immersed in the photosensitive composition.

Next, light is irradiated into the photosensitive composition 5001 through the optical wiring 5002, thereby growing a cured matter of this photosensitive composition 5001, and forming the core part corresponding to the optical path of the irradiated light.

To grow the cured matter of the photosensitive composition 5001, by growing the cured matter into a shape of condensing the irradiated light (see FIGS. 30(b) and 31(b)), the core part of the shape such that the core part is gradually thinner toward one end thereof can be formed (see FIGS. 30(c) and 31(c)).

Examples of a method for forming the cured matter of the shape of condensing the light includes a method including steps of attaching a condensing lens or a collimator lens to a light emission end of the optical wiring, and of irradiating the light through this condensing lens or the like (see FIG. 31), a method including a step of irradiating a light having a low intensity, and a combination method of these methods.

If the light having a low intensity is irradiated, the intensity changes depending on components of the photosensitive composition. Therefore, a specific intensity cannot be mentioned.

The reason that the cured matter of the shape of condensing the light is formed when the light having a low intensity is irradiated through the optical wiring will be described briefly.

If the light is irradiated through the optical wiring such as an optical fiber, an intensity distribution of the light on an emission-side end surface has a form similar to that of a normal distribution in which the intensity is the highest in a central portion of the optical wiring and continuously lower toward an outer edge of the optical wiring. Due to this, if the light having the low intensity is irradiated into the photosensitive composition through the optical wiring, it is estimated that the cured part that reflects high intensity portion is formed, and that a shape of this cured matter is a shape for condensing the light.

Incidentally, even if light having a high intensity is irradiated through the optical wiring, the high intensity portion of the light on an emission-side end surface has a form similar to that of the normal distribution. However, light irradiated from an outer edge of the end surface has also an intensity enough to cure the photosensitive composition. Thus, in this case, it is estimated that the cure matter that reflects the intensity distribution of the light cannot be formed, and that the shape of the cured matter is not the shape for condensing the light.

As can be understood, with the first formation method according to the second aspect of the third group of the present invention, by growing the cured matter into the shape for condensing the light, the core part of the shape such that the core part is gradually thinner toward one end thereof is formed.

Further, in the first formation method according to the second aspect of the third group of the present invention, the type of the light irradiated when curing the photosensitive composition is not limited to a specific type of light. The light may be appropriately selected based on components of the photosensitive composition. If the photosensitive composition exhibits a photosensitivity in an ultraviolet range, a light source such as a high pressure mercury lamp for irradiating a light having a wavelength in the ultraviolet range can be used. Alternatively, a metal halide lamp, a xenon lamp, a laser, or the like can be used as the light source.

The photosensitive composition after being cured needs to be higher in optical refractive index than that before being cured. If the optical refractive index is higher after the photosensitive composition is cured, the light is irradiated through the optical wiring into the photosensitive composition so that the light is condensed while being constrained in the core part formed.

With the first formation method according to the second aspect of the third group of the present invention, the core part is formed while one end of the optical wiring is immersed in the photosensitive composition. Desirably; therefore, a lower limit of the optical refractive index of this photosensitive composition after being cured is 90% of that of a core of the optical wiring, and an upper limit thereof is 110%.

If the photosensitive composition which can form the core part having the optical refractive indexes within the above-mentioned ranges is used, it is possible to form the core part excellent in connection performance with the optical wiring.

The lower limit of the optical refractive index of the photosensitive composition after curing is more desirably 95% of that of the core of the optical wiring, most desirably 98%. The upper limit thereof is more desirably 105% of that of the core of the optical wiring, most desirably 102%.

Accordingly, if a material for the core of the optical wiring is pure quartz glass and an optical refractive index $n_D$ of pure quartz glass is about 1.46, for example, it is desirable to use the photosensitive composition the optical refractive index $n_D$ of which after being cured is about 1.31 to 1.61.

Further, the optical refractive index of the resin or the like used for the optical wirings or the optical waveguide changes depending on a wavelength. However, a ratio (of the optical refractive index of the core part of the optical waveguide to that of the core of the optical wiring) hardly changes from, for example, an ultraviolet range to a near-infrared range.

In addition, a lower limit of the optical refractive index of the core part before curing, i.e., that of the photosensitive composition or the like itself is also, desirably 90% of that of the core of the optical wiring, more desirably 95%, most desirably 98%. An upper limit thereof is desirably 110%, more desirably 105%, most desirably 102%.

As can be seen, in the optical waveguide formation method according to the second aspect of the third group of the present invention, it is desirable to select and use the photosensitive composition having the optical refractive index within the above-mentioned range after curing. Even if the photosensitive composition has an optical refractive index out of the above-mentioned range, the photosensitive composition can be used by adjusting the optical refractive index. If the optical refractive index of the photosensitive composition is to be adjustable, it is desirable to make adjustment so that the optical refractive indexes of the core part before and after curing fall within the respective ranges described above.

As a method for adjusting the optical refractive index of the photosensitive composition, the same method as that described in relation to the second aspect of the first group of the present invention, that is, a method for adjusting a molecular refraction and a molecular volume, for example, can be used.

The definition of "the optical refractive index of the core of the optical wiring" is the same as that according to the second group of the present invention.

The method for forming the optical waveguide by immersing one end of the optical wiring in the photosensitive composition has been described. Alternatively, an optical element such as a light emitting element can be used in place of the optical wiring. By immersing a light emitting surface (light emitting portion) of the light emitting element in the photosensitive composition or coating the photosensitive composition on the light emitting surface, the core part directly attached to the light emitting surface of the optical component can be formed.

For the optical wirings or the optical components to which the core part is directly attached, positioning of the optical waveguide (core part) and each optical wiring or the like is unnecessary.

The second formation method according to the second aspect of the third group of the present invention will next be described with reference to the drawings.

Figure 32:
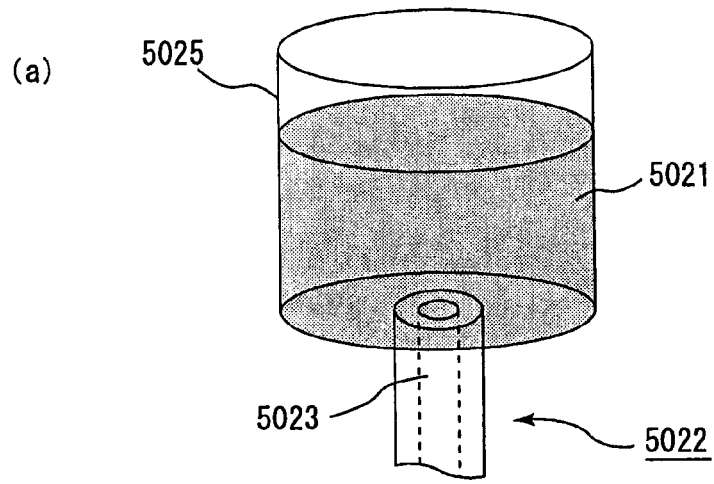
FIGS. 32(a) to 32(c) are schematic diagrams for describing still another embodiment of the optical waveguide formation method according to the second aspect of the third group of the present invention.
Figure 32:
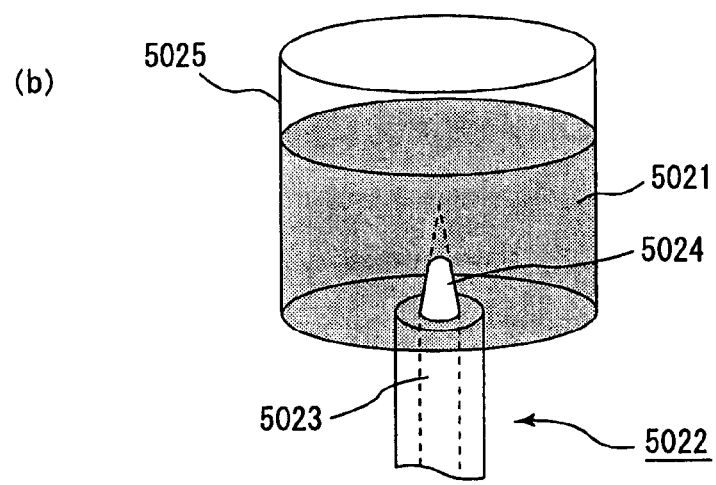
Figure 32:
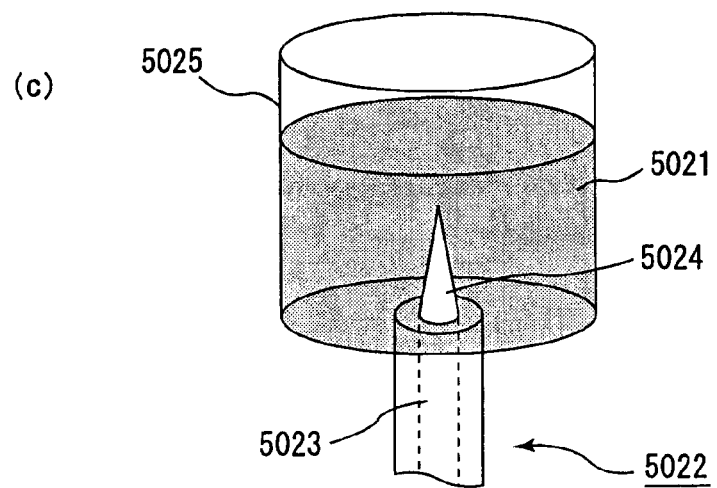

FIGS. 32(a) to (c) are schematic diagrams for describing one embodiment of the optical waveguide formation method according to the second aspect of the third group of the present invention (the second formation method according to the second aspect of the third group of the present invention).

In the second formation method according to the second aspect of the third group of the present invention, a photosensitive composition is first put in a container, and a light is irradiated into the photosensitive composition through a wall surface of this container, thereby forming a core part corresponding to an optical path of the light and providing an optical waveguide.

A material for the container is not limited to a specific material as long as the material transmits the irradiated light. A shape of the container is not limited to a specific shape.

Specifically, a photosensitive composition 5021 is put in a cylindrical container 5025, and one end of an optical wiring 5022 is fixedly attached to a bottom of this container 5025 (see FIG. 32(a)).

Next, light is irradiated into the photosensitive composition 5021 through the wall surface (bottom) of the container 5026, thereby growing a cured matter of this photosensitive composition 5021, and forming the core part corresponding to the optical path of the irradiated light.

To grow the cured matter of the photosensitive composition 5021, by growing the cured matter into a shape of condensing the irradiated light (see FIG. 32(b)), the core part of the shape such that the core part is gradually thinner toward one end thereof can be formed (see FIG. 32(c)).

Examples of a method for forming the cured matter of the shape of condensing the light includes a method including steps of attaching a condensing lens or a collimator lens to an end of the optical wiring on a side on which the optical wiring is attached to the wall surface of the container, and of irradiating the light through this condensing lens or the like, a method including a step of irradiating a light having a low intensity, and a combination method of these methods.

In the second formation method according to the second aspect of the third group of the present invention, similarly to the first formation method, the intensity of the light for the method of irradiating the light having a low intensity changes depending on components of the photosensitive composition, the material for the container, and the like. Therefore, a specific intensity cannot be mentioned.

In the second formation method according to the second aspect of the third group of the present invention, examples of the light irradiated when curing the photosensitive composition include the same as those used in the first formation method according to the second aspect of the third group of the present invention. As a light source of the light, the same as that used in the first formation method according to the second aspect of the third group of the present invention can be used.

Similarly to the photosensitive composition used in the first formation method according to the second aspect of the third group of the present invention, the photosensitive composition used in the second formation method according to the second aspect of the third group of the present invention needs to be a photosensitive composition which has higher optical refractive index after being cured compared to that before being cured.

By using the first or second formation method according to the second aspect of the third group of the present invention, the core part of the shape such that the core part is gradually thinner toward one end thereof can be formed.

In the first or second formation method according to the second aspect of the third group of the present invention, to form the core part corresponding to the optical path of the light irradiated through the optical wiring, if the core part is formed by arranging an optical element such as a light receiving element so that a light receiving element (light receiving portion) of the element is arranged on the optical path of this light, and by irradiating the light while the optical element is being arranged, the cured matter of the photosensitive composition is grown so as to condense the light toward the light receiving surface. Therefore, the core part directly attached to the light receiving surface of the optical component can be formed. The optical component to which the core part formed by such a method is directly attached can ensure receiving the optical signal.

In the optical waveguide formation method according to the second aspect of the third group of the present invention, after forming the core part by one of the above-mentioned methods, a stable cladding part is desirably formed around the core part.

The reason is as follows. By forming the stable cladding part around the core part, the optical waveguide which can ensure transmitting the optical signal can be provided.

If the cladding part is to be formed, a more stable cladding part can be formed by forming the core part, removing the uncured photosensitive composition around the core part, immersing the core part in another resin composition (which may be either the photosensitive composition or non-photosensitive composition), and subjecting this resin composition to a curing processing.

With this method, however, it is required to deal with the core part very carefully when removing the uncured photosensitive composition or the like. Therefore, the method is not so practical.

Desirably, therefore, the method described in relation to the optical waveguide formation method according to the second aspect of the first group of the present invention, that is, the method for forming the core part and the cladding part using the photosensitive composition in which the core formation resin and the cladding formation resin are mixed together in advance is used.

As the photosensitive composition containing the core formation resin and the cladding formation resin, one of the same photosensitive compositions as those used according to the second aspect of the first group of the present invention can be used.

According to the second aspect of the third group of the present invention, by irradiating a light having an intensity with which the light can polymerize the core formation resin but the light substantially cannot polymerize the cladding formation resin into the photosensitive composition when the light is irradiated into the photosensitive composition using the method for irradiating the light having the low intensity, or the method for irradiating the light through the condensing lens, only the core formation resin is preferentially cured, the core part corresponding to the path of the light is formed, and the uncured photosensitive resin surrounds the core part, similarly to the second aspect of the first group of the present invention.

Thereafter, by curing the cladding formation resin, the stable cladding part can be formed around the core part. If the cladding formation resin is cured using such a method, the uncured core formation resin is sometimes cured when curing the cladding formation resin similarly to the second aspect of the first group of the present invention.

By using such a formation method, the optical waveguide excellent in connection performance with the optical wirings and excellent in stability after the entire system is solidified, can be formed.

If the optical waveguide of one of the shapes shown in FIGS. 28(a) to 28(c) is formed, the intensity of an irradiated light may be changed with passage of time according to the shape of the optical waveguide when, for example, the light is irradiated into the photosensitive composition using the above-mentioned method. If the optical waveguide of the shape shown in FIG. 28(d) is formed, the mirror or the like may be arranged on the optical path in advance when, for example, the light is irradiated into the photosensitive composition using one of the above-mentioned methods.

Furthermore, to form the core part, a resist formation method, a mold formation method, an exposure-development method, an RIE (Reactive Ion Etching) method, or the like can be used.

BEST MODE FOR CARRYING OUT THE INVENTION

Embodiments according to the first to third groups of the present invention described above will be described hereinafter in detail. It should be noted that the embodiments according to the first to third groups of the present invention are not limited thereto.

EXAMPLE 1

A. Preparation of Photosensitive Composition

As a photosensitive composition, an acrylate-based UV-cured adhesive cured by a radical polymerization reaction when being irradiated with ultraviolet rays (Loctite 358 made by Loctite Corporation; hereinafter, referred to as "resin A") was prepared.

An optical refractive index of this resin A at a wavelength of 589 nm is about 1.48 before curing and about 1.51 after curing.

Figure 24:
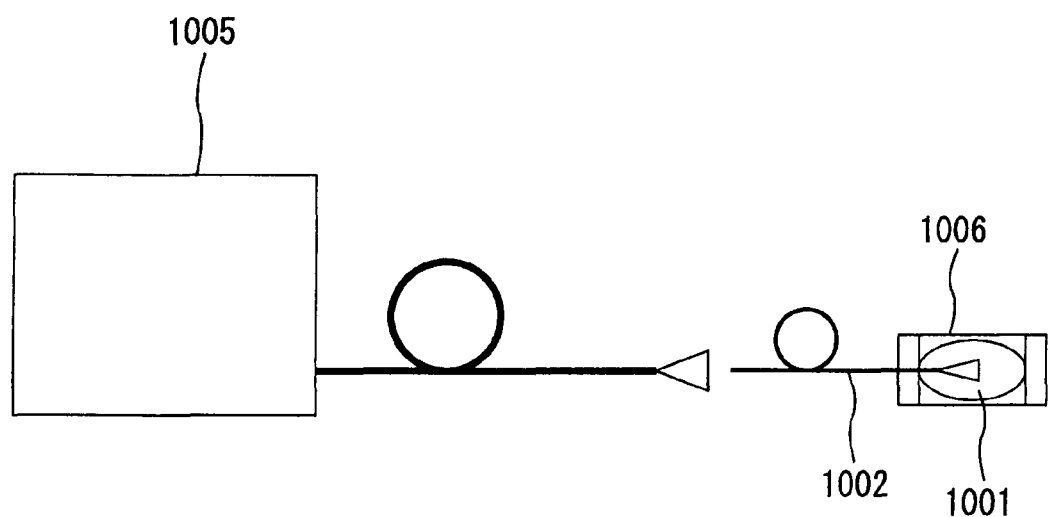
FIG. 24 is a general view for describing the optical waveguide formation method according to Example 1.

B. Formation of Optical Waveguide (see FIG. 24)

(1) AGI multimode fiber made of quartz and having a length of about one meter (made by Fujikura Ltd., core/cladding part=50 μm/125 μm) was prepared.

After cutting this optical fiber on a side on which the optical fiber was immersed in the photosensitive composition by a cutting tool (a nipper), a cladding part was exposed by peeling off about 10 mm of a coating layer from an end surface side by an ordinary method. Thereafter, the optical fiber was not specially subjected to a planarization processing.

As for a roughness of an end surface of a core of the optical fiber on the side on which the optical fiber was immersed in the photosensitive composition, Ra was 1 μm and Rmax was 10 μm. The roughness of this end surface was measured by a laser displacement gauge manufactured by Keyence Corporation.

An optical refractive index of the core of this optical fiber at a wavelength of 589 nm is about 1.48.

(2) UV-containing light having a spectral distribution in a wavelength range of 200 to 500 nm was incident on one end of the optical fiber 1002 by an ultraviolet irradiation device 1005 (5252L, manufactured by Matsushita Machine and Vision Ltd.) using a high pressure mercury lamp of 250 W as a light source. A luminous intensity of an ultraviolet ray emitted from the other end of the optical fiber 1002 was adjusted to 0.3 mW/cm$^2$ by a UV luminometer (UIT-150, manufactured by Ushio Inc.).

(3) An emission-side end of the optical fiber 1002 was located in an optical fiber V-groove substrate 1006 (quartz V groove, made by Moritex Corporation), the photosensitive composition 1001 prepared in the process A was coated on the entire end of the optical fiber 1002 so as to bury the photosensitive composition 1001 in the end without gap. Thereafter, the end of the optical fiber 1002 and the photosensitive composition 1001 were caught in a V-groove fixation plate so as not to be moved.

(4) While keeping the optical fiber 1002 in the state described in (3) above, the UV-containing light the luminous intensity of which was adjusted in the step (2) was irradiated from the emission end of the optical fiber 1002 into the photosensitive composition 1001, thereby forming a core part.

In this step (4), shapes of the core part formed by irradiating the UV-containing light for one second, three seconds and 10 seconds, respectively, were observed by a microscope (VH-7000, manufactured by Keyence Corporation). As a result, when the UV-containing light was irradiated for one second, three seconds and 10 seconds, the core part of about 300 µm, about 500 µm and about 1 mm were formed, respectively.

After the step (4) was finished, visible light was irradiated to the core part thus formed from the emission end of the optical fiber 1002, and leakage light from an optical waveguide was observed. The leakage light was observed along a shape of the optical waveguide, and it was confirmed that a stable optical waveguide was formed.

In addition, an optical refractive index of the core part of the optical waveguide formed in this example is 102% of that of the core of the optical fiber 1002 connected to the core part.

A relative value (102%) of the optical refractive index of the core part of the optical waveguide to the optical refractive index of the core of this optical wiring was calculated based on the optical refractive index (about 1.48) of the core of the optical fiber at the wavelength of 589 nm and the optical refractive index (about 1.51) of the resin A at the wavelength of 589 nm after curing. In the following examples, reference examples and comparative examples, the same calculation method is applied.

Further, a return loss of an optical transmission structural body comprising the optical fiber and the optical waveguide thus manufactured was measured as 50 dB. The measurement of the return loss was carried out according to the method (4) according to JIS C 5961 6.2.4.

EXAMPLE 2

An optical waveguide was formed similarly to Example 1 except that a fitting plate made of quartz glass was arranged on an optical path of irradiated light so as to be inclined at 45° with respect to an end surface of an optical fiber in the step (3) of the process B in Example 1 (see FIG. 15).

The optical waveguide formed in this example was observed by a microscope. As a result, it was confirmed that an optical path conversion mirror inclined at 45° with respect to the end surface of the optical fiber was formed on an end surface of the optical waveguide at opposite side to a side on which the optical waveguide was coupled to the optical fiber.

In addition, for the optical waveguide formed in this example, an uncured photosensitive composition was removed to allow surroundings of a core part to serve as a cladding part comprising the air. In this state, similarly to Example 1, visible light was irradiated from an emission end of the optical fiber. As a result, it was confirmed that an optical path of the visible light was converted by 90° on the end surface of the optical waveguide at opposite side to the side on which the optical waveguide was coupled to the optical fiber.

Furthermore, a return loss of an optical transmission structural body comprising the optical fiber and the optical waveguide manufactured in this example was measured as 50 dB.

EXAMPLE 3

An optical waveguide was formed similarly to Example 1 except that a mirror a reflection surface of which is made of aluminum was arranged on an optical path of irradiated light so as to be inclined at 45° with respect to an end surface of an optical fiber in the step (3) of the process B in Example 1 (see FIG. 16).

The optical waveguide formed in this example was observed by a microscope. As a result, it was confirmed that the optical waveguide was bent at 90° halfway.

In addition, for the optical waveguide formed in this example, similarly to Example 1, visible light was irradiated from an emission end of the optical fiber and leakage light of the optical waveguide was observed. As a result, it was confirmed that an optical path was converted by 90° halfway along the optical waveguide.

Furthermore, a return loss of an optical transmission structural body comprising the optical fiber and the optical waveguide manufactured in this example was measured as 50 dB.

EXAMPLE 4

Figure 18:
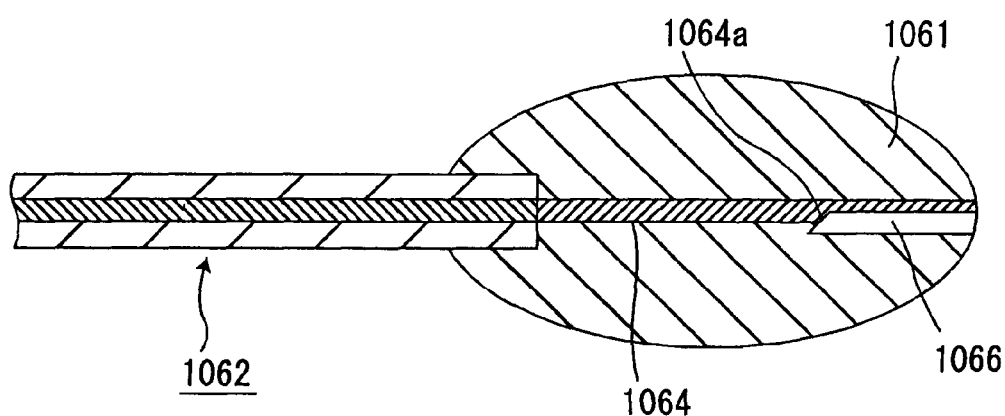
FIGS. 18(a) and 18(b) are schematic diagrams for describing part of steps of the optical waveguide formation method according to the second aspect of the first group of the present invention.
Figure 18:
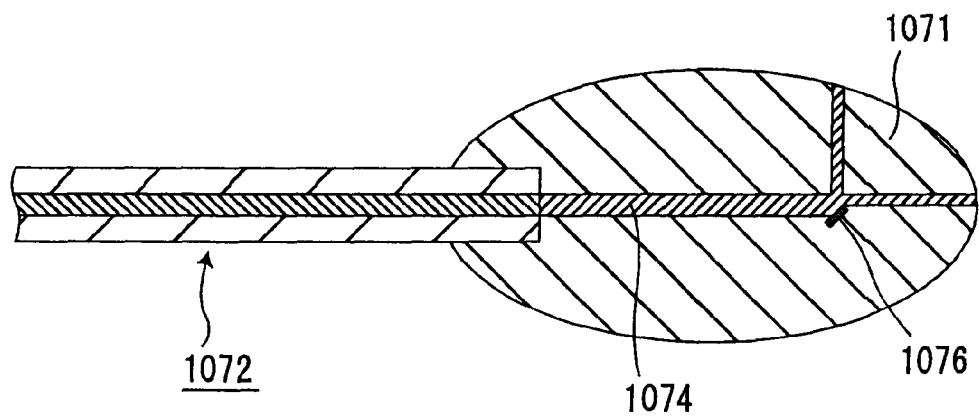
Figure 19:
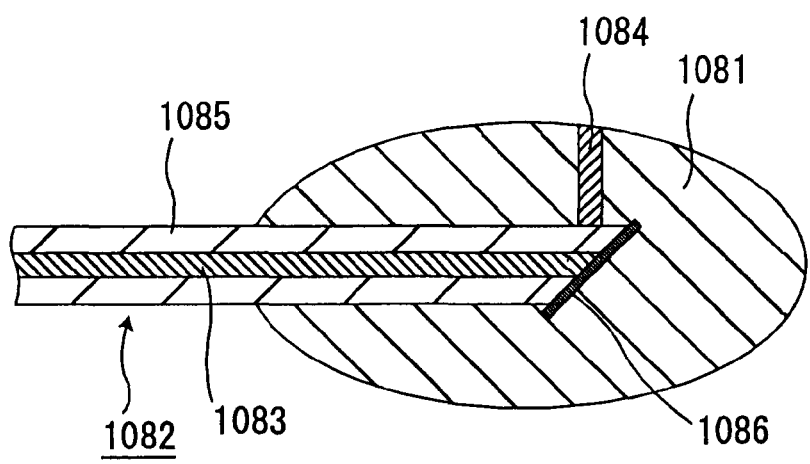
FIG. 19(a) is a schematic diagram for describing part of steps of the optical waveguide formation method according to the second aspect of the first group of the present invention.
FIG. 19(b) is a partly enlarged cross-sectional view of FIG. 19(a).
Figure 19:
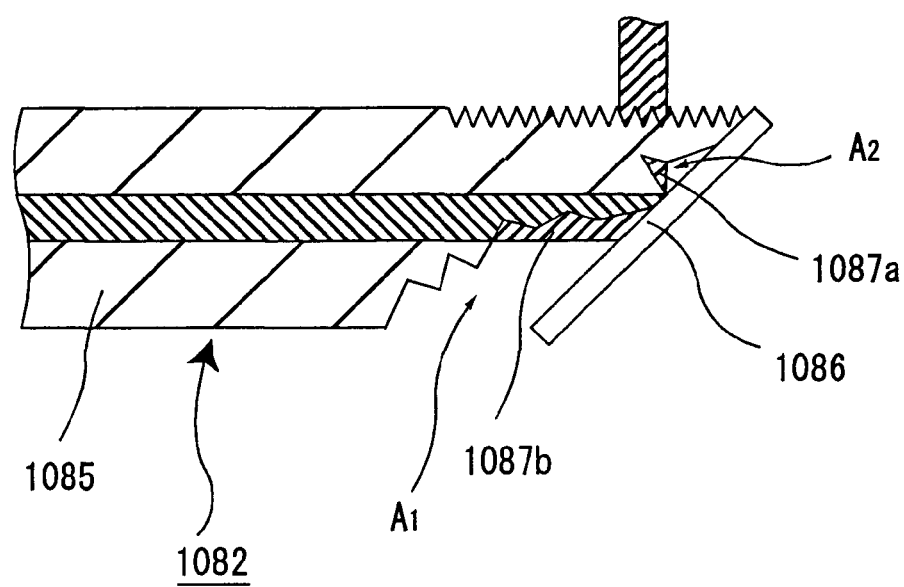

An optical waveguide was formed similarly to Example 1 except that a mirror a reflection surface of which is made of aluminum was arranged on a part of an optical path of an irradiated light so as to be inclined at 45° with respect to an end surface of an optical fiber in the step (3) of the process B in Example 1 (see FIG. 18(*b*)).

The optical waveguide formed in this example was observed by a microscope. As a result, it was confirmed that an optical path conversion mirror was formed halfway along the optical waveguide, and that the optical waveguide was branched into two directions in a portion of the optical path conversion mirror.

In addition, for the optical waveguide formed in this example, similarly to Example 1, visible light was irradiated from an emission end of the optical fiber and leakage light of the optical waveguide was observed. As a result, it was confirmed that an optical path was branched into two parts halfway along the optical waveguide, and that the visible light was emitted from each of two end surfaces.

Furthermore, a return loss of an optical transmission structural body comprising the optical fiber and the optical waveguide manufactured in this example was measured as 50 dB.

EXAMPLE 5

A. Preparation of Photosensitive Composition

A resin A was prepared similarly to Example 1.

Figure 25:
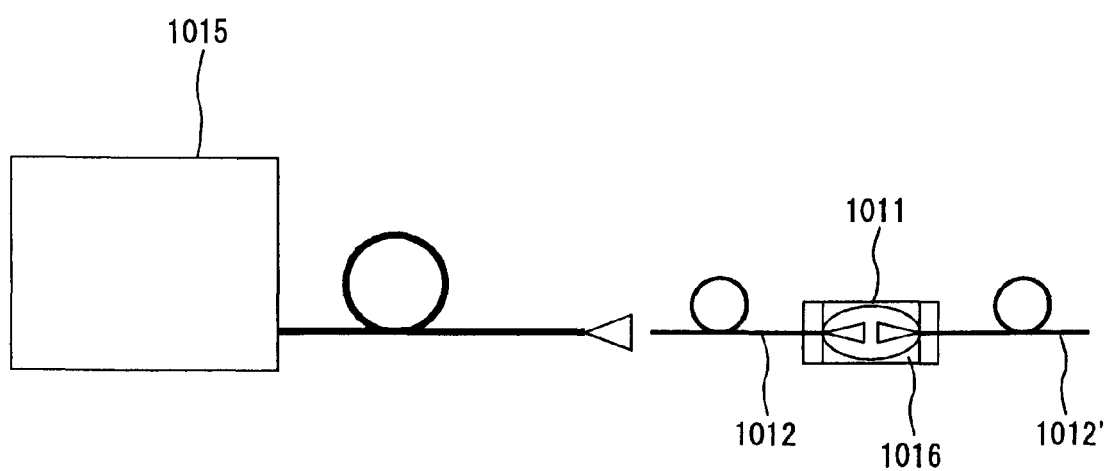
FIG. 25 is a general view for describing the optical waveguide formation method according to Example 5.

B. Formation of Optical Waveguide (see FIG. 25)

(1) Similarly to Example 1, five sets of two GI multimode fibers made of quartz and having a length of about one meter (made by Fujikura Ltd., core/cladding part=50 µm/125 µm) (ten GI multimode fibers in all) were prepared. As optical fibers, the following fibers were used. After cutting each fiber on a side on which the optical fiber was immersed in the photosensitive composition by a cutting tool (a nipper), a cladding part was exposed by peeling off about 10 mm of a coating layer from an end surface by an ordinary method. Thereafter, the optical fiber was not specially subjected to a planarization processing. Although roughnesses of end surfaces of these optical fibers were irregular, an average Ra was 2 µm and an average Rmax was 20 µm.

(2) UV-containing light having a spectral distribution in a wavelength range of 200 to 500 nm was input from one end of each set of a pair of optical fibers 1012 and 1012' by an ultraviolet irradiation device 1015 (5252L, manufactured by Matsushita Machine and Vision Ltd.) using a high-pressure mercury lamp of 250 W as a light source. A luminous intensity of ultraviolet rays emitted from the other emission-side end of each of the optical fibers 1012 and 1012' was adjusted to 0.3 mW/cm$^2$ by a UV luminometer (UIT-150, manufactured by Ushio Inc.).

(3) The emission-side ends of the respective optical fibers 1012 and 1012' were located face to face with each other with a distance of about 500 μm kept between the optical fibers 1012 and 1012' and placed on an optical fiber V-groove substrate 1016 (quartz V groove, made by Moritex Corporation). The photosensitive composition 1001 prepared in the process A was coated on an entire faced portion so as to bury the photosensitive composition 1001 between the optical fibers 1012 and 1012' without gap. Thereafter, the faced portion of optical fibers and the photosensitive composition 1001 were caught in a V-groove fixation plate so as not to be moved.

(4) While keeping the optical fibers 1012 and 1012' in the state described in (3) above, light having a power of about −10 dBm (about 0.1 mW) was incident on an incidence side of one optical fiber 1012 using an LED light source at a wavelength of 850 nm (AQ2140 and AQ4215, manufactured by Ando Electric Co., Ltd.), and a power of light emitted from an incidence side of the other optical fiber 1012' was measured by a power meter (AQ2140 and AQ2730, manufactured by Ando Electric Co., Ltd.)

(5) While keeping the optical fibers 1012 and 1012' in the state described in (3) above, UV-containing lights the luminous intensity of each of which was adjusted in the step (2) were simultaneously irradiated from emission ends of the respective optical fibers 1012 and 1012' into the photosensitive composition 1011 for one to two seconds.

When the steps (1) to (4) were carried out for each of the five sets of the optical fibers, the photosensitive composition 1011 was not cured yet. At the end of the step (4) an optical power loss of 8 dB or more was measured for each set. In addition, at the end of the step (5), core parts were formed on the emission ends of the respective optical fibers 1012 and 1012' for each set. An microscopic observation indicated that the respective core parts were coupled to each other in the vicinity of a center.

Further, after the step (5) was finished, an optical power loss at a wavelength of 850 nm was measured by the same method as that used in the step (4). The optical power loss was 1.6 to 3.3 dB, which was greatly lower than the value measured between the optical fibers for each set after the step (4) was finished. This indicated that in the optical fibers for each set, the two optical fibers 1012 and 1012' were surely, optically coupled to each other. It was confirmed that after the step (5) was finished, light was guided through the core part.

Furthermore, a return loss of an optical transmission structural body comprising the two optical fibers and the optical waveguide manufactured in this example was measured for each set. Return losses of the five sets were all 50 dB or more.

It is noted that an optical refractive index of the core part of the optical waveguide formed in this example is 102% of that of a core of each optical fiber to which the core part was connected.

EXAMPLE 6

In the step (1) of the process B in Example 5, five sets of two GI multimode fibers each consisting of quartz and each having a length of about one meter (ten GI multimode fibers in all) similar to those used in Example 1 were prepared. Optical waveguides were formed similarly to Example 1 except for the following respects. As optical fibers, the following fibers were used. After cutting each fiber on a side on which the optical fiber was immersed in the photosensitive composition by a cutting tool (a nipper), a processing of peeling of a coating layer was not carried out, and a planarization processing was not specially carried out. Although roughnesses of end surfaces of the optical fibers thus cut were irregular, an average Ra was 2 μm and an average Rmax was 20 μm. In addition, the coating layer is left in the vicinity of the end surface of each optical fiber used in this example on the side on which the optical fiber was immersed in the photosensitive composition.

A shape of a core part of each optical waveguide formed in this example was observed by a microscope. The microscopic observation indicated that each core has a stable shape, and that the core parts were coupled to each other in the vicinity of a center.

Further, an optical power loss of each of the five sets of optical fibers was measured using the same method as that used in Example 5. It was confirmed that before and after the lights were simultaneously irradiated from the respective optical fibers, the loss was greatly reduced from 8 dB or more down to 1.5 to 3.3 dB for each set.

Furthermore, a return loss of an optical transmission structural body comprising the two optical fibers and the optical waveguide manufactured in this example was measured for each set. Return losses of the five sets were all 50 dB or more.

It is noted that an optical refractive index of the core part of each optical waveguide formed in this example is 102% of that of a core of each optical fiber to which the core part was connected.

EXAMPLE 7

A. Preparation of Photosensitive Composition

As a photosensitive composition, a UV-cured adhesive cured when being irradiated with ultraviolet rays (OPTOKLEB HV16 made by Ardel Co.; hereinafter, referred to as "resin B") was prepared.

An optical refractive index of this resin B at a wavelength of 589 nm is about 1.57 before curing and about 1.60 after curing.

B. Formation of Optical Waveguide

A core part of each optical waveguide made of the resin B was formed similarly to Example 5 except for the use of the photosensitive composition (resin B) prepared in the step of the process A. A shape of this core part was observed by a microscope. The microscopic observation indicated that the core part has a stable shape, and that the core parts of each optical waveguides were coupled in the vicinity of the center.

Further, an optical power loss of each of five sets of optical fibers was measured using the same method as that used in Example 5. It was confirmed that before and after the lights were simultaneously irradiated from the respective optical fibers, the loss was greatly reduced from 8 dB or more down to 2.3 to 6.5 dB for each set.

Furthermore, a return loss of an optical transmission structural body comprising the two optical fibers and the optical waveguide manufactured in this example was measured for each set. Return losses of the five sets were all 50 dB or more.

It is noted that an optical refractive index of the core part of each optical waveguide formed in this example is 108% of that of a core of each optical fiber to which the core part was connected.

EXAMPLE 8

A. Preparation of Photosensitive Composition

As a photosensitive composition, the resin B and an acrylate-based UV-cured adhesive cured when being irradiated with ultraviolet rays (OPTODYNEUV2000, made by Daikin Industries, Ltd.; hereinafter, referred to as "resin C") were prepared.

An optical refractive index of this resin C at a wavelength of 589 nm is about 1.45 before curing, and about 1.48 after curing.

Figure 43:
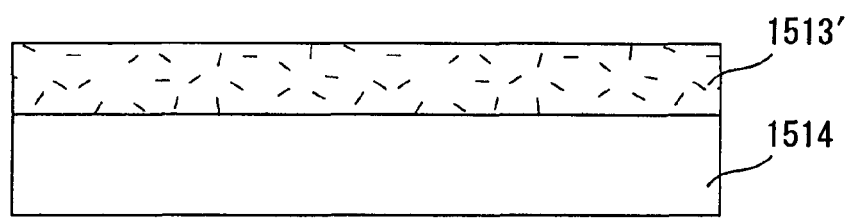
FIG. 43 is a general view for describing an optical wiring formation method according to Example 8.
Figure 43:
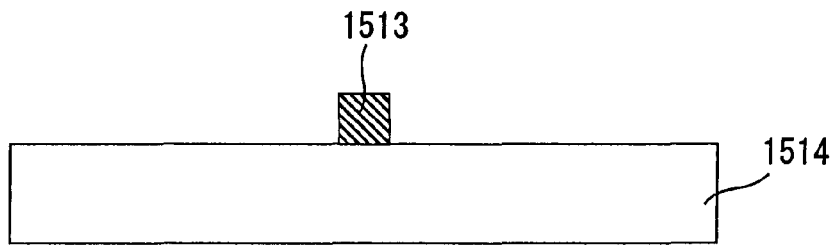
Figure 43:
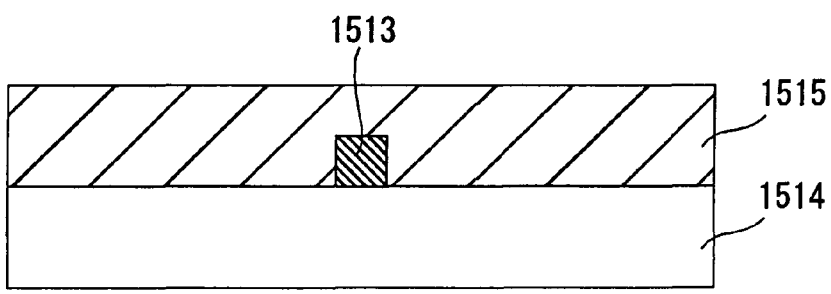

B. Formation of Optical Wiring (see FIG. 43)

(1) The resin B was coated on a flat quartz glass plate 1514 by spin coating so that a film thickness of the resin B after curing was about 40 μm, thereby forming a core formation resin layer 1513' (see FIG. 43(a)).

(2) A mask (not shown) drawing a core pattern (a width of 40 μm) was placed on the core formation resin layer, and an exposure processing was then carried out, thereby forming a linear core 1513. After an unexposed portion was removed by alcohol (see FIG. 43(b)), an appropriate quantity of the resin C was coated on the core 1513 thus formed, and an exposure processing was carried out to cure the resin C.

(3) Through these steps, an optical wiring (a linear waveguide) comprising the core 1513 made of a cured matter of the resin B, and a cladding part comprising the quartz glass 1514 and a cured matter 1515 of the resin C was formed (see FIG. 43(c)).

(4) Five optical wirings were manufactured, and were broken and cut almost at centers, respectively.

Figure 44:
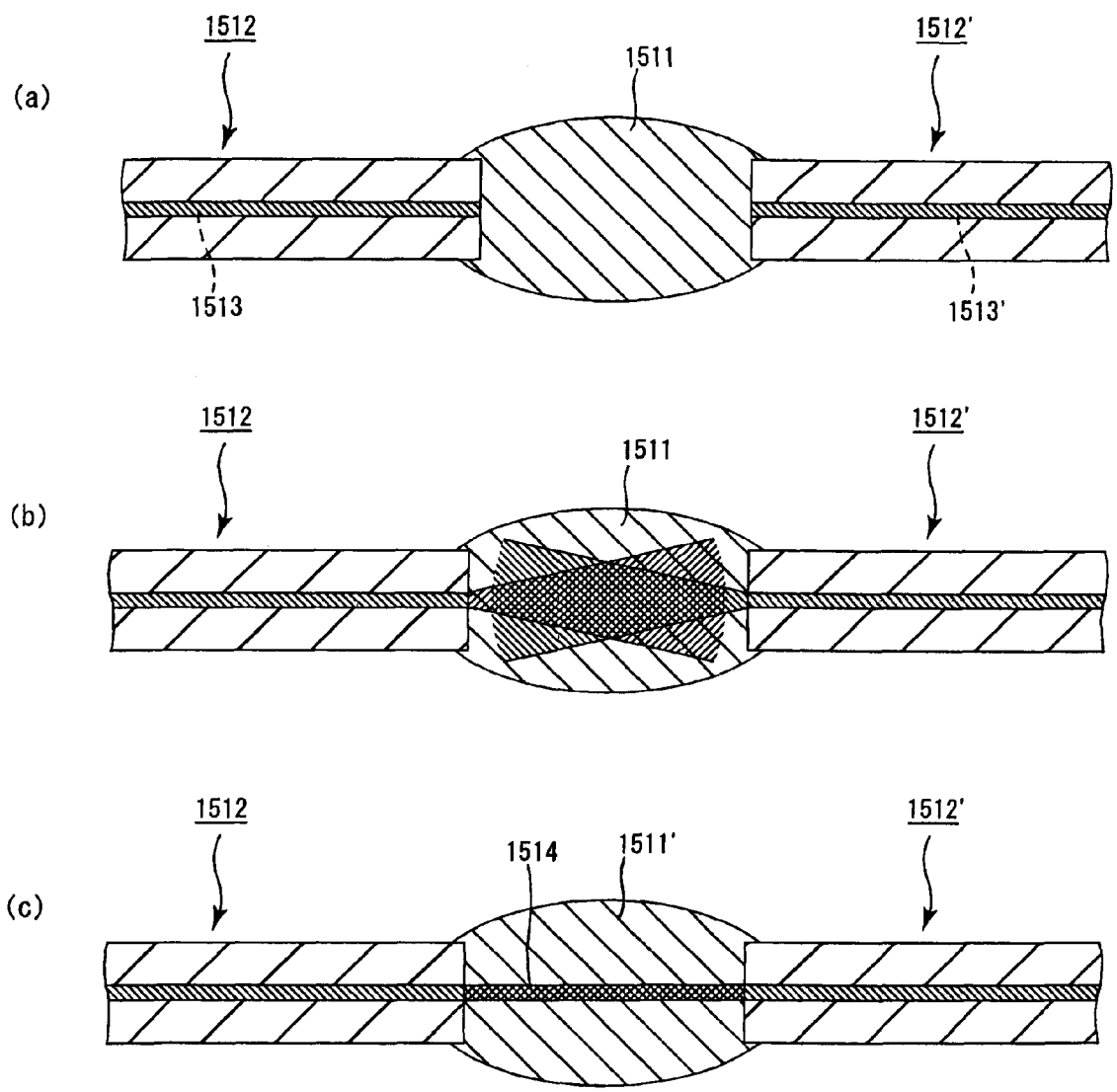
FIG. 44 is a general view for describing the optical waveguide formation method according to Example 8.

C. Formation of Optical Waveguide (see FIG. 44)

(1) The five sets of optical wirings (linear waveguides) (ten in all) manufactured through the steps of the process B were prepared. An end surface of a core of each optical wiring on a side on which the optical wiring was immersed in the photosensitive composition was broken and cut, and not specially subjected to a planarization processing. Although roughnesses of the optical wirings were irregular, an average Ra was 2 μm and an average Rmax was 20 μm.

(2) UV-containing light having a spectral distribution in a wavelength range of 200 to 500 nm was input from one end of a set of two optical wirings 1512 and 1512' through an optical fiber by an ultraviolet irradiation device (5252L, manufactured by Matsushita Machine and Vision Ltd.) using a high pressure mercury lamp of 250 W as a light source. A luminous intensity of ultraviolet rays emitted from the other emission-side end of each of the optical wirings 1512 and 1512' was adjusted to 0.3 mW/cm$^2$ by a UV luminometer (UIT-150, manufactured by Ushio Inc.).

(3) The emission-side ends of the respective optical wirings 1512 and 1512' were located face to face, with a distance of about 500 μm kept between the optical fibers 1512 and 1512'. The photosensitive composition (resin C) 1511 prepared in the process A was coated on an entire faced portion so as to bury the photosensitive composition 1511 between the optical wirings 1512 and 1512' without gap (see FIG. 44(a)). Thereafter, the faced portion of optical fibers and the resin C were caught in a fitting plate so as not to be moved.

(4) While keeping the optical wirings 1512 and 1512' in the state described in (3) above, light having a power of about −10 dBm (about 0.1 mW) was incident on an incidence side of one optical wiring 1512 using an LED light source at a wavelength of 850 nm (AQ2140 and AQ4215, manufactured by Ando Electric Co., Ltd.), and a power of light emitted from an incidence side of the other optical wiring 1512' was measured by a power meter (AQ2140 and AQ2730, manufactured by Ando Electric Co., Ltd.)

(5) While keeping the optical wirings 1512 and 1512' in the state described in (3) above, UV-containing lights the luminous intensity of each of which was adjusted in the step (2) were simultaneously irradiated from emission ends of the respective optical wirings 1512 and 1512' into the photosensitive composition (resin C) 1511 for one to two seconds (see FIG. 44(b)).

At the end of the step (5), core parts were formed on the emission ends of the respective optical wirings 1512 and 1512' for each set, and a microscopic observation indicated that the core parts were coupled to each other in the vicinity of a center (see FIG. 44(c)).

An optical power loss was measured for each of the five sets of the optical wirings using the same method as that used in Example 5. It was confirmed that before and after the lights were simultaneously irradiated from the respective optical wirings, the loss was greatly reduced from 8 dB or more down to 2.5 to 6.8 dB for each set.

Furthermore, a return loss of an optical transmission structural body comprising the two optical wirings and the optical waveguide manufactured in this example was measured for each set. Return losses of the five sets were all 50 dB or more.

It is noted that an optical refractive index of the core part of each optical waveguide formed in this example is 93% of that of a core of each optical wiring to which the core part was connected.

EXAMPLE 9

A. Preparation of Photosensitive Composition

As a photosensitive composition, a UV-cured adhesive cured when being irradiated with an ultraviolet ray (NOA 72 made by Noland Company; hereinafter, referred to as "resin D") was prepared.

It is noted that an optical refractive index of this resin D at a wavelength of 589 nm is about 1.53 before curing and about 1.56 after curing.

B. Formation of Optical Waveguide

Similarly to Example 5 except for the use of the photosensitive composition (resin D) prepared in the step of the process A, core parts of each optical waveguide made of the resin D were formed. A shape of each core part of the optical waveguide was observed by a microscope. The microscopic observation indicated that each core has a stable shape, and that the core parts were coupled to each other in the vicinity of a center.

Further, an optical power loss of each of the five sets of optical fibers was measured using the same method as that used in Example 5. It was confirmed that before and after the lights were simultaneously irradiated from the respective optical fibers, the loss was greatly reduced from 8 dB or more down to 2.1 to 5.7 dB for each set.

Furthermore, a return loss of an optical transmission structural body comprising the two optical fibers and the optical waveguide manufactured in this example was measured for each set. Return losses of the five sets were all 50 dB or more.

It is noted that an optical refractive index of the core part of each optical waveguide formed in this example is 105% of that of a core of each optical fiber to which the core part was connected.

EXAMPLE 10

A. Preparation of Photosensitive Composition

As a photosensitive composition, the resin C and the resin D were prepared.

B. Formation of Optical Wiring

Similarly to the steps (1) to (4) of the process B in Example 8, five optical wirings (linear waveguides) each comprising a core made of a cured matter of the resin D, and a cladding part comprising quartz glass and a cured matter of the resin C were formed, and broken and cut almost at centers, respectively.

C. Formation of Optical Waveguide (1) The five sets of optical wirings (linear optical waveguides) (ten in all) manufactured through the steps of the process B were prepared. An end surface of a core of each optical wiring on a side on which the optical wiring was immersed in the photosensitive composition was broken and cut, and not specially subjected to a planarization processing. Although roughnesses of the optical wirings were irregular, an average Ra was 2 μm and an average Rmax was 20 μm.

Using these optical wirings, optical waveguides each comprising a core made of the resin C were formed similarly to the steps (2) to (5) of the process C in Example 8. Thereafter, a shape of each core part was observed by a microscope. The microscopic observation indicated that the core part has a stable shape, and that the core parts were coupled to each other in the vicinity of a center.

An optical power loss was measured for each of the five sets of the optical wirings using the same method as that used in Example 5. It was confirmed that before and after the lights were simultaneously irradiated from the respective optical wirings, the loss was greatly reduced from 8 dB or more down to 1.9 to 5.6 dB for each set.

Furthermore, a return loss of an optical transmission structural body comprising the two optical wirings and the optical waveguide manufactured in this example was measured for each set. Return losses of the five sets were all 50 dB or more.

It is noted that an optical refractive index of the core part of each optical waveguide formed in this example is 95% of that of a core of each optical wiring to which the core part was connected.

EXAMPLE 11

A. Preparation of Photosensitive Composition

As a photosensitive composition, the resin A and the resin C were prepared.

B. Formation of Optical Wiring

Similarly to the steps (1) to (4) of the process B in Example 8, five optical wirings (linear waveguides) each comprising a core made of a cured matter of the resin A, and a cladding part comprising quartz glass and a cured matter of the resin C were formed, and broken and cut almost at centers, respectively.

C. Formation of Optical Waveguide (1) The five sets of optical wirings (linear optical waveguides) (ten in all) manufactured through the steps of the process B were prepared. An end surface of a core of each optical wiring on a side on which the optical wiring was immersed in the photosensitive composition was broken and cut, and not specially subjected to a planarization processing. Although roughnesses of the optical wirings were irregular, an average Ra was 2 μm and an average Rmax was 20 μm.

Using these optical wirings, optical waveguides each comprising a core made of the resin C were formed similarly to the steps (2) to (5) of the process C in Example 8. Thereafter, a shape of each core part was observed by a microscope. The microscopic observation indicated that the core part has a stable shape, and that the core parts were coupled to each other in the vicinity of a center.

An optical power loss was measured for each of the five sets of the optical wirings using the same method as that used in Example 5. It was confirmed that before and after the lights were simultaneously irradiated from the respective optical wirings, the loss was greatly reduced from 8 dB or more down to 1.8 to 3.4 dB for each set.

Furthermore, a return loss of an optical transmission structural body comprising the two optical wirings and the optical waveguide manufactured in this example was measured for each set. Return losses of the five sets were all 50 dB or more.

It is noted that an optical refractive index of the core part of each optical waveguide formed in this example is 98% of that of a core of each optical wiring to which the core part was connected.

EXAMPLE 12

A. Preparation of Photosensitive Composition

As a photosensitive composition, resin C was prepared.

B. Formation of Optical Waveguide

Similarly to Example 5 except for the use of the photosensitive composition (resin C) prepared in the step of the process A in place of the resin A, core parts of each optical waveguide made of the resin C were formed. A shape of each core part of the optical waveguide was observed by a microscope. The microscopic observation indicated that each core has a stable shape, and that the core parts were coupled to each other in the vicinity of a center.

Further, an optical power loss of each of the five sets of optical fibers was measured using the same method as that used in Example 5. It was confirmed that before and after the lights were simultaneously irradiated from the respective optical fibers, the loss was greatly reduced from 8 dB or more down to 1 dB or less for each set.

Furthermore, a return loss of an optical transmission structural body comprising the two optical fibers and the optical waveguide manufactured in this example was measured for each set. Return losses of the five sets were all 60 dB or more.

It is noted that an optical refractive index of the core part of each optical waveguide formed in this example is 100% of that of a core of each optical fiber to which the core part was connected.

Reference Example 1

A. Preparation of Photosensitive Composition

As a photosensitive composition, the resin C, a UV-cured adhesive cured when being irradiated with ultraviolet rays (OPTODYNE UV1000, made by Daikin Industries, Ltd.; hereinafter, referred to as "resin E"), and a UV-cured adhesive cured when being irradiated with the ultraviolet rays (OPTOKLEB HV153 made by Ardel Co.; hereinafter, referred to as "resin F") were prepared.

An optical refractive index of this resin E at a wavelength of 589 nm is about 1.42 before curing and about 1.45 after curing. An optical refractive index of this resin F at a wavelength of 589 nm is about 1.60 before curing and about 1.63 after curing.

B. Formation of Optical Wiring

Similarly to the steps (1) to (4) of the process B in Example 8, five optical wirings (linear waveguides) each comprising a core made of a cured matter of the resin F, and a cladding part comprising quartz glass and a cured matter of the resin C were formed, and broken and cut almost at centers, respectively.

C. Formation of Optical Waveguide (1) The five sets of optical wirings (linear optical waveguides) (ten in all) manufactured through the steps of the process B were prepared. An end surface of a core of each optical wiring on a side on which the optical wiring was immersed in the photosensitive composition was broken and cut, and not specially subjected to a planarization processing. Although roughnesses of the optical wirings were irregular, an average Ra was 2 μm and an average Rmax was 20 μm.

(2) Optical waveguides each comprising a core made of the resin C were formed similarly to the steps (2) to (5) of the process C in Example 8 except that these optical wirings were used and that the resin E was used in place of the resin C. Thereafter, a shape of each core part was observed by a microscope. The microscopic observation indicated that the core part has a stable shape, and that the core parts were coupled to each other in the vicinity of a center.

An optical power loss was measured for each of the five sets of the optical wirings using the same method as that used in Example 5. It was confirmed that before and after the lights were simultaneously irradiated from the respective optical wirings, the loss was greatly reduced from 8 dB or more down to 3.1 to 7.9 dB for each set.

Furthermore, a return loss of an optical transmission structural body comprising the two optical wirings and the optical waveguide manufactured in this reference example was measured for each set. Return losses of the five sets were all 50 dB or more.

It is noted that an optical refractive index of the core part of each optical waveguide formed in this reference example was 89% of that of a core of each optical wiring to which the core part was connected.

Reference Example 2

A. Preparation of Photosensitive Composition

As a photosensitive composition, the resin E and the resin F were prepared.

Figure 45:
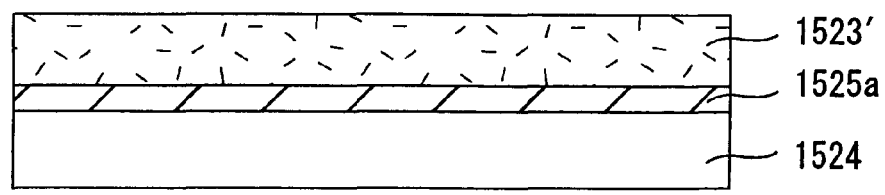
FIG. 45 is a general view for describing the optical wiring formation method according to Reference Example 2.
Figure 45:
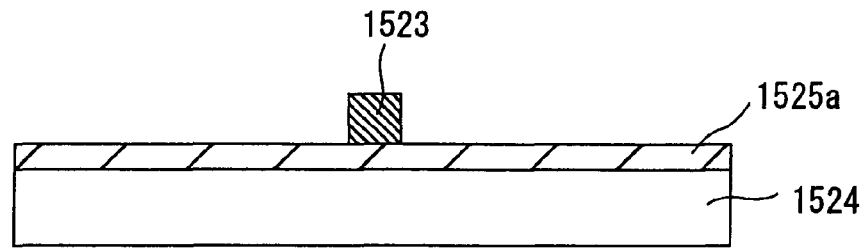
Figure 45:
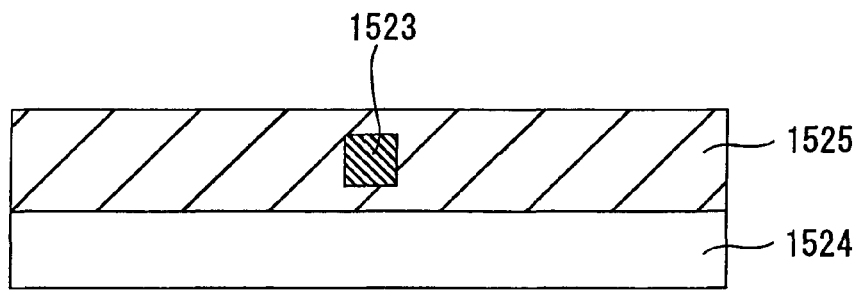

B. Formation of Optical Wiring (see FIG. 45)

(1) CYTOP made by Asahi Glass Co., Ltd. (hereinafter, referred to as "resin G") was coated on a flat quartz glass plate 524 by spin coating so that a film thickness of the resin G after drying was about 20 μm, and dried, thereby forming an under cladding part 525a.

An optical refractive index of the resin G at a wavelength of 589 nm was about 1.34 after being dried.

(2) The resin E was coated on the under cladding part 525a thus formed by spin coating so that a film thickness after curing was about 40 μm, thereby forming a core formation resin layer 523' (see FIG. 45(a)).

(3) A mask (not shown) drawing a core pattern (a width of 40 μm) was placed on the core formation resin layer 523', and an exposure processing was then carried out, thereby forming a linear core 523.

(4) After an unexposed portion of the core formation resin layer 523' was removed by alcohol (see FIG. 45(b)), an appropriate quantity of the resin G was coated on the under cladding part 525a including the core 523, and dried, thereby forming a cladding part 525 around the core 523.

Through these steps, an optical wiring (a linear waveguide) comprising the core made of a cured matter of the resin E, and the cladding part comprising resin G was formed (see FIG. 45(c)).

(5) Five optical wirings were manufactured, and were broken and cut almost at centers, respectively.

C. Formation of Optical Waveguide (1) The five sets of optical wirings (linear waveguides) (ten in all) manufactured through the steps of the process B were prepared. An end surface of a core of each optical wiring on a side on which the optical wiring was immersed in the photosensitive composition was broken and cut, and not specially subjected to a planarization processing. Although roughnesses of the optical wirings were irregular, an average Ra was 2 μm and an average Rmax was 20 μm.

Optical waveguides each comprising a core made of the resin F were formed similarly to the steps (2) to (5) of the process C in Example 8 except that these optical wirings were used and that the resin F was used in place of the resin C. Thereafter, a shape of each core part was observed by a microscope. The microscopic observation indicated that the core part has a stable shape, and that the core parts were coupled to each other in the vicinity of a center.

An optical power loss was measured for each of the five sets of the optical wirings using the same method as that used in Example 5. It was confirmed that before and after the lights were simultaneously irradiated from the respective optical wirings, the loss was greatly reduced from 8 dB or more down to 2.9 to 7.8 dB for each set.

Furthermore, a return loss of an optical transmission structural body comprising the two optical wirings and the optical waveguide manufactured in this example was measured for each set. Return losses of the five sets were all 50 dB or more.

It is noted that an optical refractive index of the core part of each optical waveguide formed in this reference example is 112% of that of a core of each optical wiring to which the core part is connected.

Comparative Example 1

(1) Five sets of two GI multimode fibers (ten in all) similar to that used in Example 1 were prepared. After an end surface of a core of each optical fiber on a side on which the optical fiber is facing the other optical fiber was cut by a cutting tool (a nipper), a cladding part was exposed by peeling off about 10 mm of a coating layer from the end surface by an ordinary method. Thereafter, each optical fiber was not specially subjected to a planarization processing. Although roughnesses of end surfaces of the optical fibers were irregular, an average Ra was 2 μm and an average Rmax was 20 μm.

A set of the two optical fibers were arranged face to face with each other with a distance of about 500 μm kept between them and placed on an optical fiber V-groove substrate (quartz V groove, made by Moritex Corporation).

Thereafter, using a V-groove fixation plate, the two optical fibers were fixed so as not be moved.

A return loss of the two optical fibers thus connected face to face was measured for each of the five sets. The return loss was 25 dB or more for each set. The measurement of the return loss was carried out in accordance with the method (4) according to JIS C 5961 6.2.4.

In addition, the connection loss between the optical fibers arranged face to face with each other for each of the five sets in Comparative Example 1 was measured to be 30 to 55 dB. For the measurement of the connection loss, the same method as that used in the step (4) in Example 5 was used. That is, light having a power of about −10 dBm (about 0.1 mW) was incident on a side of one of the optical fiber at opposite side to the side on which the optical fibers were placed face to face, and a power of light emitted from a side of the other optical fiber at opposite side to the side on which the optical fibers were placed face to face was measured. In this comparative example, no optical waveguide was formed. However, the air (optical refractive index of 1.00) was present in the gap between the two optical fibers, and the refractive index of the air was 68% of that of the core of each of the connected optical fiber.

Comparative Example 2

An optical transmission structural body was manufactured similarly to Example 12 except for the use of the following optical fibers in Example 12.

Namely, five sets of two GI multimode fibers (ten in all) made of quartz and having a length of about one meter similarly to that prepared in Example 12 were prepared. An end surface of a core of each optical fiber on a side on which the optical fiber was immersed in the photosensitive composition was cut by a cutting tool (a nipper). Thereafter, a cladding part was exposed by peeling off a coating layer of about 10 mm from the end surface side by an ordinary method. The end surface was polished vertically and smoothly using alumina grinder particles. Although roughnesses of the end surfaces of the respective optical fibers were irregular, an average Ra was 0.05 μm.

Using the optical fibers subjected to the above-mentioned end surface processing, core parts of an optical waveguide made of the resin C were formed similarly to Example 12. A shape of each core part was observed by a microscope. The microscopic observation indicated that each core part has a stable shape, and that the core parts were coupled to each other in the vicinity of a center.

Further, using the same method as that used in Example 12, an optical power loss of each of the five sets of optical fibers was measured. It was confirmed that before and after the lights were simultaneously irradiated from the respective optical fibers, the loss was greatly reduced from 8 dB or more down to 1 dB or less for each set.

Furthermore, a return loss of the optical transmission structural body comprising the two optical fibers and the optical waveguide manufactured in this comparative example was measured for each set. Return losses of the five sets were all 60 dB or more.

It is noted that an optical refractive index of the core part of each optical waveguide formed in this comparative example was 100% of that of a core of each optical fiber to which the core part is connected.

Comparative Example 3

An optical transmission structural body was manufactured similarly to Example 12 except for the use of the following optical fibers in Example 12.

Namely, five sets of two GI multimode fibers (ten in all) made of quartz and having a length of about one meter similarly to that prepared in Example 12 were prepared. An end surface of a core of each optical fiber on a side on which the optical fiber was immersed in the photosensitive composition was cut by a cutting tool (a nipper). Thereafter, a cladding part was exposed by peeling off a coating layer of about 10 mm from the end surface side by an ordinary method, and was cut by using an optical fiber cutter, thereby subjecting the end surface to a mirror-like processing vertically. Although roughnesses of the end surfaces of the respective optical fibers were irregular, an average Ra thereof was 0.01 μm or less.

Using the optical fibers subjected to the above-mentioned end surface processing, core parts of an optical waveguide made of the resin C were formed similarly to Example 12. A shape of each core part was observed by a microscope. The microscopic observation indicated that each core part has a stable shape, and that the core parts were coupled to each other in the vicinity of a center.

Further, using the same method as that used in Example 12, an optical power loss of each of the five sets of optical fibers was measured. It was confirmed that before and after the lights were simultaneously irradiated from the respective optical fibers, the loss was greatly reduced from 8 dB or more down to 1 dB or less for each set.

Furthermore, a return loss of the optical transmission structural body comprising the two optical fibers and the optical waveguide manufactured in this comparative example was measured for each set. Return losses of the five sets were all 60 dB or more.

It is noted that an optical refractive index of the core part of each optical waveguide formed in this comparative example was 100% of that of a core of each optical fiber to which the core part was connected.

Results of Examples 1 to 12, Reference Examples 1 and 2, and Comparative Example 1 to 3 are shown in Table 1.

TABLE 1

| | End surface shape of optical wiring | End surface state of optical wiring | | (1) Refractive index of core of optical wiring | (2) Refractive index of core layer of optical waveguide | Relative value of (2) to (1) (%) | Connection loss between optical wirings (min to max) (dB) | Return loss (dB) |
|---|---|---|---|---|---|---|---|---|
| | | Ra (μm) | Rmax (μm) | | | | | |
| Example 1 | Rupture surface | 1 | 10 | 1.48 | 1.51 | 102 | — | 50 |
| Example 2 | Rupture surface | 1 | 10 | 1.48 | 1.51 | 102 | — | 50 |
| Example 3 | Rupture surface | 1 | 10 | 1.48 | 1.51 | 102 | — | 50 |
| Example 4 | Rupture surface | 1 | 10 | 1.48 | 1.51 | 102 | — | 50 |
| Example 5 | Rupture surface | 2 | 20 | 1.48 | 1.51 | 102 | 1.6 to 3.3 | 50 or more |
| Example 6 | Rupture surface | 2 | 20 | 1.48 | 1.51 | 102 | 1.5 to 3.3 | 50 or more |
| Example 7 | Rupture surface | 2 | 20 | 1.48 | 1.60 | 108 | 2.3 to 6.5 | 50 or more |
| Example 8 | Rupture surface | 2 | 20 | 1.60 | 1.48 | 93 | 2.5 to 6.8 | 50 or more |
| Example 9 | Rupture surface | 2 | 20 | 1.48 | 1.56 | 105 | 2.1 to 5.7 | 50 or more |
| Example 10 | Rupture surface | 2 | 20 | 1.56 | 1.48 | 95 | 1.9 to 5.6 | 50 or more |
| Example 11 | Rupture surface | 2 | 20 | 1.51 | 1.48 | 98 | 1.8 to 3.4 | 50 or more |
| Example 12 | Rupture surface | 2 | 20 | 1.48 | 1.48 | 100 | 1 or less | 60 or more |
| Reference Example 1 | Rupture surface | 2 | 20 | 1.63 | 1.45 | 89 | 3.1 to 7.9 | 50 or more |
| Reference Example 2 | Rupture surface | 2 | 20 | 1.45 | 1.63 | 112 | 2.9 to 7.8 | 50 or more |
| Comparative Example 1 | Rupture surface | 2 | 20 | 1.48 | 1.00(*) | 68 | 30 to 55 | 25 or more |
| Comparative | Plane polished | 0.05 | — | 1.48 | 1.48 | 100 | 1 or less | 60 or more |

TABLE 1-continued

|  | End surface shape of optical wiring | End surface state of optical wiring | | (1) Refractive index of core of optical wiring | (2) Refractive index of core layer of optical waveguide | Relative value of (2) to (1) (%) | Connection loss between optical wirings (min to max) (dB) | Return loss (dB) |
|---|---|---|---|---|---|---|---|---|
|  |  | Ra (μm) | Rmax (μm) |  |  |  |  |  |
| Example 2 | surface |  |  |  |  |  |  |  |
| Comparative Example 3 | Mirror surface | 0.01 or less | — | 1.48 | 1.48 | 100 | 1 or less | 60 or more |

(*)In Comparative Example 1, no optical waveguide is formed between optical wirings. Therefore, optical refractive index herein is the optical refractive index of the air present between the optical wirings.

As is obvious from the results shown in Table 1, in the optical transmission structural body manufactured in each of Examples 1 to 4, although the core of the end surface of the optical wiring which surface is connected to the optical waveguide is not subjected to the planarization processing and the surface roughness Ra is 0.1 μm, the return loss thereof is 50 dB. Therefore, it is obvious that the optical transmission structural body can be appropriately used as an optical communication device.

The optical transmission structural body according to Example 12 is compared with the optical transmission structural body according to each of Comparative Examples 2 and 3. Regardless of the Ra of the end surface of the core of the optical wiring, i.e., regardless of the presence or absence of the end surface processing to the optical wiring, there is no difference in characteristics (the connection loss between the optical wirings and the return loss) of the acquired optical transmission structural body between Example 12 and Comparative Examples 2 and 3. This result also indicates obviously that the optical transmission structural body can be appropriately used as the optical communication device.

Examples 5, 7 to 12, Reference Examples 1 and 2, and Comparative Example 1 are compared. It is obvious from the comparison of the connection loss among them that Examples 5, 7 to 12 and Reference Examples 1 and 2 in which the optical waveguides are formed are excellent in optical transmission performance to Comparative Example 1 in which no optical waveguide is formed.

Examples 5, 7 to 12 and Reference Examples 1 and 2 are compared with one another in detail. If the optical refractive index of the core part of the optical waveguide is substantially equal to that of the core of the optical waveguide to which the core part is connected (Example 12), the connection loss and irregularity of the loss are minimized. In addition, if the optical refractive index of the core part of the optical waveguide is 98 to 102% (Examples 5 and 11) of that of the core of the optical waveguide to which the core part is connected, 95 to 105% (Examples 9 and 10) and 90 to 110% (Examples 7 and 8), the connection loss and the irregularity of the loss are greater in this order.

If the optical refractive index of the core part of the optical waveguide is 85 to 115% of that of the core of the optical wiring to which the core part is connected (Reference Examples 1 and 2), the connection loss and the irregularity of the loss are further greater. Obviously, therefore, as compared with the instance in which the optical refractive index of the core part of the optical waveguide is 90 to 110% of that of the core of the optical wiring, Reference Examples 1 and 2 are inferior in optical transmission performance.

Furthermore, as is obvious from the result of the comparison between Examples 5 and 6, the connection loss of the optical transmission structural body is not influenced by the presence or absence of the end portion of the optical wiring on the side on which the optical wiring is connected to the optical waveguide.

EXAMPLE 13

Figure 27:
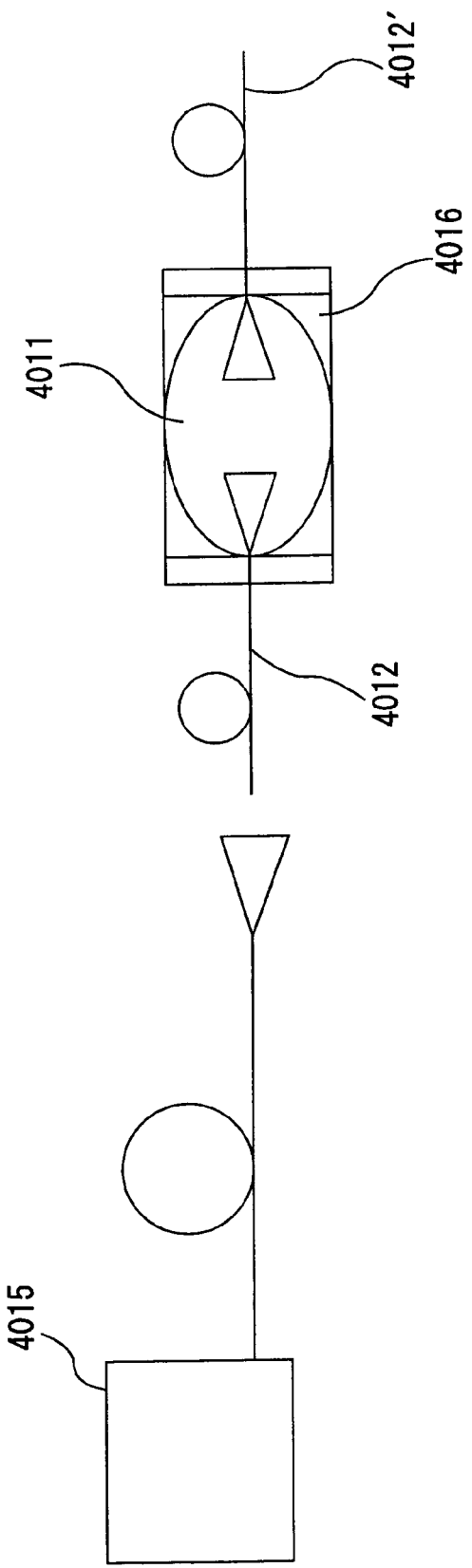
FIG. 27 is a general view for describing the optical waveguide formation method according to Example 13.

Formation of Optical Waveguide (see FIG. 27)

(1) Two GI multimode optical fibers subjected to an end surface processing using a fiber cutter, made of quartz and having a length of about one meter (made by Fujikura Ltd., core/cladding part=50 μm/125 μm) were prepared.

(2) UV-containing light was incident on one end of an optical fiber 4012 from one end of each of the optical fibers 4012 and 4012' by an ultraviolet irradiation device 4015 (5252L, manufactured by Matsushita Machine and Vision Ltd.) using a high pressure mercury lamp of 250 W as a light source. A luminous intensity of ultraviolet rays emitted from the other end of the optical fiber 4012 was adjusted to 0.3 mW/cm$^2$ by a UV luminometer (UIT-150, manufactured by Ushio Inc.).

(3) The respective optical fibers 4012 and 4012' were fixed to optical fiber fixing bases placed on two optical high precision slide bases (X stages) (not shown), respectively. The emission-side ends of the optical fibers 4012 and 4012' were placed face to face with each other with a distance of about 500 μm kept between the optical fibers 4012 and 4012' and placed on an optical fiber V-groove substrate 4016 (quartz V groove, made by Moritex Corporation). A UV-cured resin composition 4011 (resin A) was coated on an entire faced portion so as to bury the UV-cured resin composition 4011 between the optical fibers 4012 and 4012' without gap. Thereafter, the faced portion of optical fibers and the photosensitive composition 4011 were caught in a V-groove fixation plate so as not to be moved.

(4) While keeping the optical fibers 4012 and 4012' in the state described in (3) above, light having a power of about −10 dBm (about 0.1 mW) was incident on an incidence side of one optical fiber 4012 using an LED light source at a wavelength of 850 nm (AQ2140 and AQ4215, manufactured by Ando Electric Co., Ltd.), and a power of a light emitted from an incidence side of the other optical fiber 4012' was measured by a power meter (AQ2140 and AQ2730, manufactured by Ando Electric Co., Ltd.).

(5) While keeping the optical fibers 4012 and 4012' in the state described in (3) above, UV-containing lights the luminous intensity of each of which was adjusted in the step (2) were simultaneously irradiated from emission ends of the respective optical fibers 4012 and 4012' into the photosensitive composition 4011 for one to two seconds.

When the steps (1) to (4) were carried out, the photosensitive composition 4011 was not cured yet. At the end of the step (4), an optical power loss of 8 dB or more was measured. In addition, at the end of the step (5), core parts were formed on the emission ends of the two optical fibers 4012 and 4012'. An observation using a microscope (VH-7000 manufactured by Keyence Corporation) indicated that the respective core parts were coupled to each other in the vicinity of a center.

(6) After the step (5), a power of the light emitted from the incidence side of the optical fiber 4012' was measured using the same method as that in the step (4).

As a result, an optical power loss of 3 dB or less was measured.

The fact that the optical power loss (3 dB or less) measured at the end of the step (6) was lower than the optical power loss (8 dB or more) measured at the end of the step (4) indicates the following respect. An optical waveguide comprising a core part was formed between the emission ends of the two optical fibers 4012 and 4012', and the optical fibers 4012 and 4012' were connected to each other by the optical waveguide.

Further, after the step (6) was finished, visible light was irradiated from the emission end of the optical fiber 4012, and leakage light of the optical waveguide was observed. In this observation, the leakage light along a shape of the optical waveguide was observed, and it was confirmed that the light emitted to the optical waveguide thus formed was constrained in the optical waveguide.

(7) While keeping the state described in (6) above, the power of the light emitted from the incidence end of the optical fiber 4012' was continuously measured.

As a result, it was confirmed that the optical power loss (3 dB or less) measured at the end of the step (6) was increased with the passage of time.

Specifically, about 30 seconds after the measurement of the optical power in the step (6), the optical power loss of about 5 dB was measured. After about 60 seconds, the optical power loss of about 10 dB was measured.

In addition, microscopic observation indicated that following an increase of the optical power loss, the optical waveguide formed between the optical fibers 4012 and 4012' is fluidized and was thereby deformed.

(8) Thereafter, while measuring the optical power emitted from the incidence end of the optical fiber 4012', the fixing of the V-groove fixation plate in which the faced portion between the optical fibers 4012 and 4012' was caught so as not to be moved was loosened. Using the optical high precision slide base, the optical fibers 4012 and 4012' were pulled so that the distance between the ends of the optical fibers 4012 and 4012' widens by about 50 μm.

At this time, output loss of 3 dB or less was measured.

(9) While repeating the step of pulling the optical fibers 4012 and 4012' so that the distance between the ends of the optical fibers 4012 and 4012' widens by about 50 μm, the optical power emitted from the incidence side of the optical fiber 4012' was continuously measured.

As a result, the optical power loss decreases and, when the distance between the ends of the optical fibers 4012 and 4012' was about 700 μm, an optical power loss of about 2 dB or less was measured.

The reason that the optical power loss (2 dB or less) measured at the end of the step (9) was lower than the optical power loss (3 dB or less) measured at the end of the step (8) was considered as follows. By continuously pulling the optical fibers, the shape of the optical waveguide was stabilized, and the optical waveguide was formed into the shape with which the optical power loss can be reduced.

EXAMPLE 14

Formation of Optical Waveguide

A. Preparation of Photosensitive Composition

A photosensitive composition was prepared by mixing, by a weight ratio of 1:1, an acrylate-based UV-cured adhesive (resin A) cured by a radical polymerization reaction when being irradiated with ultraviolet rays, and an epoxy fluoride-based UV-cured adhesive cured by a cation polymerization reaction when being irradiated with the ultraviolet rays (made by NTT-AT; hereinafter, referred to as "resin H").

B. Formation of Optical Waveguide (1) An optical waveguide comprising a core part both ends of which optical fibers were connected, was formed similarly to (1) to (7) in Example 13 except for the use of the photosensitive composition prepared in the process A in the step (3) of Example 13.

In the steps (5) to (7) in Example 13, the shape of the formed core part was observed using the microscope (VH-7000 manufactured by Keyence Corporation) when the UV-containing light was irradiated for three seconds. The microscopic observation indicated that core parts were formed on the emission ends of the both optical fibers, and that the respective core parts were coupled to each other in the vicinity of a center.

Separately from this example, the same steps as the steps (1) to (7) in Example 13 were carried out for each of the independent resin A and the independent resin H. Similarly to the above, the shape of the core part when the UV-containing light was irradiated for three seconds was observed by the microscope. As a result, for the resin A, the microscopic observation indicated that core parts were formed on the emission ends of the both optical fiber, and that the core parts were coupled to each other in the vicinity of a center for the resin A. For the resin H, by contrast, the microscopic observation indicated that core parts were formed on the emission ends of the both optical fibers, but that the core parts were not coupled to each other.

Furthermore, for the resin H, the UV-containing light was continuously irradiated, and the shape of the core part was observed by the microscope. The microscopic observation indicated that the core parts were not coupled to each other even after 10 seconds of the start of the irradiation of the UV-containing light.

Based on these results, it is considered that the core parts formed through the steps (1) to (7) were formed by selectively curing the resin A in the photosensitive composition.

(2) While the both ends of each core part were pulled, an entire V-groove substrate 4013 including the photosensitive composition 4011 in a faced portion between the optical fibers 4012 and the 4012' was irradiated with ultraviolet rays having a luminous intensity of 300 mW/cm$^2$ for 30 seconds using the same ultraviolet irradiation device 4015, thereby forming a cladding part.

After the cladding part was formed in this step (2), the state was observed by the microscope. The microscopic observation indicated that the shape of each core part formed after the end of the step (1) was maintained. Further, visible light was irradiated from the emission end of the optical fiber 4012, and leakage light of the optical waveguide was observed. The observation indicates that the leakage light along a shape of the optical waveguide was observed, and that the stable cladding part was formed around the core part.

(3) Thereafter, the pulling of the optical fibers connected to the both ends of the core part, respectively, was stopped, and an optical power loss was measured. As a result, the optical power loss of 2 dB or less was measured.

The reason that the optical power loss (2 dB or less) measured at the end of the step (3) was equal to the optical power loss (2 dB or less) measured at the end of the step (1) was considered as follows. By forming the cladding part while pulling the both ends of the core part, the state of pulling the both ends of the core part was maintained, and the stable shape is therefore maintained.

EXAMPLE 15

(1) A GI multimode optical fiber subjected to an end surface processing using a fiber cutter, made of quartz, and having a length of about one meter (made by Fujikura Ltd., core/cladding part=50 μm/125 μm) was prepared.

(2) UV-containing light irradiated through a light guide 5037 from an ultraviolet irradiation device 5038 (5252L, manufactured by Matsushita Machine and Vision Ltd.) using a high pressure mercury lamp 5038' as a light source was incident from one end of the quartz multimode optical fiber 5032. A luminous intensity of an ultraviolet ray emitted from the other end of the optical fiber 5032 was adjusted to 0.01 mW/cm$^2$ or less (a detection limit or less). The fact that the light was irradiated from the other end of the optical fiber was confirmed by visually recognizing light (visible ray contained in a lamp light) from the end of the optical fiber.

The intensity of the ultraviolet ray was measured by a UV luminometer (UIT-150, manufactured by Ushio Inc.).

(3) One end of the quartz multimode optical fiber 5032 was placed on an optical fiber V-groove substrate 5035 made of quartz glass (made by Moritex Corporation). A UV-cured resin composition 5031 (resin A) was coated entirely on one end of this optical fiber so as to be buried without gap. Then, a V-groove fixation plate was placed on the optical fiber V-groove substrate 5035, and the end of the optical fiber 5032 and the photosensitive composition 5031 were caught in the V-groove fixation plate so as not to be moved.

Figure 33:
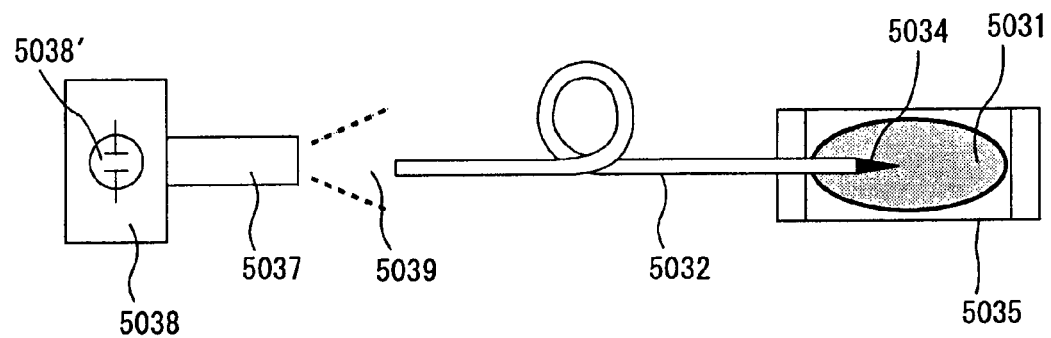
FIG. 33 is a general view for describing the optical waveguide formation method according to Example 15.

(4) While fixing the quartz multimode optical fiber 5032, UV-containing light 5039 the luminous intensity of which was adjusted in the step (2) was irradiated to the UV-cured resin composition 5031, thereby curing the resin composition and forming an optical waveguide 5034 shaped such that one end was gradually narrower (see FIG. 33).

Observation using a microscope (VH-7000 manufactured by Keyence Corporation) indicated that, as a result of the irradiation of the UV-containing light for five minutes in the step (4), a core part shaped such that a tip end having a length of about 30 to 50 μm was gradually thinner.

Further, if the core part thus formed was taken out, and laser light at a wavelength of 532 nm was irradiated from a bottom of the core part, it was confirmed that the laser light was condensed on an apex of the core part.

EXAMPLE 16

(1) First, an optical fiber collimator in which one end of a GI multimode optical fiber (core/cladding part=50/125 μm) was attached to a condensing type collimator lens (focal length of five millimeters, a wavelength of 850 nm) (lens-added optical fiber) (OPCL, manufactured by Nippon Sheet Glass Co., Ltd.; a length of about one meter) was prepared.

(2) UV-containing light irradiated from an ultraviolet irradiation device 5048 (5252L, manufactured by Matsushita Machine and Vision Ltd.) using a high-pressure mercury lamp 5048' as a light source through a light guide 5047 was incident from an end of the optical fiber collimator 5042 at opposite side to a side on which the collimator lens 5042' was attached. A luminous intensity of ultraviolet rays emitted from the other end of the optical fiber collimator 5042 through the collimator lens 5042' was adjusted to about 0.3 to 0.5 mW/cm$^2$.

The measurement of the intensity of the ultraviolet ray was carried out using a UV luminometer (UIT-150, manufactured by Ushio Inc.).

(3) Separately from the steps (1) and (2), an acrylic cylinder 5045 having a length of about 1 cm and an inner diameter of about 6 mm was prepared, and one end of the cylinder 5045 was fixed onto a slide glass 5046 by an adhesive.

Thereafter, a UV-cured resin composition 5041 (resin A) was poured into the cylinder 5045. The collimator lens 5042'-side of the optical fiber collimator 5042 was attached to a lower portion of the cylinder 5045 through the slide glass 5046 and fixed by the adhesive.

It was noted that the optical fiber collimator 5042 was attached so that the collimator lens was located substantially in a central portion of the cylinder 5045.

Figure 34:
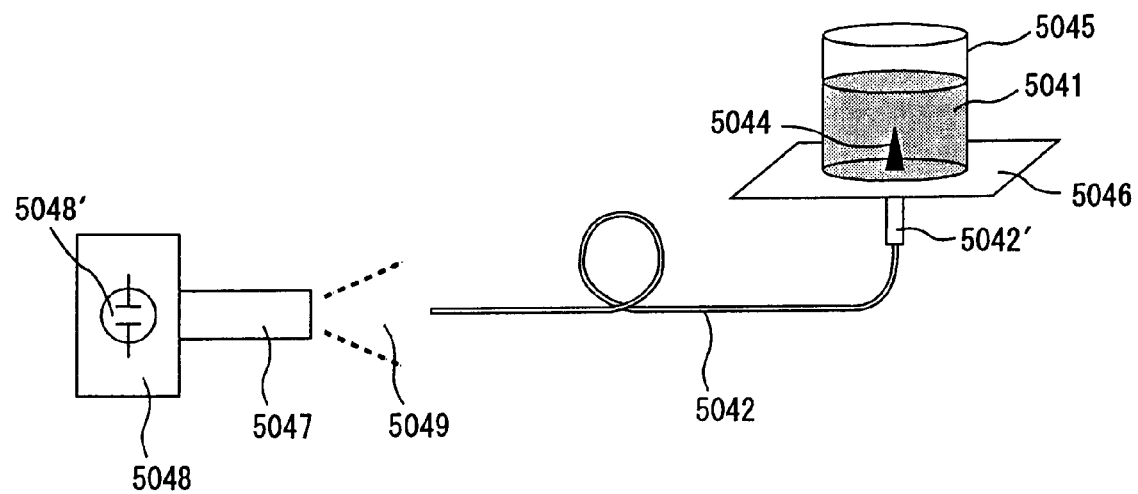
FIG. 34 is a general view for describing the optical waveguide formation method according to Example 16.
Figure 35:
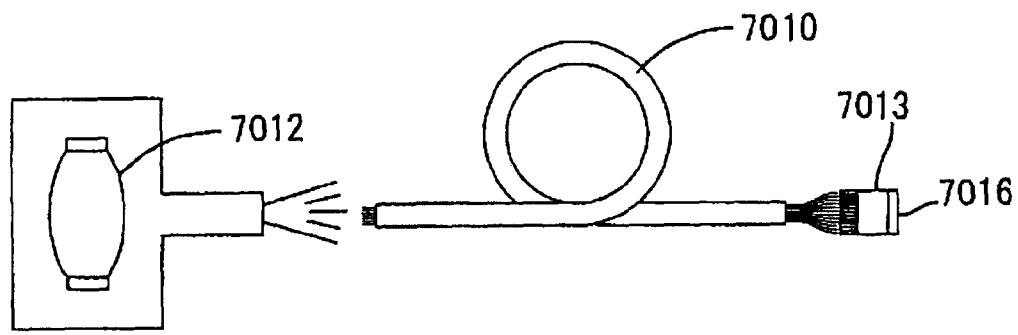
FIG. 35 is a general view showing the optical waveguide formation method according to Example 14.
Figure 36:
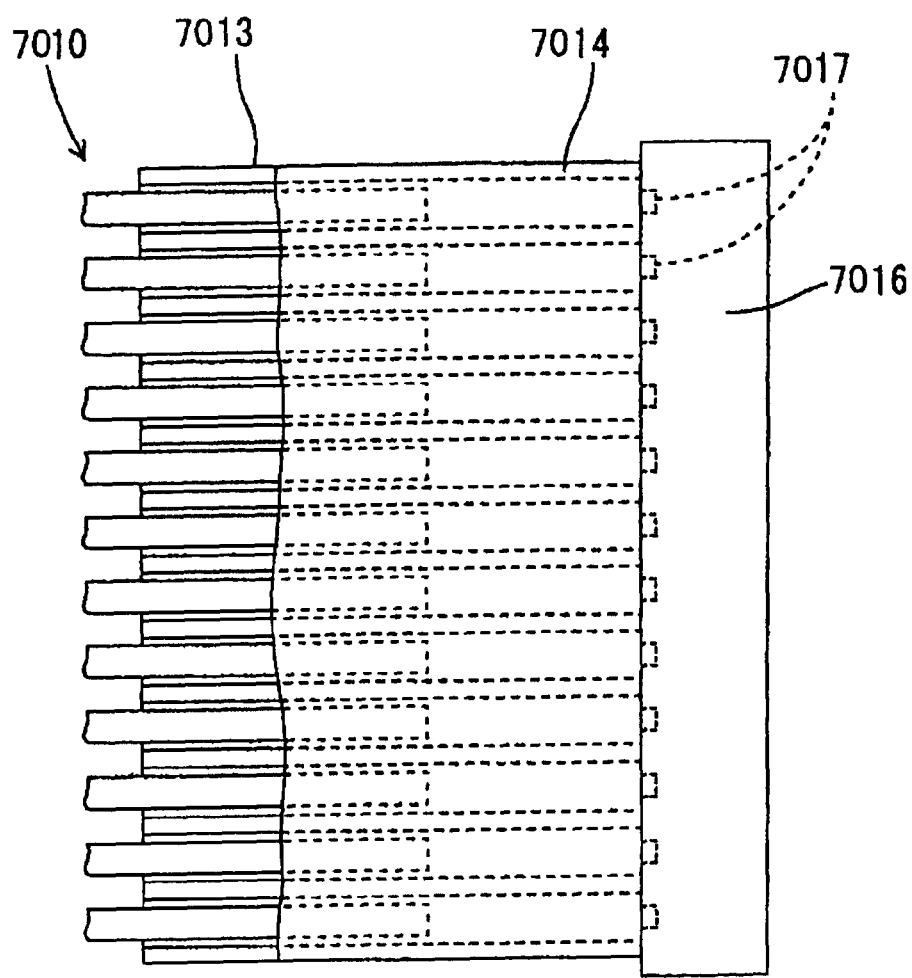
FIG. 36 is an enlarged plan view showing a state where an optical fiber is fixed to a V-groove substrate according to Example 14.
Figure 37:
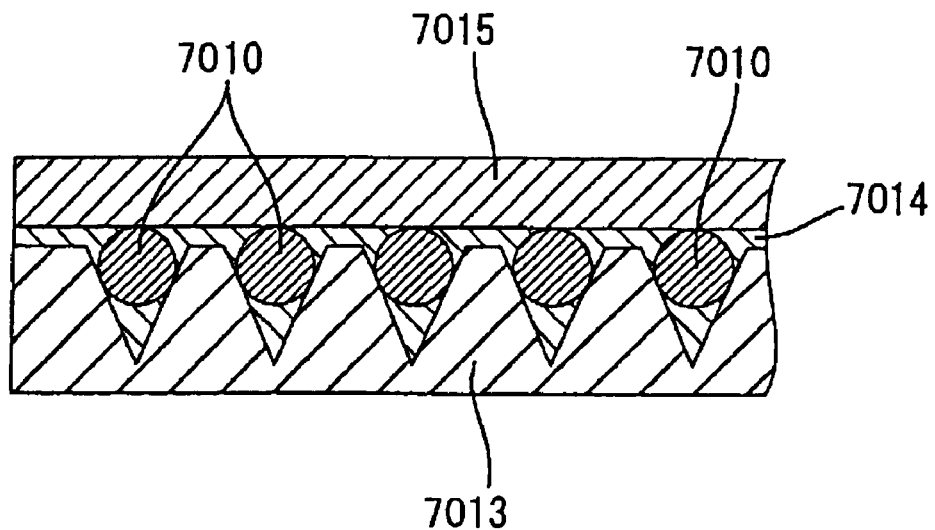
FIG. 37 is an enlarged plan view showing a state where the optical fiber is fixed to the V-groove substrate according to Example 14.
Figure 38:
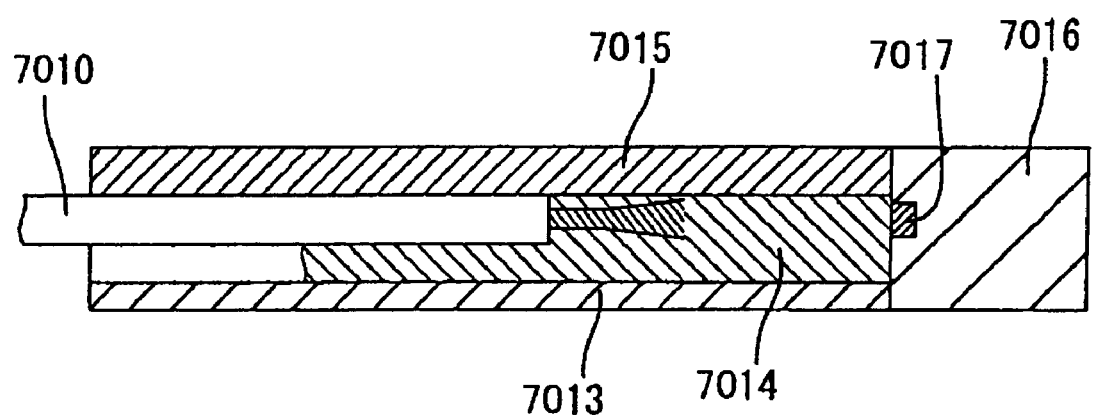
FIG. 38 is an enlarged cross-sectional view showing an optical waveguide formation state according to Example 14.
Figure 39:
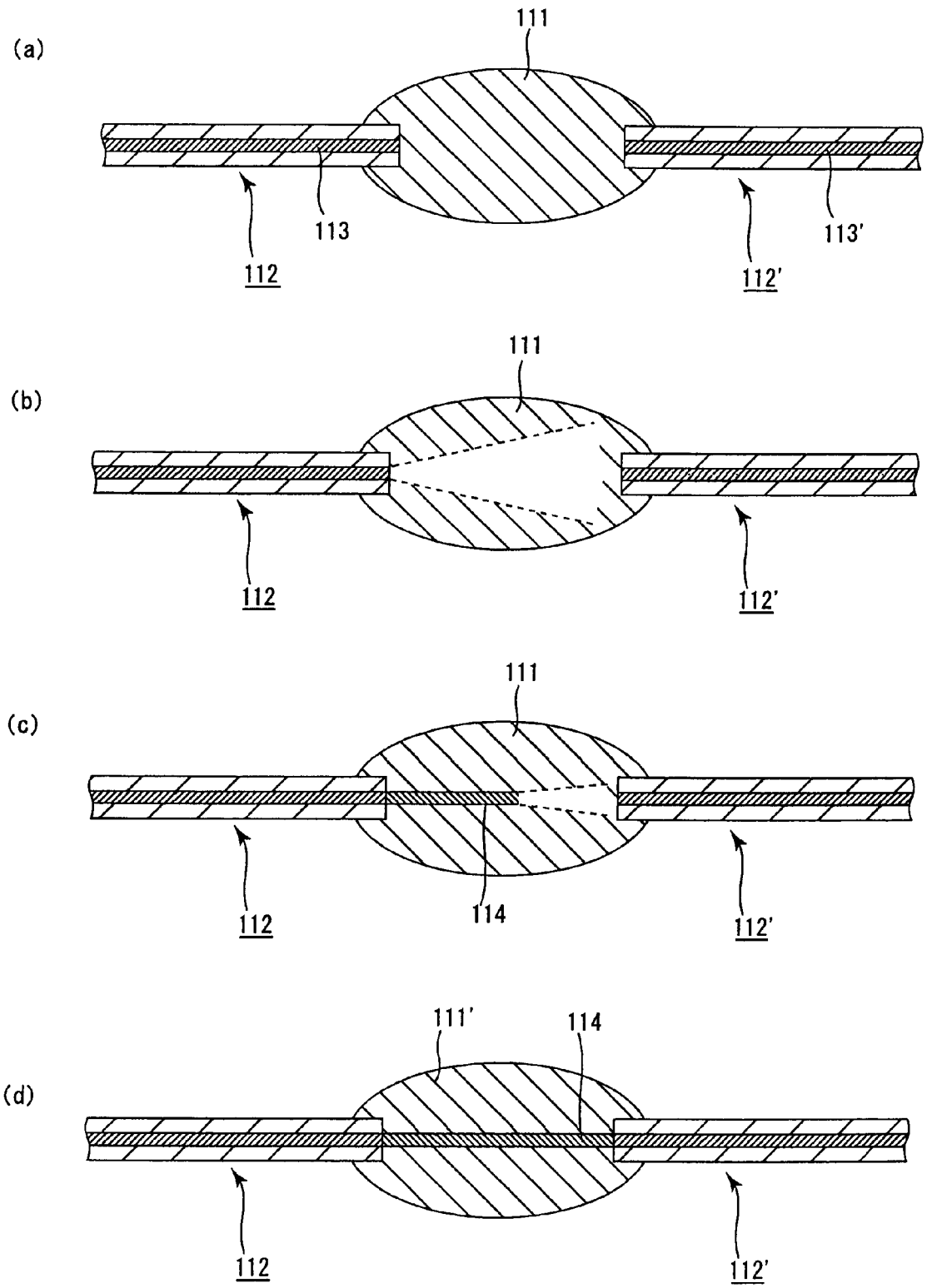
FIGS. 39(a) to 39(d) are schematic diagrams for describing one example of a method of forming a core part that connects different optical wirings to each other using the self-organizing optical waveguide technique.

(4) While fixing the optical fiber collimator 5042 to the cylinder 5045 through the slide glass 5046, the UV-containing light 5049 the intensity of which was adjusted in the step (2) was irradiated to the UV-cured resin composition 5041, thereby curing the resin composition and forming an optical waveguide 5044 shaped such that one end was gradually thinner (see FIG. 34).

It was confirmed that, as a result of irradiating the UV-containing light in the step (4), the core part shaped such that the tip end was gradually thinner by about 1 mm about 10 seconds after the start of the ultraviolet ray, by about 2 mm about 30 to 90 seconds after the start of the ultraviolet ray was formed.

Furthermore, after irradiating the UV-containing light for 90 seconds, the formed core part was taken out, and laser light at a wavelength of 532 nm was incident from a bottom of the core part. As a result, the laser light was condensed on an apex of the core part.

INDUSTRIAL APPLICABILITY

As described above, with the optical transmission structural body according to the first aspect of the first group of the present invention, even if the portion of the optical wiring which portion is connected to the core part of the optical waveguide is not specially subjected to the planarization processing, or even if the surface roughness Ra based on JIS B 0601 is 0.1 μm or more, the optical signal can be suitably transmitted between the optical wiring and the optical waveguide. Incidentally, if such an optical transmission structural body is manufactured, the manufacturing process can be simplified.

With the optical waveguide formation method according to the second aspect of the first group of the present invention, the core part excellent in connection performance with the optical wiring can be formed even if the portion of the optical wiring which portion is connected to the core part of the optical waveguide is not specially subjected to the planarization processing, or even if the surface roughness Ra based on JIS B 0601 is 0.1 μm or more.

Therefore, the portion of the optical wiring coupled to the core part can be formed without the highly accurate end surface processing. The formation method of the present invention can, therefore, simplify the optical waveguide formation process. Since the formation process can be simplified, the formation method is economically advantageous.

In the optical waveguide according to the first aspect of the second group of the present invention, since the both ends of the core part are connected to the optical wirings or optical components, respectively, both ends of at least the core part are pulled, the shape of the core part is stabilized, and the optical loss in the optical waveguide can be reduced.

Further, a force for pressing the optical wiring and the optical waveguide against each other is not applied, thus, a damage, deformation, and the like does not occur to the end surface of the optical waveguide and those of the optical wirings and the like connected to the both ends of the optical wiring, respectively. The connection loss resulting from diffuse reflection of the transmitted light, radiation of the light to the outside, or the like is less likely to occur.

Therefore, the optical waveguide according to the first aspect of the second group of the present invention can realize low connection loss between the different optical wirings or the like.

Furthermore, with the optical waveguide formation method according to the second aspect of the second group of the present invention, the core part can be formed while the both ends of the core part are connected to the respective optical wirings. Besides, the both ends of the core part are pulled. Therefore, differently from the conventional art, it is unnecessary to fix the core part when the core part is connected to the optical wiring by pushing, and the core part and each optical wiring are not pressed against each other. As a result, the optical waveguide can be formed without causing the damage, the deformation or the like on the end surfaces of the optical wirings and the core part. In addition, since the both ends of the core part are pulled, the core part is not fluidized and the optical waveguide including the core part of the stabilized shape can be obtained.

Therefore, the optical waveguide formation method according to the second aspect of the second group of the present invention can realize low connection loss between the optical wirings connected to the optical waveguide.

Moreover, since the optical waveguide according to the first aspect of the third group of the present invention has the above-mentioned shape, the light incident from the bottom can be condensed and the condensed light can be efficiently emitted from the apex.

Therefore, when optical components, optical wirings, or an optical component and an optical wiring are optically connected to each other, the optical waveguide according to the first aspect of the third group of the present invention can be interposed between them. With this configuration, it is possible to ensure transmitting the optical signal without using an expensive lens such as a collimator lens or a condensing lens.

Further, by directly attaching the bottom of the above-mentioned core part to the optical component or the optical wiring on the side on which the optical signal is emitted, or by directly attaching the apex of the core part to the optical component or the optical wiring on the side on which the optical signal is received, it is possible to surely and efficiently transmit the optical signal through the core part.

Additionally, with the optical waveguide formation method according to the second aspect of the third group of the present invention, the core part is formed by forming the cured matter corresponding to the optical path of the irradiated light, and this cured matter is grown into a shape so as to condense the irradiated light. Therefore, the irradiated light follows an optical path condensed in the photosensitive composition. As a result, the core part having the shape such that the core part is gradually thinner toward one end thereof can be formed.

The invention claimed is:

1. An optical transmission structural body comprising:
an optical wiring having a core;
an optical waveguide having a core part configured to transmit an optical signal to and from the core of the optical wiring, the core part comprising a first photosensitized photosensitive composition which directly contacts the core of the optical wiring; and
a solidified cladding part directly contacting the core part, wherein
the solidified cladding part comprises a second photosensitized photosensitive composition.

2. The optical transmission structural body according to claim 1, further comprising:
a coating layer formed on a circumference of an end of the optical wiring on a side on which the core part of the optical waveguide is connected.

3. The optical transmission structural body according to claim 1, wherein an optical refractive index of the core part of the optical waveguide is 90 to 110% of an optical refractive index of a portion of the optical wiring, which is connected to the core part of the optical waveguide.

4. The optical transmission structural body according to claim 1, wherein an optical refractive index of the core part of the optical waveguide is 95 to 105% of an optical refractive index of a portion of the optical wiring, which is connected to the core part of the optical waveguide.

5. The optical transmission structural body according to claim 1, further comprising:
an optical path conversion mirror formed on an end surface of the core part of the optical waveguide at opposite side to the side on which the optical wiring is connected.

6. The optical transmission structural body according to claim 1, wherein the core part of the optical waveguide includes at least one bent portion.

7. The optical transmission structural body according to claim 1, wherein a roughened surface is formed partially or entirely in a portion other than a portion connected to the core part of the optical waveguide on a surface of the optical wiring.

8. The optical transmission structural body according to claim 1, wherein the core part is self-aligned to the core of the optical wiring.

9. The optical transmission structural body according to claim 1, wherein the core part comprising the first photosensitized photosensitive composition is connected to the core of the optical wiring by a self-organizing optical waveguide formation technique.

10. The optical transmission structural body according to claim 1, wherein the core of the optical waveguide is not subjected to a planarized processing.

11. An optical transmission structural body comprising:
an optical wiring having a core;
an optical waveguide having a core part configured to transmit an optical signal to and from the core of the optical wiring, the core part comprising a first photosensitized photosensitive composition which directly contacts the core of the optical wiring; and
a solidified cladding part formed continuously around the core part, wherein
the solidified cladding part comprises a second photosensitized photosensitive composition.

* * * * *